March 9, 1943.  L. M. POTTS  2,313,088
METER RECORDING SYSTEMS
Filed Jan. 7, 1938    23 Sheets-Sheet 1

LOUIS M. POTTS
INVENTOR

BY
ATTORNEY

March 9, 1943.  L. M. POTTS  2,313,088
METER RECORDING SYSTEMS
Filed Jan. 7, 1938  23 Sheets-Sheet 2
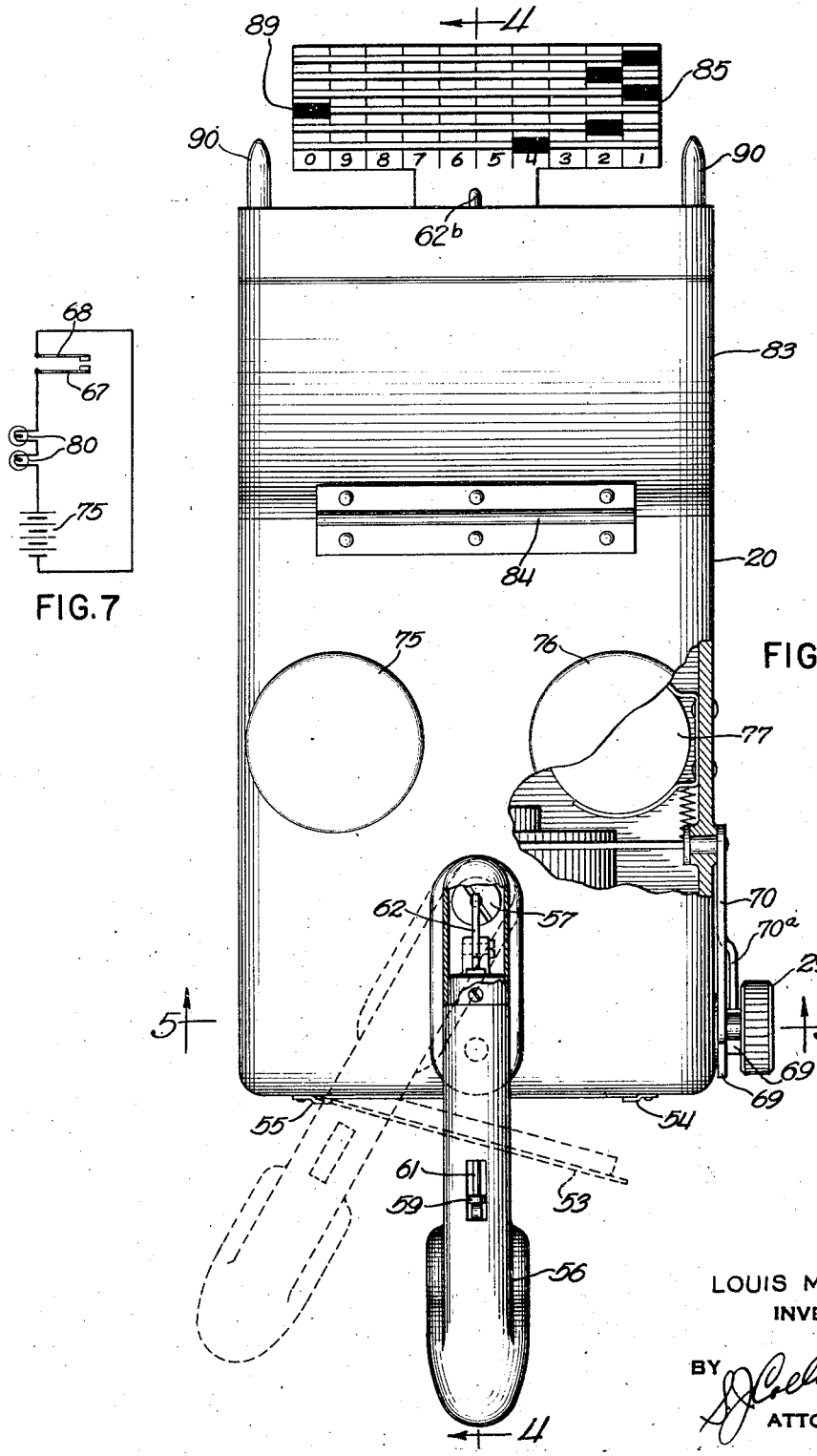
LOUIS M. POTTS
INVENTOR
BY
ATTORNEY

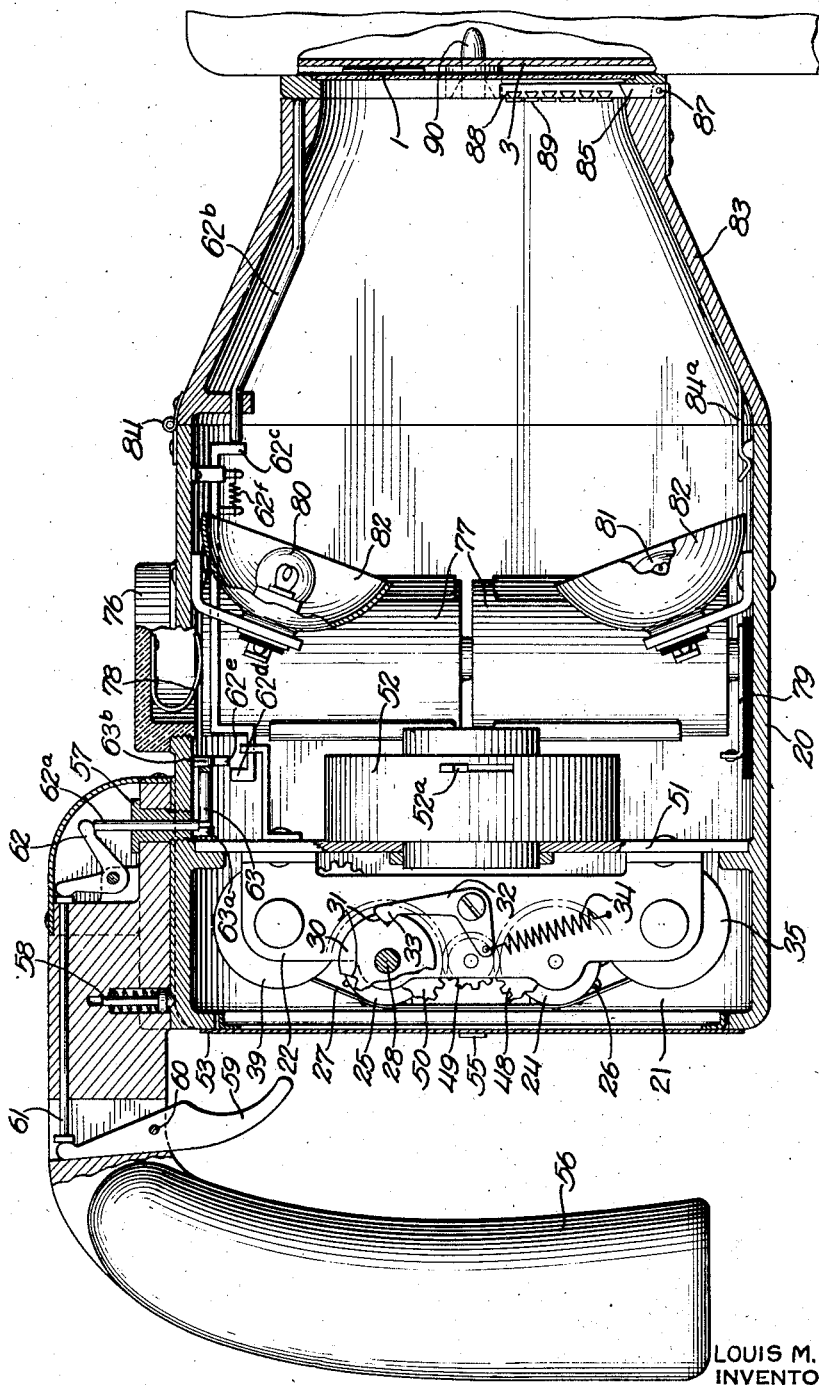

March 9, 1943.    L. M. POTTS    2,313,088
METER RECORDING SYSTEMS
Filed Jan. 7, 1938    23 Sheets-Sheet 4

LOUIS M. POTTS
INVENTOR

BY
ATTORNEY

March 9, 1943.  L. M. POTTS  2,313,088
METER RECORDING SYSTEMS
Filed Jan. 7, 1938  23 Sheets-Sheet 5
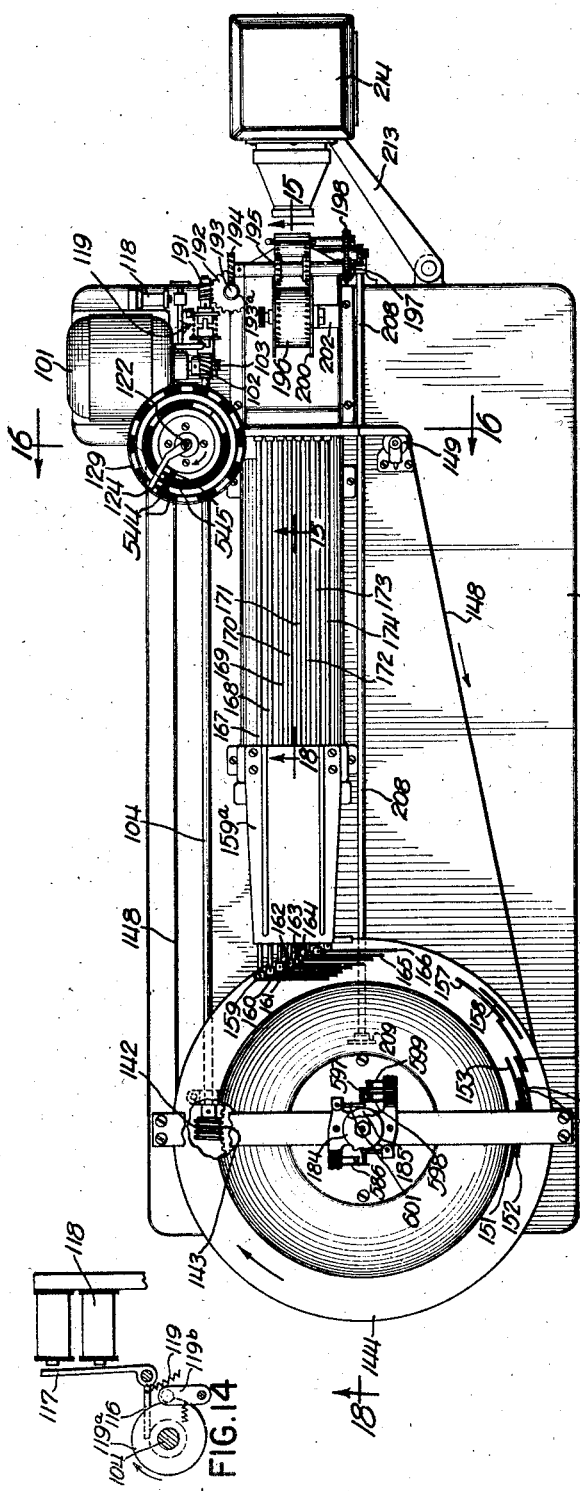
FIG.12
FIG.14
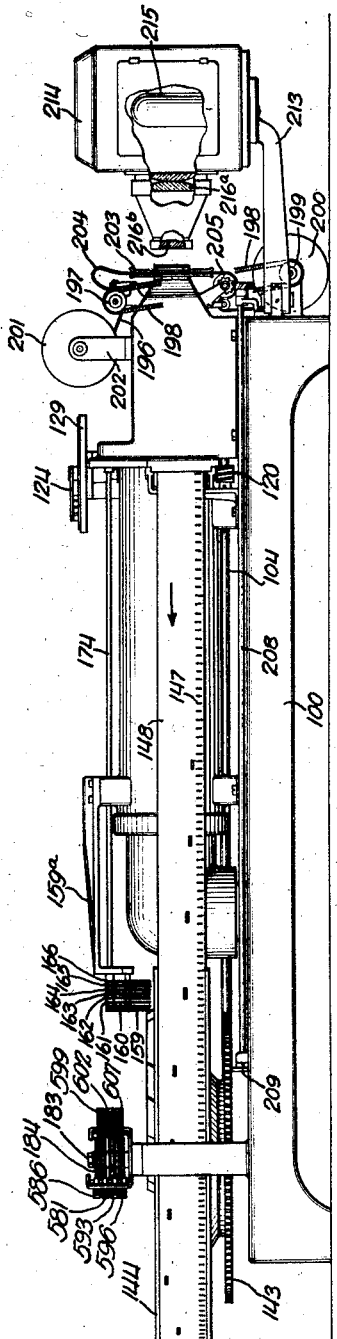
FIG.13
INVENTOR
LOUIS M. POTTS
BY
ATTORNEY March 9, 1943.   L. M. POTTS   2,313,088
METER RECORDING SYSTEMS
Filed Jan. 7, 1938   23 Sheets-Sheet 6
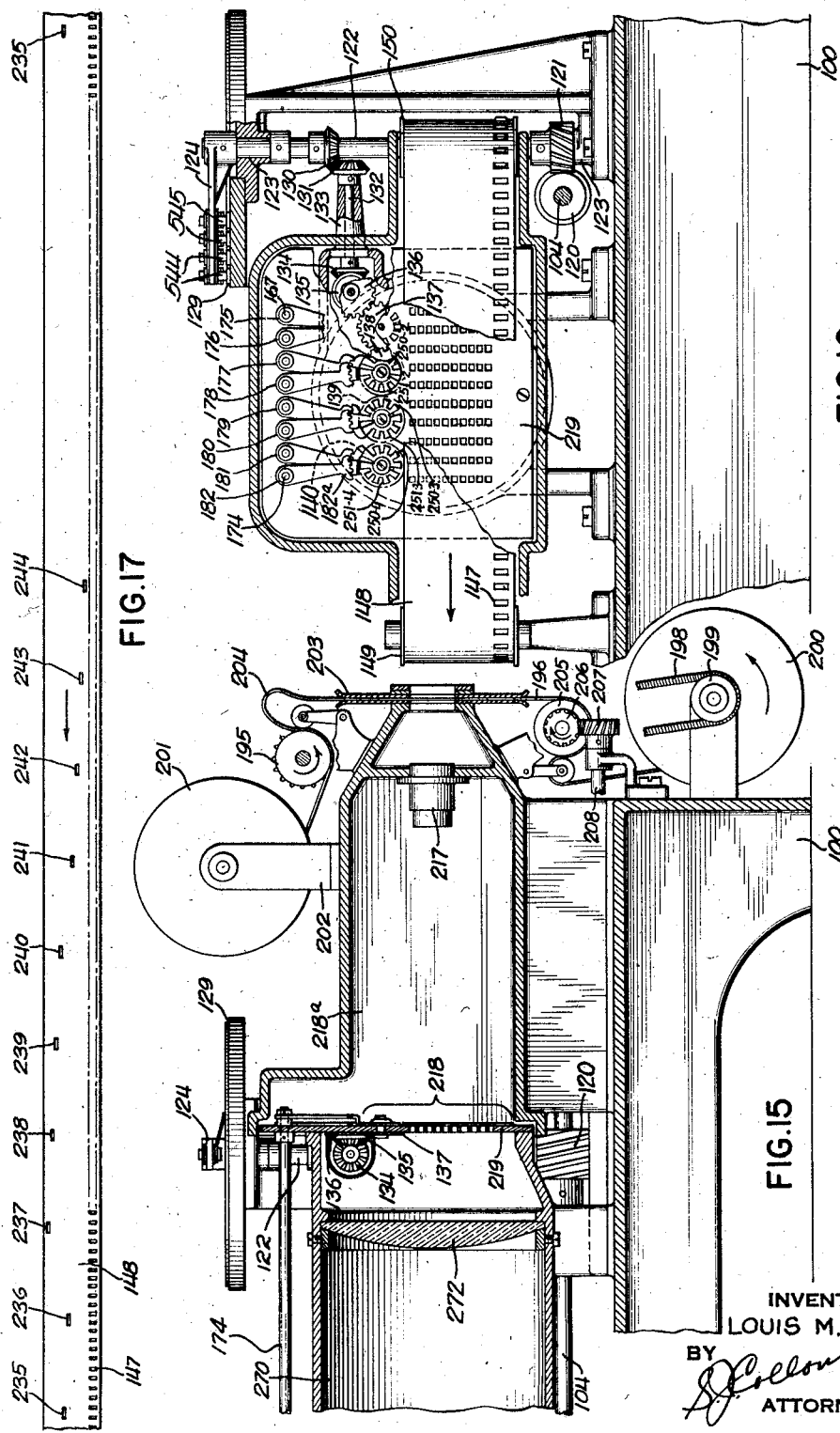
INVENTOR
LOUIS M. POTTS
BY
ATTORNEY March 9, 1943. L. M. POTTS 2,313,088
METER RECORDING SYSTEMS
Filed Jan. 7, 1938 23 Sheets-Sheet 7
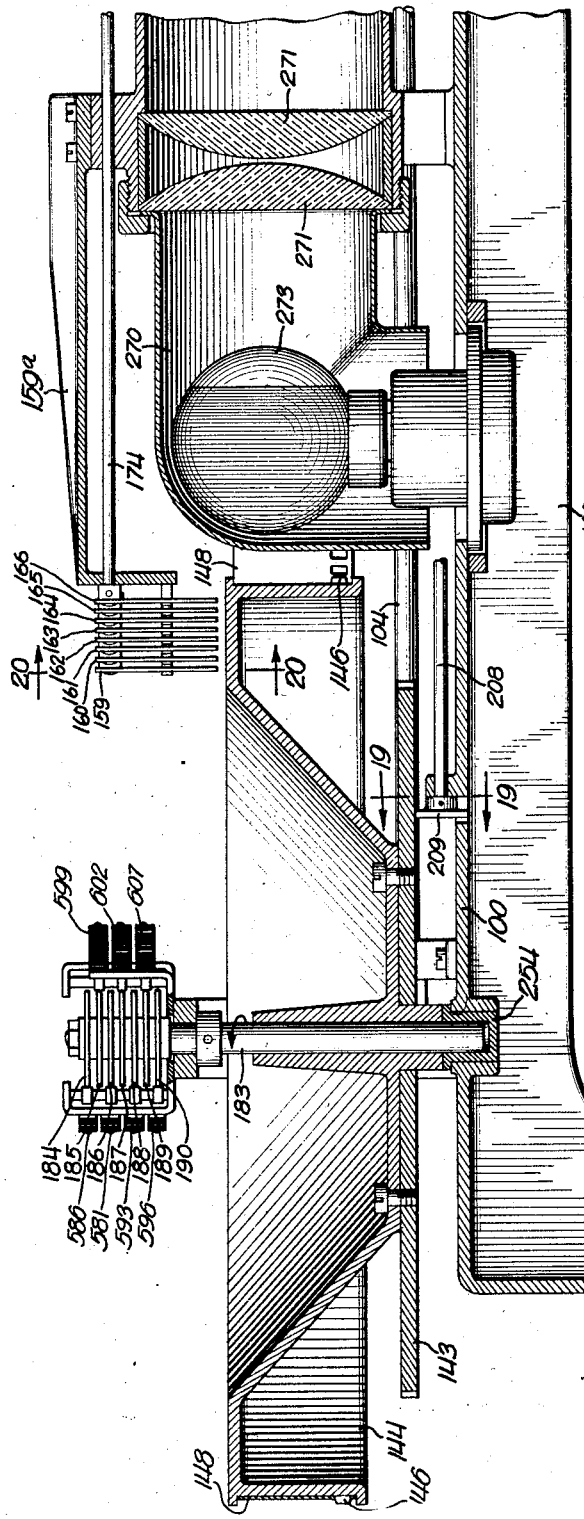
INVENTOR
LOUIS M. POTTS
BY
ATTORNEY March 9, 1943.   L. M. POTTS   2,313,088
METER RECORDING SYSTEMS
Filed Jan. 7, 1938   23 Sheets-Sheet 8

LOUIS M. POTTS
INVENTOR

BY
ATTORNEY

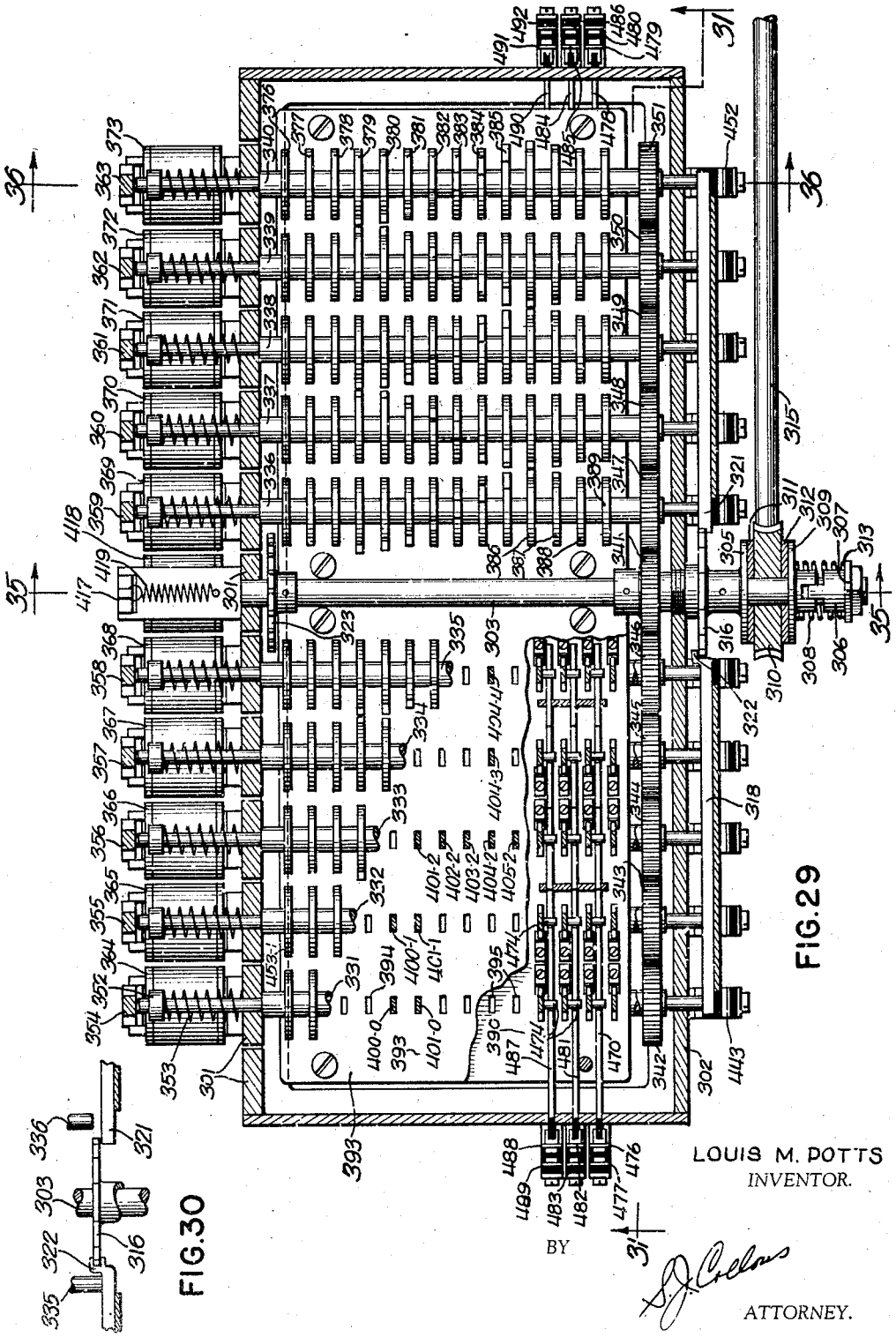

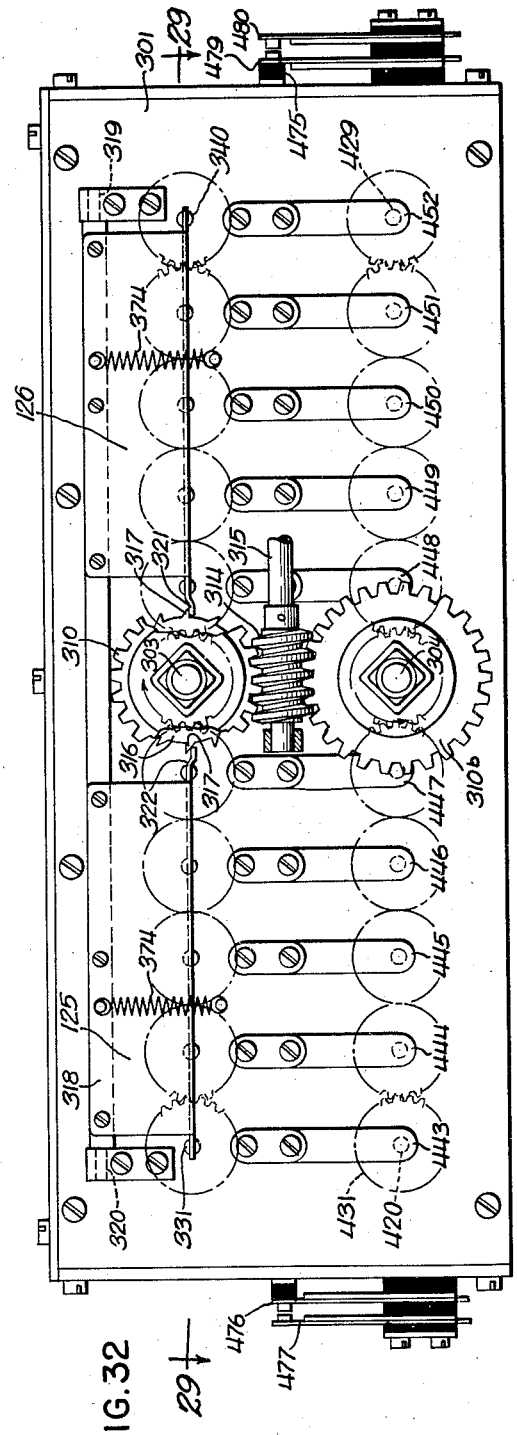

March 9, 1943.　　　L. M. POTTS　　　2,313,088
METER RECORDING SYSTEMS
Filed Jan. 7, 1938　　　23 Sheets-Sheet 11

LOUIS M. POTTS
*INVENTOR.*

BY

*ATTORNEY.*

March 9, 1943.    L. M. POTTS    2,313,088
METER RECORDING SYSTEMS
Filed Jan. 7, 1938    23 Sheets—Sheet 12

LOUIS M. POTTS
INVENTOR.

BY

ATTORNEY.

March 9, 1943.　　　L. M. POTTS　　　2,313,088
METER RECORDING SYSTEMS
Filed Jan. 7, 1938　　23 Sheets-Sheet 13

INVENTOR
LOUIS M. POTTS
BY
ATTORNEY

March 9, 1943.　　　　L. M. POTTS　　　　2,313,088
METER RECORDING SYSTEMS
Filed Jan. 7, 1938　　　23 Sheets-Sheet 14
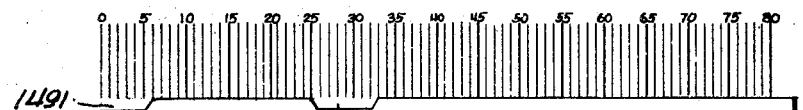
LOUIS M. POTTS
INVENTOR
BY
ATTORNEY March 9, 1943.    L. M. POTTS    2,313,088
METER RECORDING SYSTEMS
Filed Jan. 7, 1938    23 Sheets-Sheet 15

LOUIS M. POTTS
INVENTOR
BY
ATTORNEY.

March 9, 1943.  L. M. POTTS  2,313,088

METER RECORDING SYSTEMS

Filed Jan. 7, 1938  23 Sheets-Sheet 17

LOUIS M. POTTS
INVENTOR

BY
ATTORNEY

March 9, 1943.  L. M. POTTS  2,313,088
METER RECORDING SYSTEMS
Filed Jan. 7, 1938   23 Sheets-Sheet 18
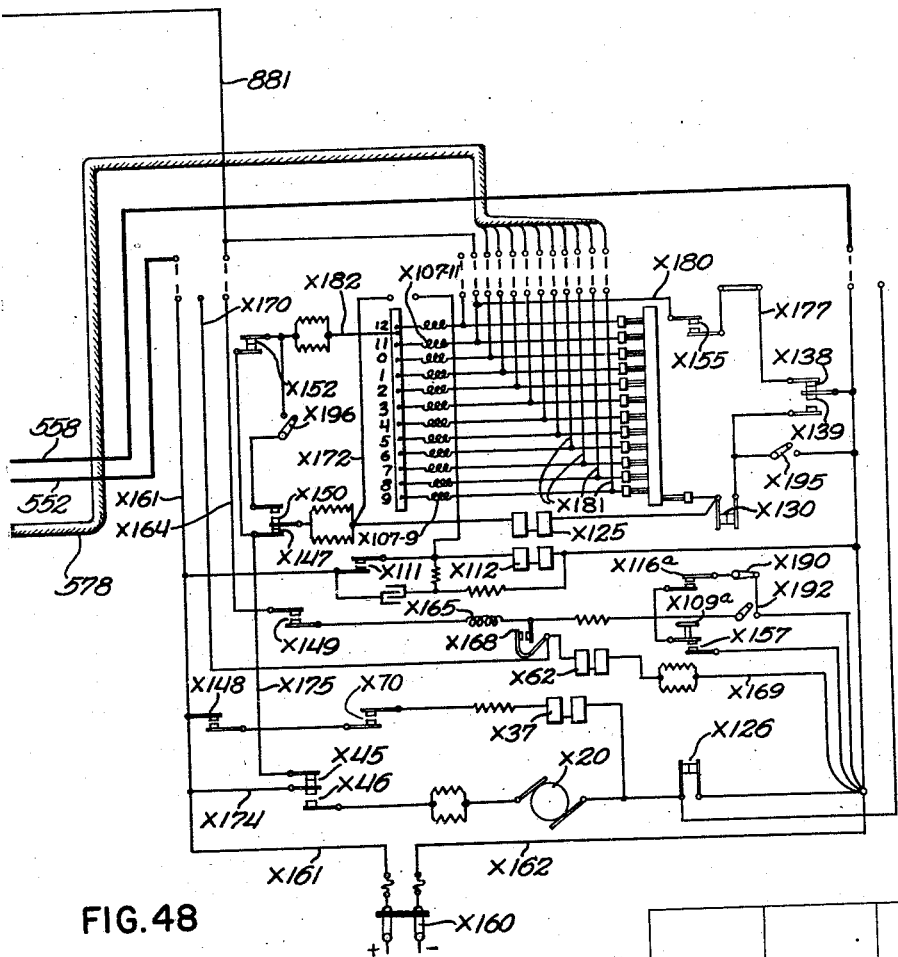
FIG. 48
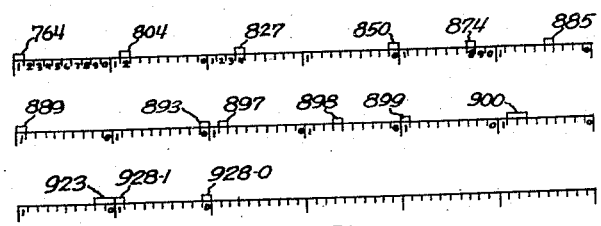
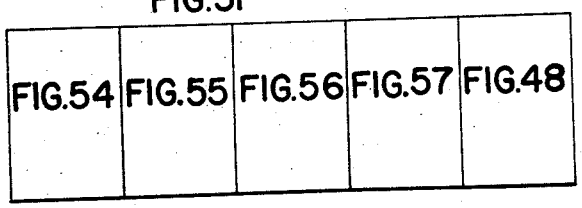
FIG. 51
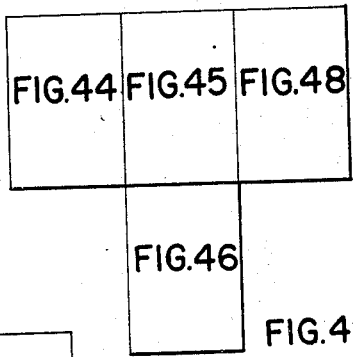
FIG. 50
LOUIS M. POTTS
INVENTOR
BY
ATTORNEY March 9, 1943.    L. M. POTTS    2,313,088
METER RECORDING SYSTEMS
Filed Jan. 7, 1938    23 Sheets-Sheet 19

LOUIS M. POTTS
INVENTOR

BY
ATTORNEY

March 9, 1943.  L. M. POTTS  2,313,088
METER RECORDING SYSTEMS
Filed Jan. 7, 1938  23 Sheets-Sheet 20

INVENTOR
LOUIS M. POTTS
BY
ATTORNEY

March 9, 1943.  L. M. POTTS  2,313,088
METER RECORDING SYSTEMS
Filed Jan. 7, 1938   23 Sheets-Sheet 22
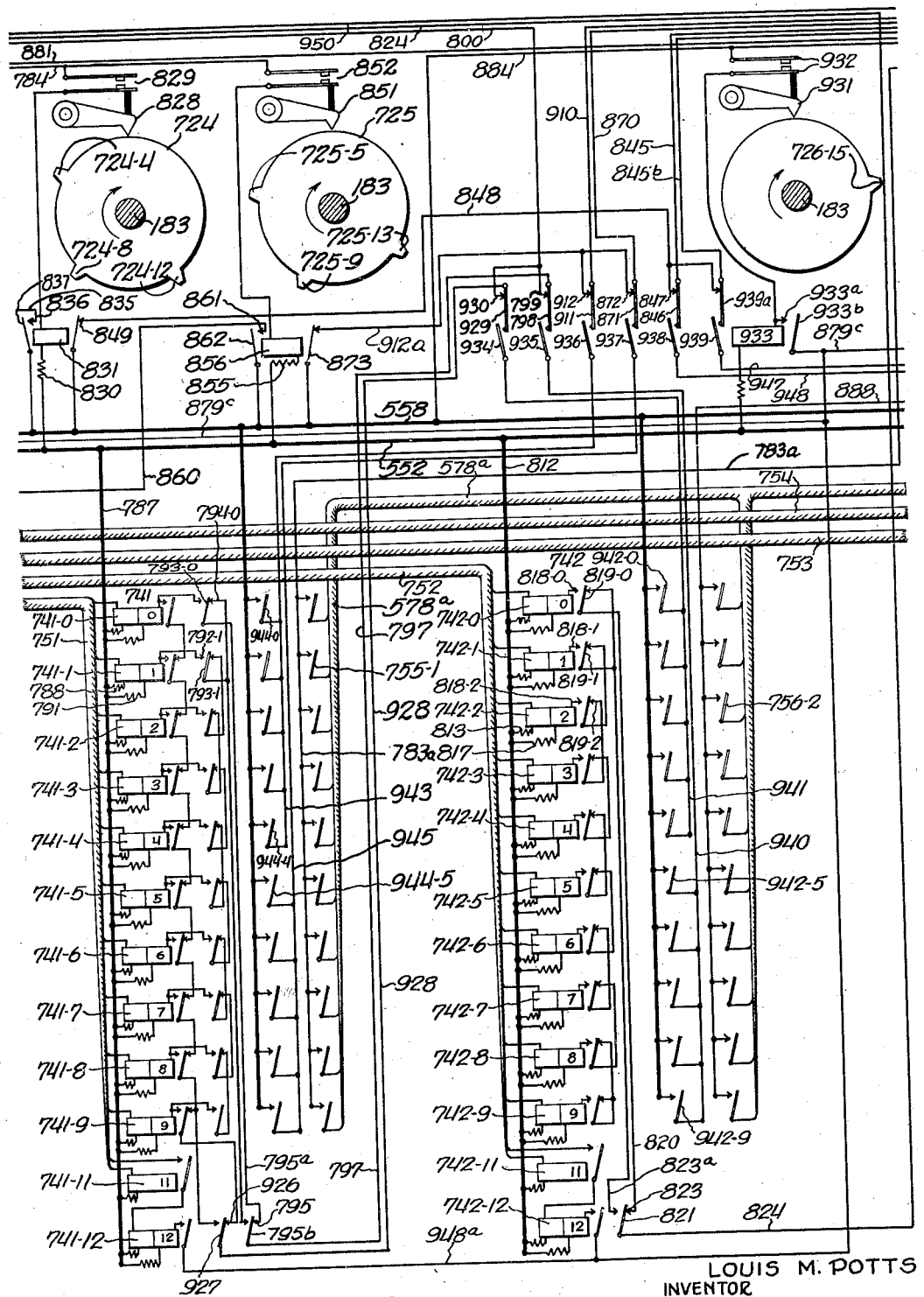
FIG. 56.
LOUIS M. POTTS
INVENTOR
BY 
ATTORNEY

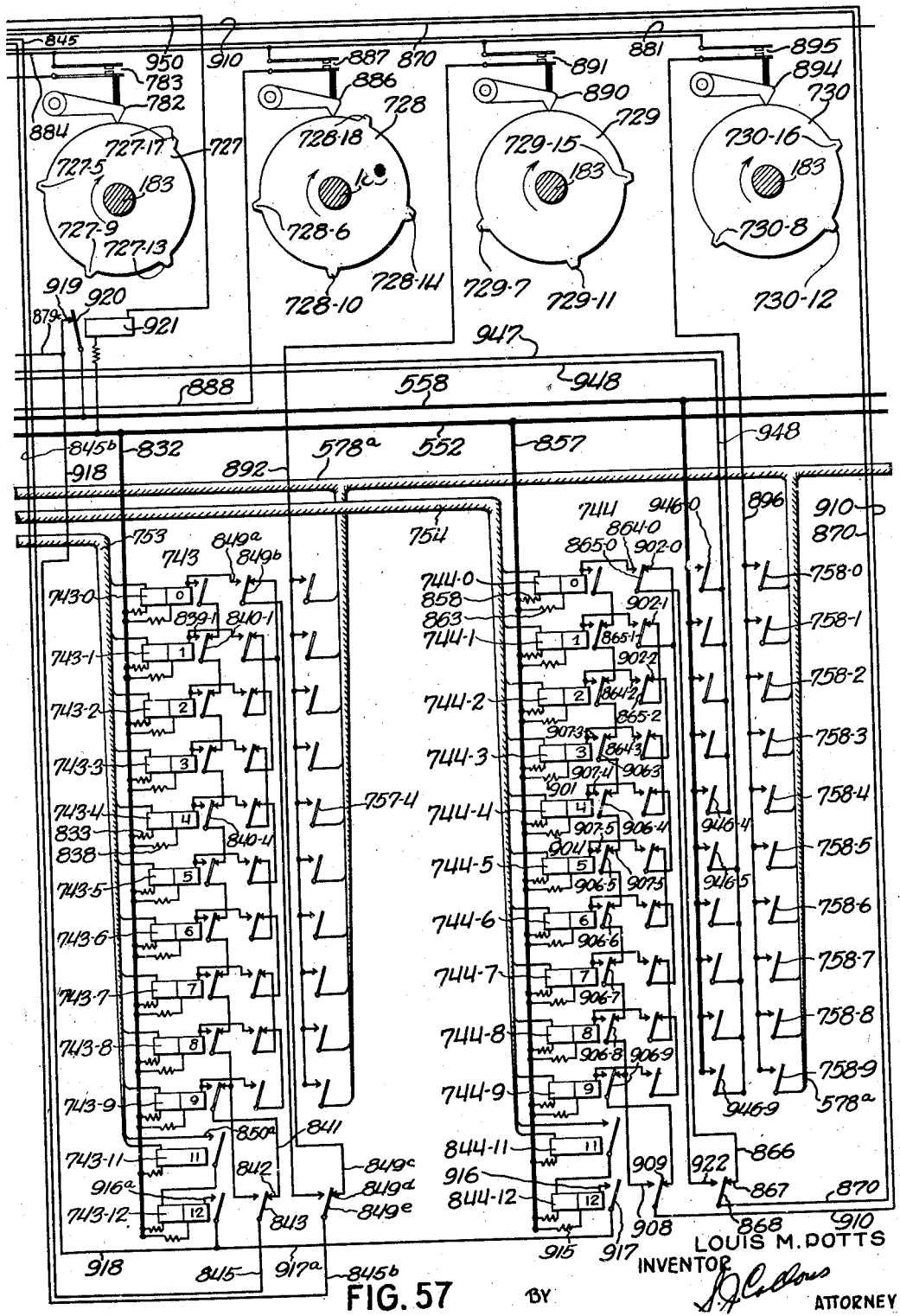

Patented Mar. 9, 1943

2,313,088

UNITED STATES PATENT OFFICE 2,313,088

METER RECORDING SYSTEM

Louis M. Potts, Evanston, Ill.

Application January 7, 1938, Serial No. 183,861

33 Claims. (Cl. 234—58)

The present invention relates to a system of meter reading, and particularly to apparatus for making control records under the supervision of a meter.

The subject matter of the present application constitutes an improvement upon and is related to the subject matter of United States Patent No. 2,148,500.

In accordance with the conventional practice, meter reading is manually conducted by individual inspectors who travel established routes visiting and observing a number of stations and taking down pencil notations of readings of individual dials. These manually recorded notations are then delivered to an accounting department, where they proceed through a series of clerical entries, from which the necessary calculations are made from these records and from previous records, and as a result of which statements are billed for the service or commodity rendered. Innumerable problems are presented in promoting the facility and accuracy throughout the various manual steps from the point at which the meter is read until that at which the statement is finally rendered. In more recent practices, there has been adopted the use of various classes of perforated cards which serve to control calculating, billing, and/or printing machines for reducing the number and fatigue characteristics of the manual operations.

While these improvements have resulted in diminution of certain labor problems, there are still found many practices which are not only disagreeable, slow, and fatiguing, but which also admit of a relatively high factor of error. To offset these elements, it is herewith proposed to simplify the meter reading procedure from the point at which the inspector confronts the individual meters to the point whereat the accounting and billing machine control cards are finally prepared.

Accordingly, the general object of the present invention may be stated as constituting the provision of a system and apparatus for accurately receiving a meter reading impression as by the use of a photographic record and for thereafter converting said record by the use of translating devices into a control form which may later be used for controlling the operation of certain well-known types of statistical and accounting machines.

In meter reading devices it has become conventional to employ dial indicators in which each dial represents a numerical integer, so that several dials indicate numerically a quantity reading. Moreover, in accordance with well-known conventions, the dials are continuously geared so that a unit revolution of one manifests itself by a proportional rotation of its adjacent one sequentially. As a result of this practice, the indicator of each dial displays by a proportionate increment the partial movements of its adjacent dial in an inverse sequence. Contrasting with this practice, calculating and accounting machines are provided with integer elements whose movement is periodic and is responsive to the movement of its adjacent dial only after the latter has consummated a predetermined amount of its movement, usually a single revolution. In attempting to reconcile the former described principle of operation to the use of the conventional practice in calculating and accounting machines, there may be encountered frequently certain marginal conditions at which a reading may find certain ones of the indicators critically divided between two possibilities. To an inspector, the true reading is conveyed by imputation; that is, the indication of the lesser numerical integer will inform him how to construe its adjacent and higher indicator.

Accordingly, another object of the present invention is to reconcile to the use of conventional calculating machine practice the fractional increments and to abate the possibility in the case of critical or marginal readings of imputing the wrong integer value to an indicator.

In carrying out the incidents and practices of the present invention there is contemplated the use of a portable camera which is to be carried by the inspector during his tour of inspection. The camera is applied to the meter in accordance with an alignment safeguard, and the reading is executed by the pulling of a trigger, which causes a camera shutter to open momentarily, recording upon a small frame of film the reading on the face of the meter, the identification number of the meter, etc., and, preferably too, the identification number of the camera, which is discernible by a number assigned to each inspector individually. Other items of information which might be incorporated may be provided for by adding to the number of indicating elements presented before the camera. Such changes are deemed to be merely matters of arrangement. The film is preferably comprised of a continuous roll, such as motion picture film, and the frames are automatically advanced as each record impression is obtained.

At a central office, numbers of such films may be assembled and introduced into a photo-electric scanning device. A signal storage and translating device, and a card perforating device, which may be variations of well-known apparatus adapted to the use of certain features taught by the present invention, are controlled by said films, after they have been developed and fixed. The film is fed progressively, displaying its miniature records in succession before a scanning area where its image is projected upon a photo-electric element. Thereat during the translation there is incorporated the aforementioned cumulative dial correction, following which impulses are stored in a storage device. A card perforating mechanism produces a card having a distribution of perforations corresponding to the storage reading; and, in accordance with mechanisms which are well known in the art, these cards are employed in the control and supervision of diverse calculating and billing machines.

A more detailed description of the several devices employed in carrying out the present invention will be set forth hereinafter in connection with the accompanying drawings, in which like reference characters represent corresponding parts throughout, and in which Fig. 1 is an elevational view of a meter face which shows an arbitrary arrangement of indices to illustrate the application of the present invention thereto;

Fig. 3 is a plan view of the camera unit with portions thereof broken away;

Fig. 4 is a longitudinal section taken approximately on line 4—4 of Fig. 3;

Fig. 7 is a wiring diagram of a lighting system used for making the exposures;

Fig. 12 is a plan view of the scanner apparatus;

Fig. 13 is a side elevational view of the scanner apparatus;

Fig. 14 is a detail view of the scanner clutch release mechanism;

Fig. 15 is a longitudinal section of the scanning device, and is taken approximately on line 15—15 of Fig. 12;

Fig. 16 is a sectional view of the scanner taken approximately on the line 16—16 of Fig. 12;

Fig. 17 is a developed view illustrating approximately one-half of the scanning belt;

Fig. 18 is a sectional view of the rear end of the scanner, and is taken approximately on line 18—18 of Fig. 12;

Fig. 19 is a fragmentary sectional view on line 19—19 of Fig. 18 showing the intermittent feed mechanism for advancing the film;

Fig. 20 is a fragmentary sectional view taken on line 20—20 of Fig. 18 showing the operating levers for part of the scanning apparatus;

Fig. 21 illustrates a single revolution clutch mechanism such as may be used with the scanner apparatus;

Figure 28:
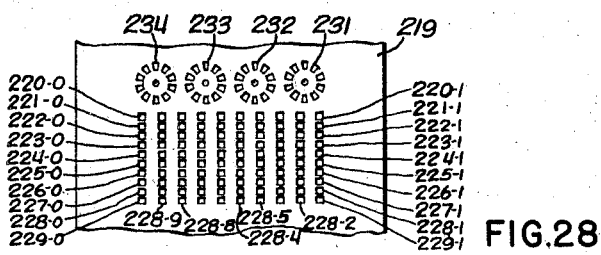
Figure 33:
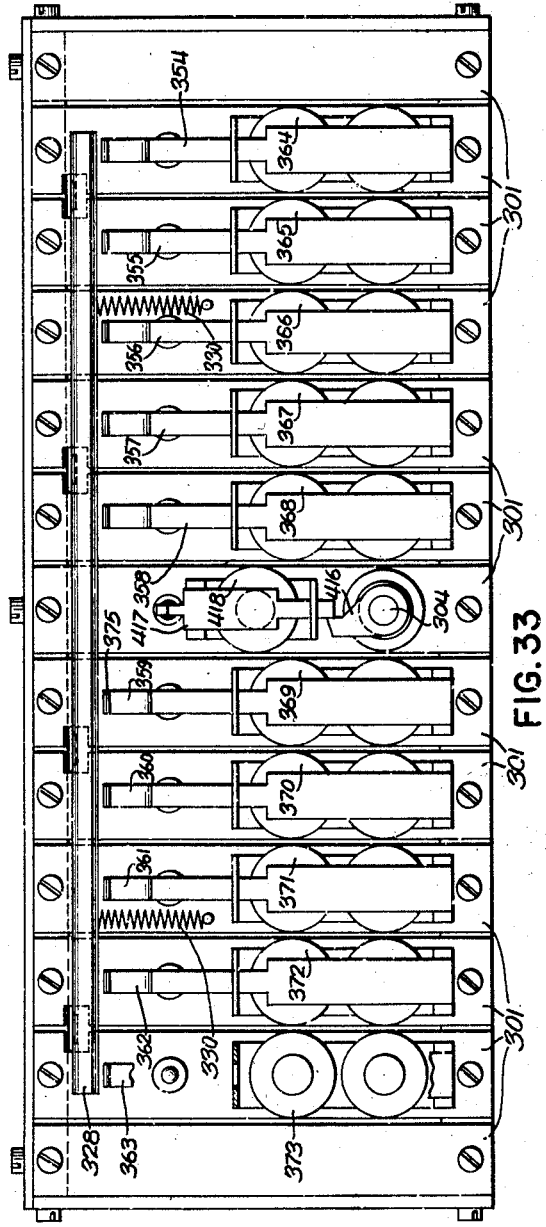
Figure 34:
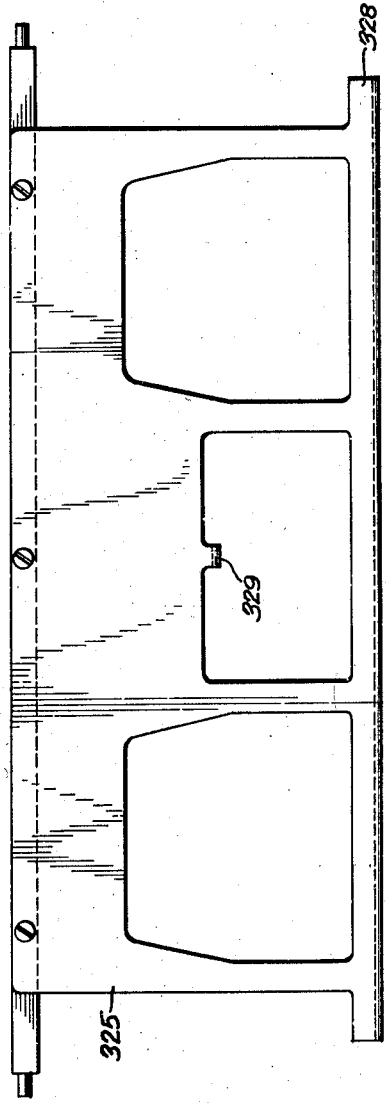
Figure 35:
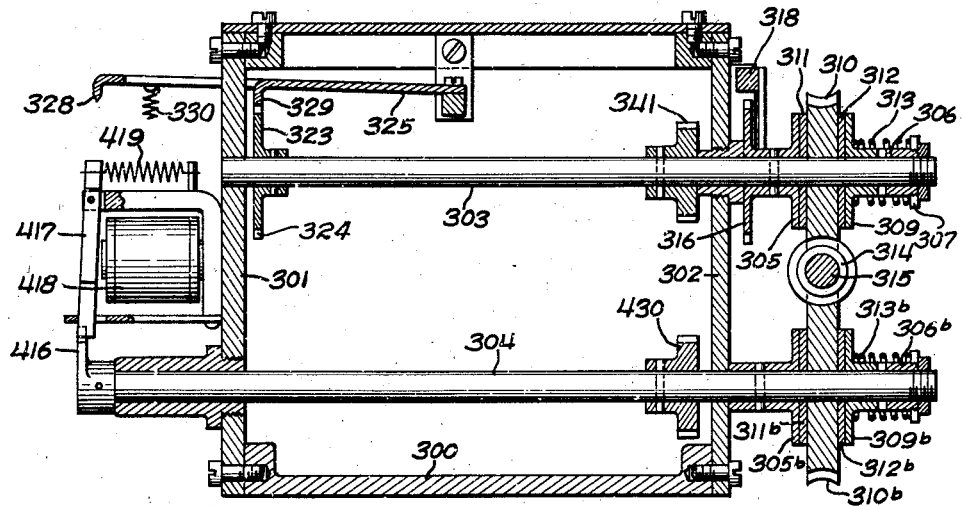
Figure 36:
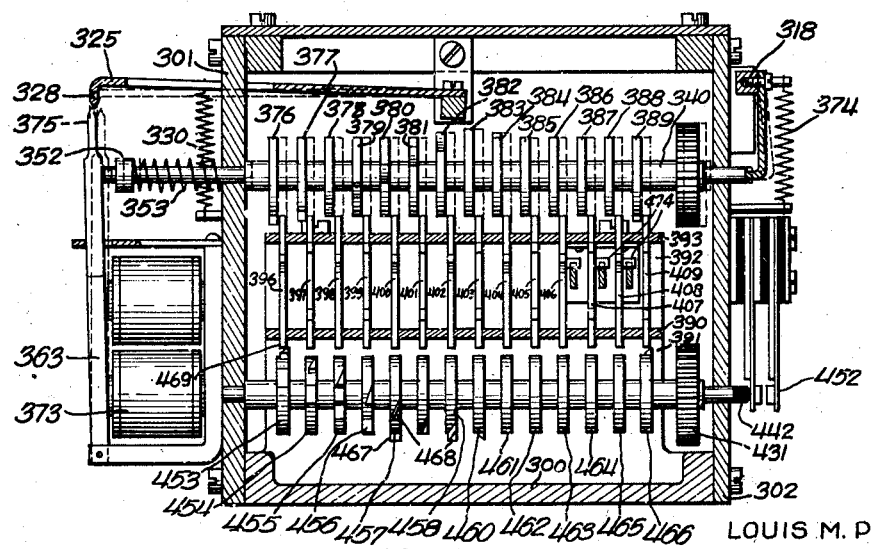
Figure 39:
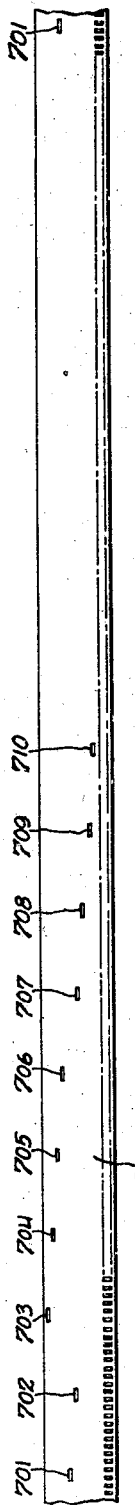
Figure 38:
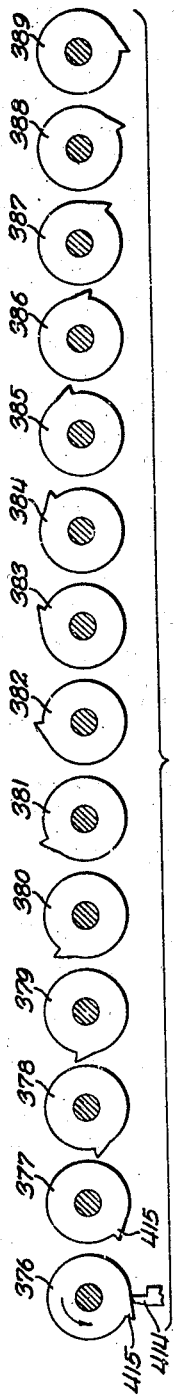
Figure 37:
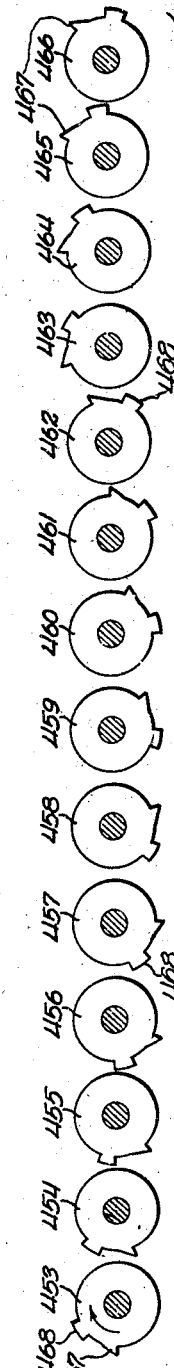
Figure 44:
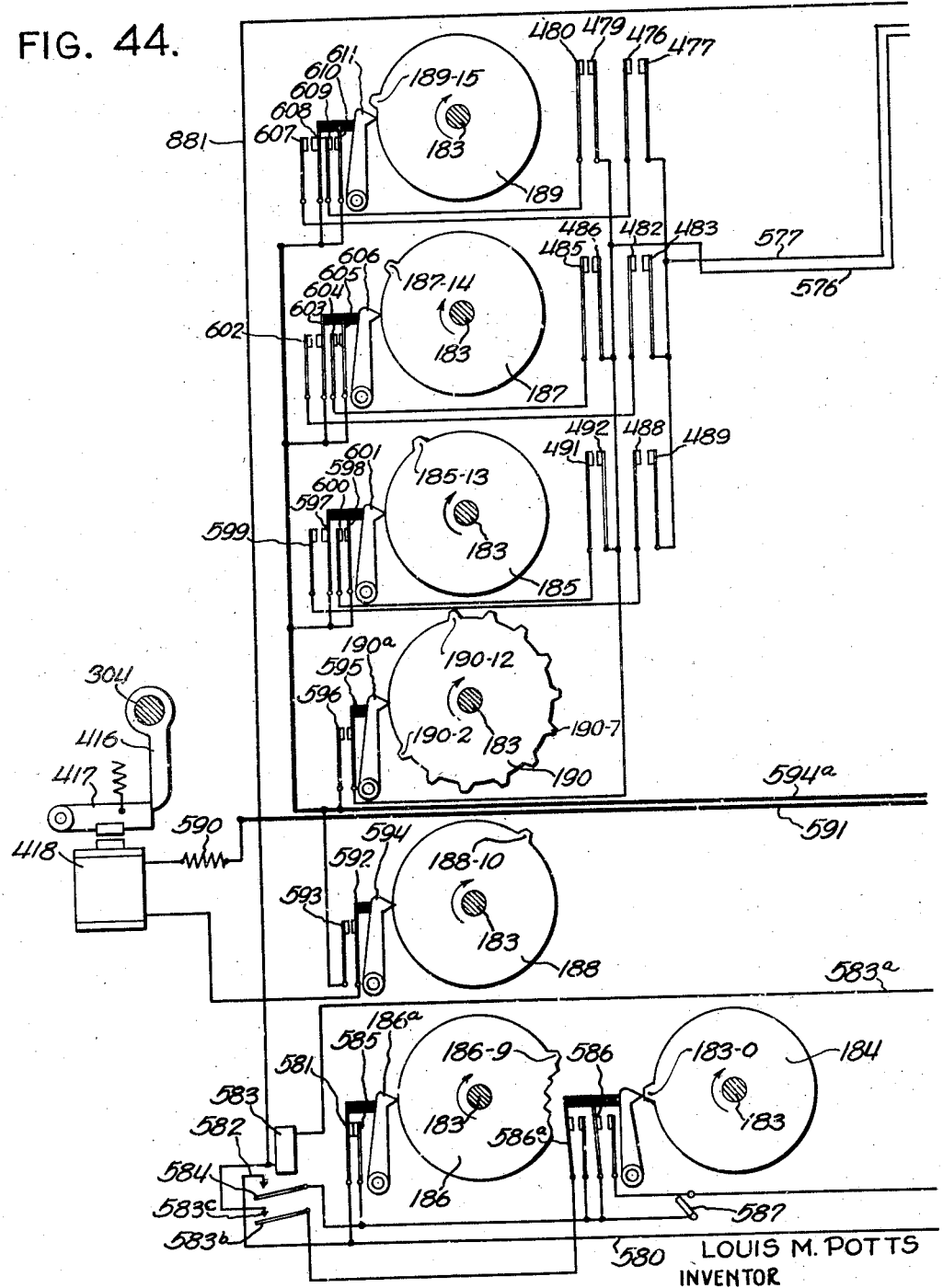
Figure 45:
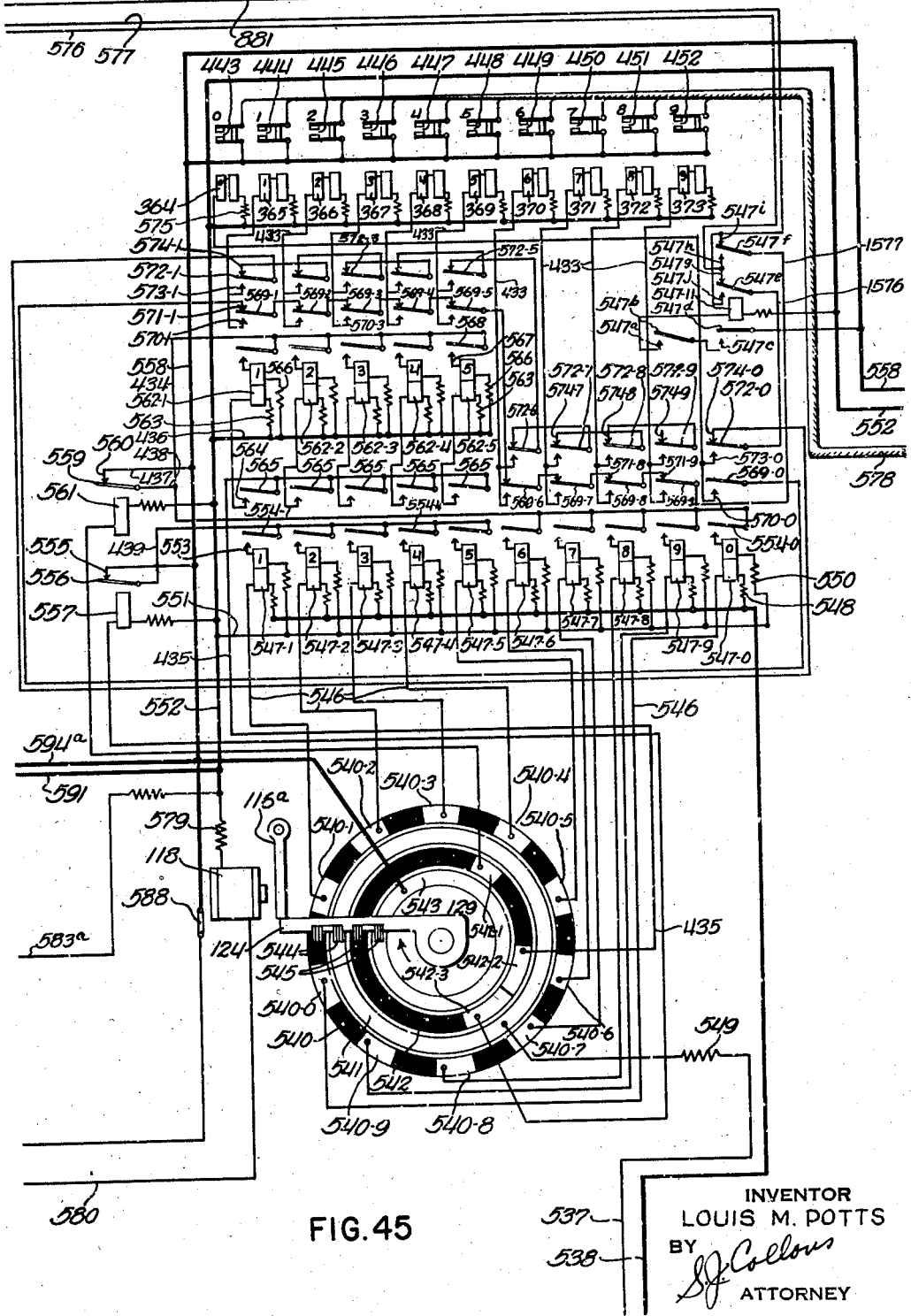
Figure 47:
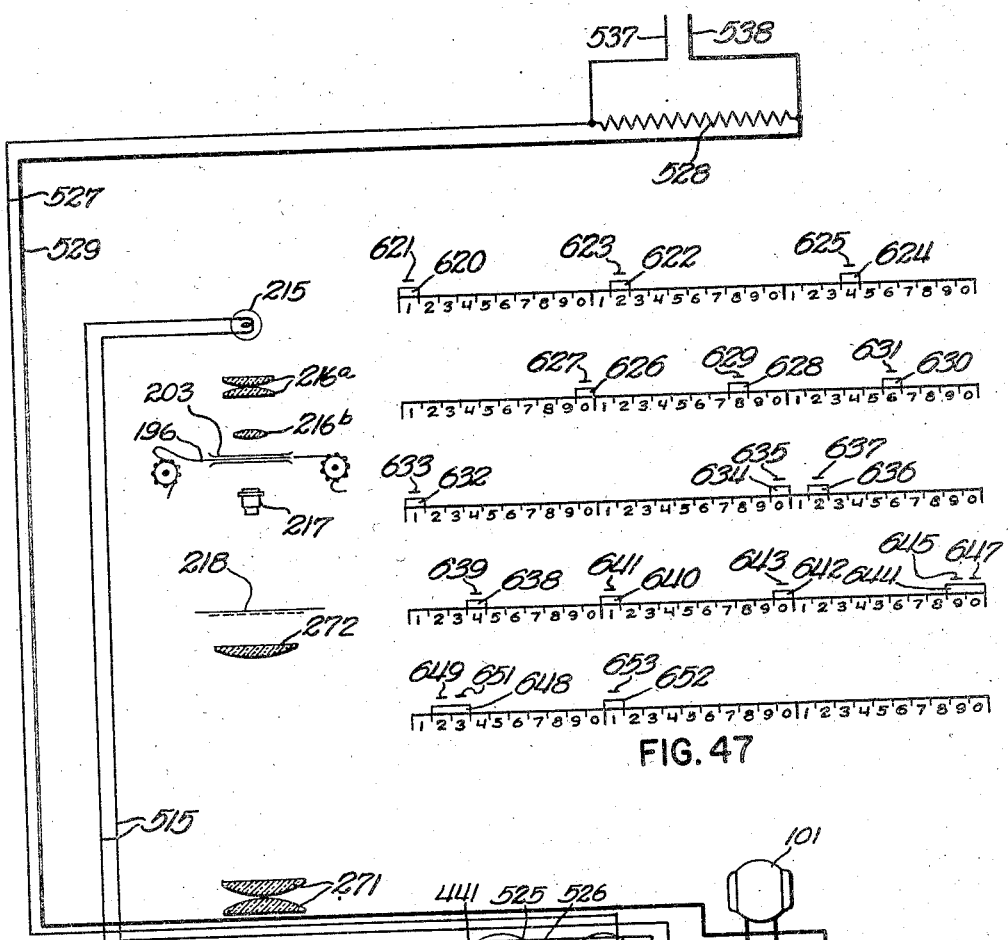
Figure 46:
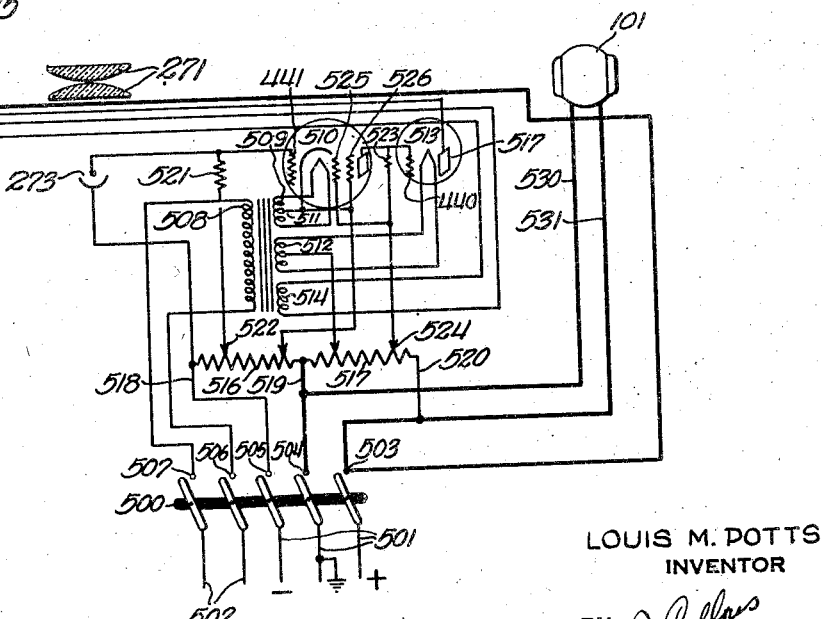
Figure 52:
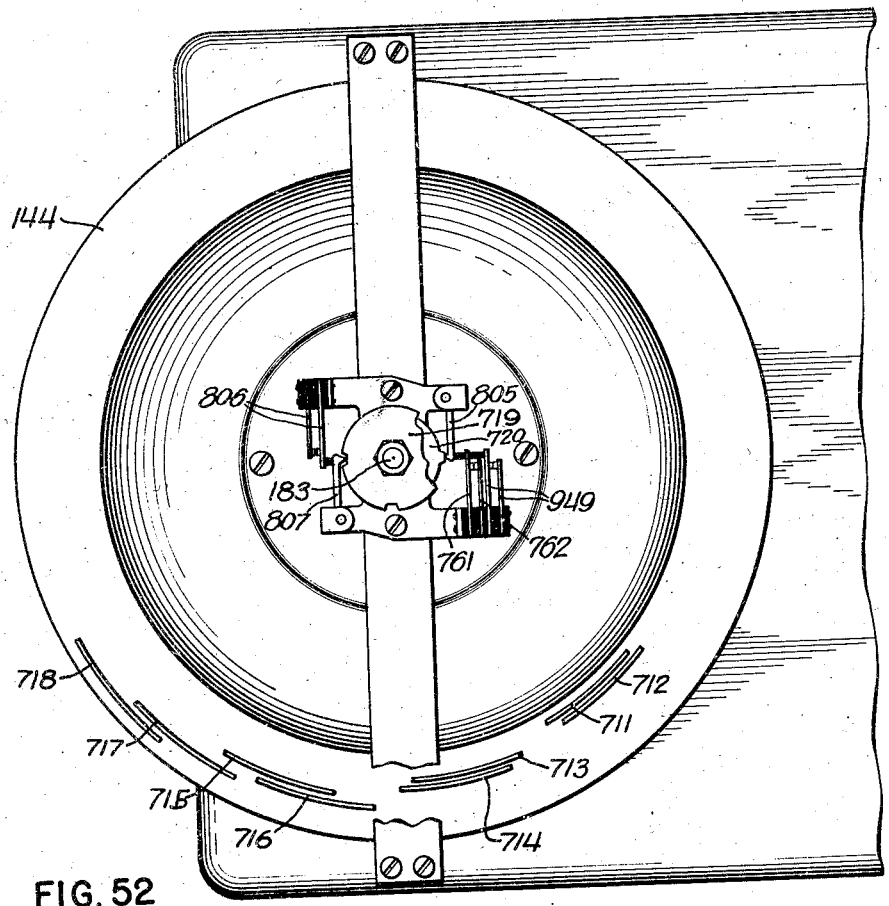
Figure 53:
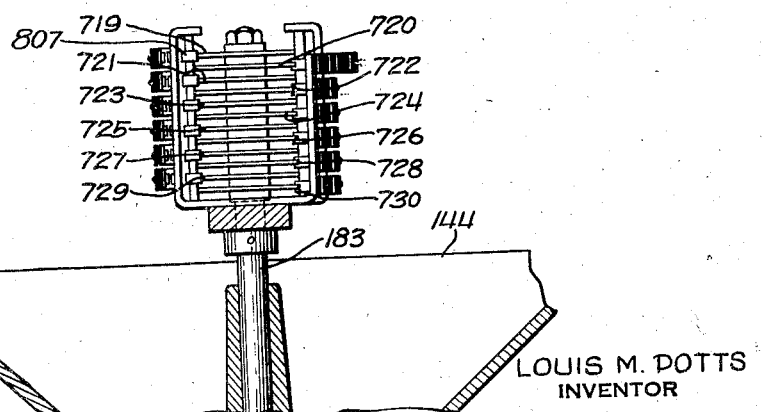
Figure 54:
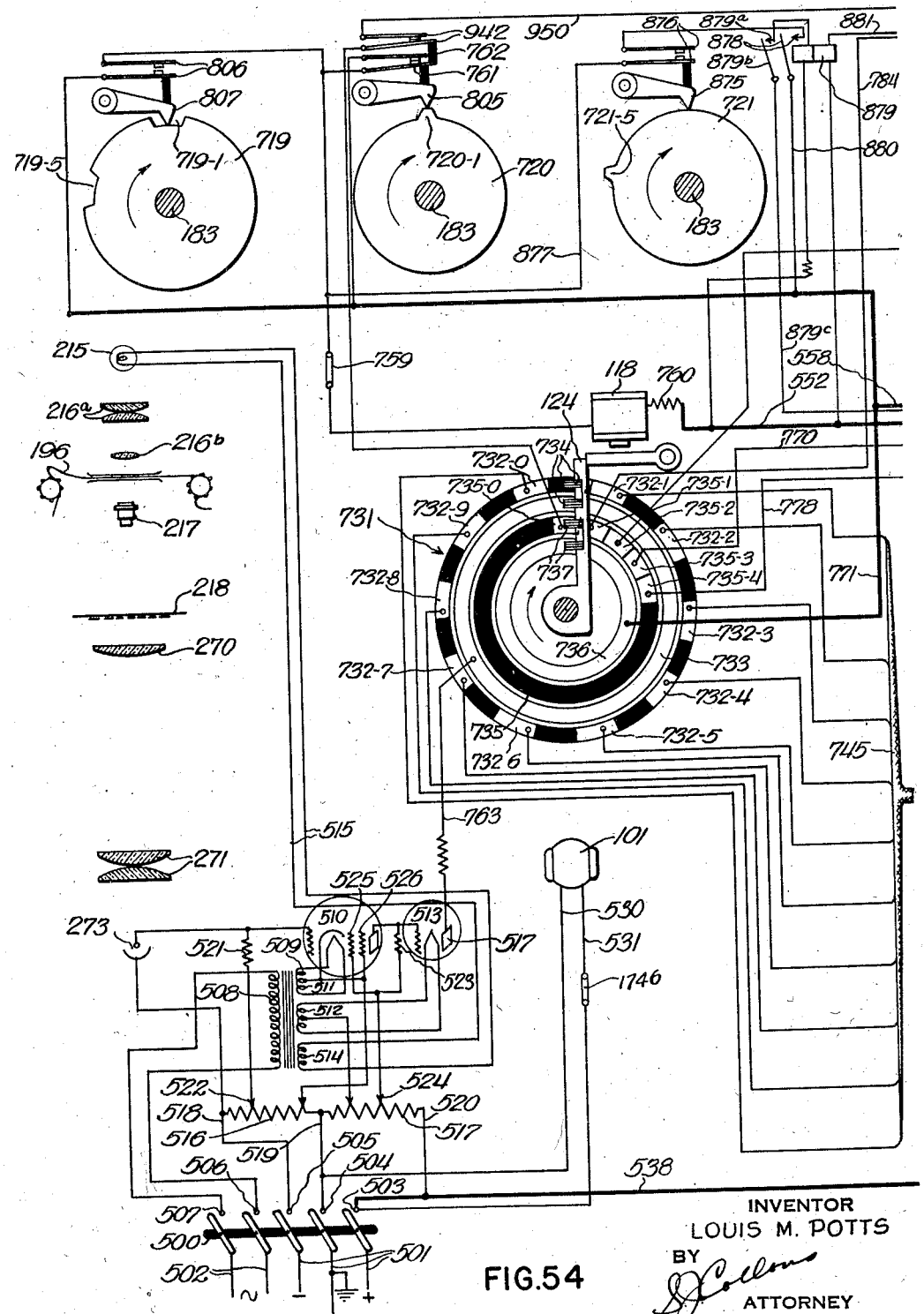
Figure 55:
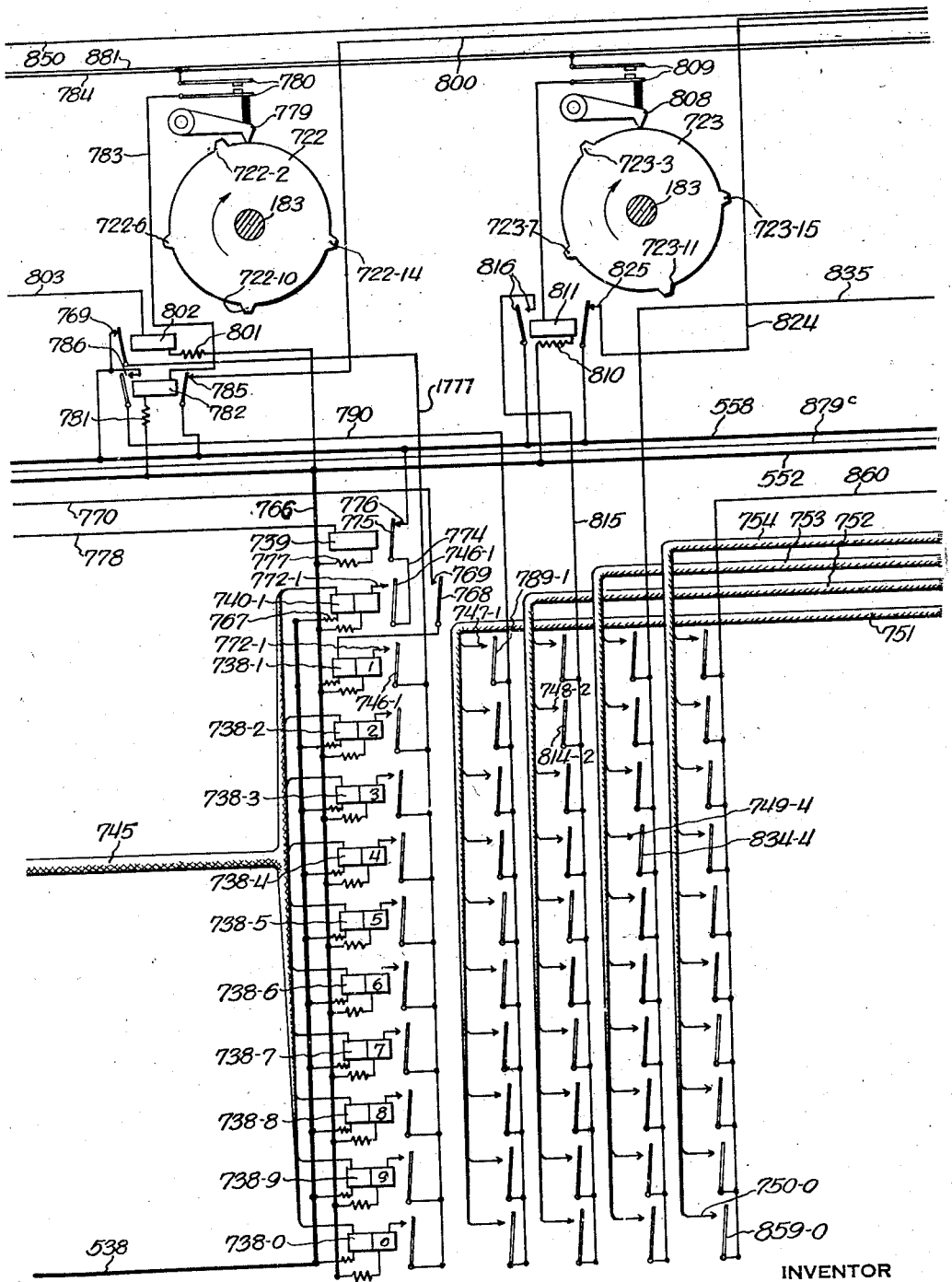

Figs. 24, 25, 26, and 27 illustrate the scanning shutters of one of the dials in several operated positions;

Fig. 28 is a detail view of the fixed plate of the scanner apparatus;

Fig. 29 is a plan view of the translator and storage unit partially in section on the line 29—29 of Fig. 32;

Fig. 30 is a fragmentary detail view featuring the escapement mechanism for the recording shafts;

Fig. 31 is a side sectional view taken approximately on the line 31—31 of Fig. 29;

Fig. 32 is a side elevational view of the power transmitting side of the translator;

Fig. 33 is a side elevational view of the translator looking in the opposite direction to that of Fig. 32;

Fig. 34 is a detail view of the locking ball for the magnet armatures;

Fig. 35 is a transverse sectional view of the translator and is taken approximately on line 35—35 of Fig. 29;

Fig. 36 is a sectional view taken approximately on line 36—36 of Fig. 29;

Fig. 37 shows progressively one set of cams for transmitting the stored readings;

Fig. 38 shows progressively a set of cams on one of the shafts 331 to 340, which serves in setting the storage elements;

Fig. 39 is a developed view of approximately one-half of the scanning belt which may be employed in accordance with a modified method of operation;

Figs. 40 and 42 show record cards perforated with a previously stored reading;

Fig. 41 illustrates a record card which resembles the one in Fig. 40, but upon which there has been applied a subsequent reading;

Fig. 43 is a diagrammatic view of a pair of skip bars associated with the card perforator;

Fig. 44 is a portion of the wiring diagram which features the timing cams of the scanner apparatus;

Fig. 45 is a portion of the wiring diagram which features the commutator, the storing relays, and the translator circuits;

Fig. 46 is a portion of the diagram featuring the photo-electric element control circuit;

Fig. 47 is a diagrammatic representation of typical signals transmitted by the scanner apparatus;

Fig. 48 is a portion of the electrical circuit featuring the card perforator apparatus;

Fig. 48 is a pattern chart showing how the circuits of Figs. 44, 45, 46, and 48 may be assembled to constitute a complete wiring diagram;

Fig. 50 is a pattern chart showing how the circuits of Figs. 54–57 and 48 may be assembled to constitute a complete wiring diagram which features a modified method of operation;

Fig. 51 illustrates by example certain impulses generated by the scanning device for accomplishing a modified method of operation;

Fig. 52 is a plan view of a scanning apparatus drum for a modified method of operation;

Fig. 53 is a fragmentary sectional view showing the apparatus featured in Fig. 52;

Fig. 54 illustrates a circuit including the photoelectric element for a modified method of operation; and Figs. 55-57 illustrate other parts of the electrical circuit shown in Fig. 54.

Meter

Figure 1:
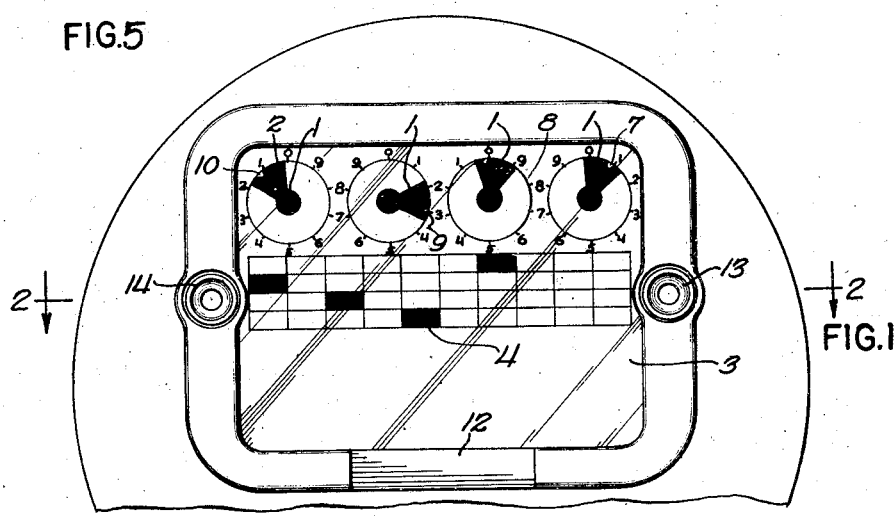
Figure 2:
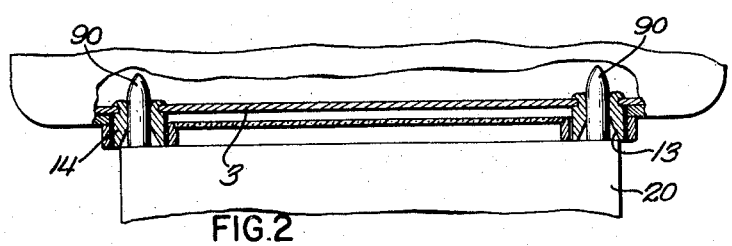
Fig. 2 is a sectional view taken approximately on line 2—2 of Fig. 1 with the meter reading camera applied thereto.

In the illustration of Figs. 1 and 2, there is featured a conventional type of service meter adapted for use with a system of meter reading featured in the present embodiment. The indicator pointers 1 are illustrated as having enlarged or fan-shaped terminals 2 for the purpose of having a greater margin of safety.

A rectangular space on the dial face is divided into four rows, each of which is transversely subdivided into ten spaces. The dial face plate 3 may be provided with a series of blackened marks 4 individually arranged to represent the digits of an identification number or other characteristic of the particular station meter, or, if desired, it may represent any other collateral information. As contemplated, the upper divided row is assigned to a thousands digit of the identification number and the particular digit may be determined by the transverse position of the blackened mark reading in sequence from left to right. In a similar manner, the second row corresponds to the hundreds digit, the third to the tens digit, and the fourth to the units digit. In accordance with the arbitrary illustration, the particular meter number is 4086.

Marks 7, 8, 9, and 10 may be provided on each pointer 1 for affording a direct reading index. This mark will occur in the correct circumferential position on the large end 2 of the pointers so that the direct reading thereof will correspond to the photo-electric translated reading. This mark may occur in any angular position upon the indicator in accordance with the arrangement of the particular scanner. When a fan pointer 1 approaches a position where it may span the area from one numerical position to an adjacent one, the two numbers will be recorded upon the film. The translating device provides a means for distinguishing between two such numbers the particular one whose reading is consistent with that of its adjacent indicator next lower in the numerical sequence.

A notch 12 occurs in the frame surrounding the meter face within which there is received a projecting portion of the camera. Two dowel sockets 13 and 14 at opposite ends of the face are adapted to receive dowel pins carried at the foremost portion of the camera for the purpose of insuring accurate alignment of the camera and meter. The dial numerals have been illustrated without the circular space occupied by the dials rather than within this space in order that the pictorial impression may feature a circular blank area bounding the adjacent sides of the fan-shaped pointer. The sharp black and white contrast on the photographic negative which is subsequently scanned for the dial reading will assure that no light may pass except in those positions occupied by the pointers. By this arrangement, no light will be permitted to pass the area of the circular dials except those made by the indicators.

Camera

Figures 5, 6:
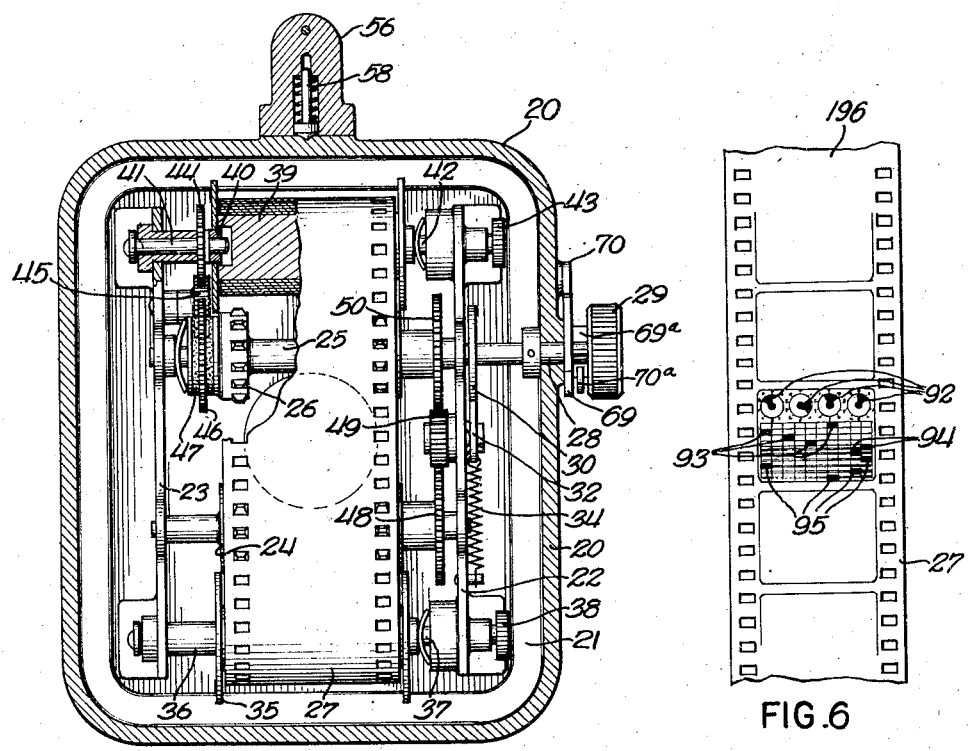
Fig. 5 is a transverse sectional view taken approximately on line 5—5 of Fig. 3.
Fig. 6 illustrates a fragment of film record in which but one of the record frames has been illustrated as fully developed.

Referring now to Figs. 3 and 5 particularly, there will be noted a box or housing 20 having at one end thereof a light-tight compartment 21, within which there are disposed two side plates 22 and 23. Twin feed rolls 24 and 25 are pivotally mounted between the aforementioned side plates, and each of said rolls has a plurality of sprocket feed teeth 26 in the manner of conventional motion picture film sprocket wheels. Standard motion picture film may be employed for the purpose of carrying out the present invention and each picture frame may serve to accommodate a complete individual record as shown in Fig. 6. Where more intricate systems of accounting or recording may be involved, several frames may serve compositely. Feed roll 25 is carried upon a spindle shaft 28, one end of which extends through the wall of housing 20 and is thereat provided with a control knob 29. Within the case 20 the extended portion of spindle 28 has secured to it a small disc 40, Fig. 4, having spaced peripheral notches 31 into which there may be received a detent projection 33 of a jockey lever 32 as normally urged by the jockey spring 34. The spacing of notches 31 is predetermined in accordance with the dimensions of the individual picture frames so that the movement between successive notches 31 will advance accurately successive picture frame areas before the exposure position.

The unexposed film is drawn from an arbor 35 carried upon a shaft which is pivotally supported at its ends upon a fixed pintle 36 and a yieldable or spring-loaded pintle 37 which may be withdrawn by grasping its end knob 38 in a manner familiar in the art of photographic cameras. A take-up spool 39 is similarly supported between the end plates 23 and 24, upon a stub shaft 4 and a yieldable pintle 42 having a small knob 43. The take-up spool 39 is not merely a tensioned idler but its pintle 41 pivotally supports a gear 44 having a dog 40 which cooperates with an opening in the spool 39. Gear 44 is driven through an idler 45 by a frictionally held driving gear 46 supported between fritcion slip washers 47 on shaft 28.

It may be noted that by means of the aforedescribed arrangement, the turning of knob 29 positively pulls the web of film because it is engaged with sprocket teeth 26, while through the gears 46, 45, and 44, the exposed film may be wound taut upon the take-up roller 39, the gear ratios being such that a sufficient over-travel is permitted to compensate for the relatively smaller diameter of the first turns as compared with the increased diameter of the subsequent turns of the exposed film. The tape feed rolls 24 and 25 are geared together through a train comprising gears 48, 49, and 50.

Within an opening in a foremost partition 51 segregating the light-tight compartment 21 from the major interior of the housing 20 there is mounted a photographic lens and shutter unit 52 whose timing and adjustment are predeterminedly set. A release arm 52a moves in one direction to actuate the shutters. The center of the lens unit aligns photographically with a limited film area betwixt the rollers 24 and 25. Behind the film and opposite the partition 51 is a cover plate 53, Fig. 3. This plate 53 constitutes a light-proof cover and is held in place by withdrawable or shiftable retaining clips 54 and 55 (see Fig. 6) to afford accessibility for film replacement.

As a convenience for carrying the camera unit there is contemplated a pistol-grip handle 56 pivoted to the case 20 by a hollow shoulder screw 57, Fig. 4, and detented in an aligned position by means of a spring-loaded detent plunger 58, the nose of which is seated within a suitable depression on the surface of the frame 20. Upon overcoming the detent action of plunger 58, the handle 56 may be swung to one side as illustrated by the dotted outline in Fig. 3, making the cover plate 53 accessible. The exposure action may be controlled by means of a trigger 59 pivoted at 60 and terminating with a projection which engages an enlarged tip of a plunger 61. The opposite end of plunger 61 urges against one arm of a bell crank 62 whose other arm rests against a plunger 62a housed concentrically of the shoulder screw 57.

Figure 8:
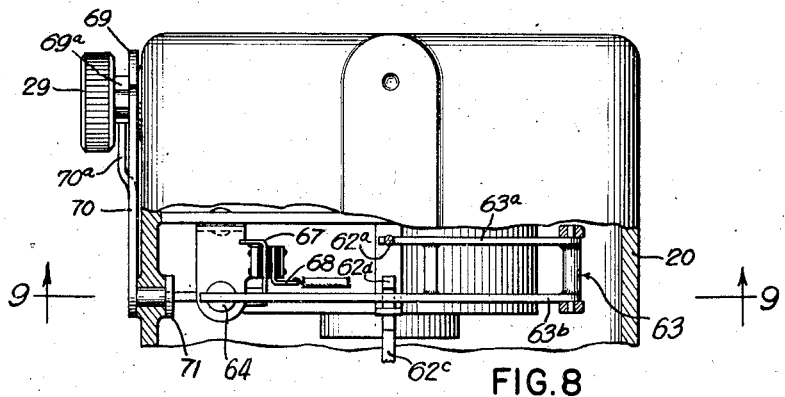
Fig. 8 is a plan view of the end of the camera looking in a direction reverse to that of Fig. 3 and having part of the camera case and pistol grip broken away.
Figure 9:
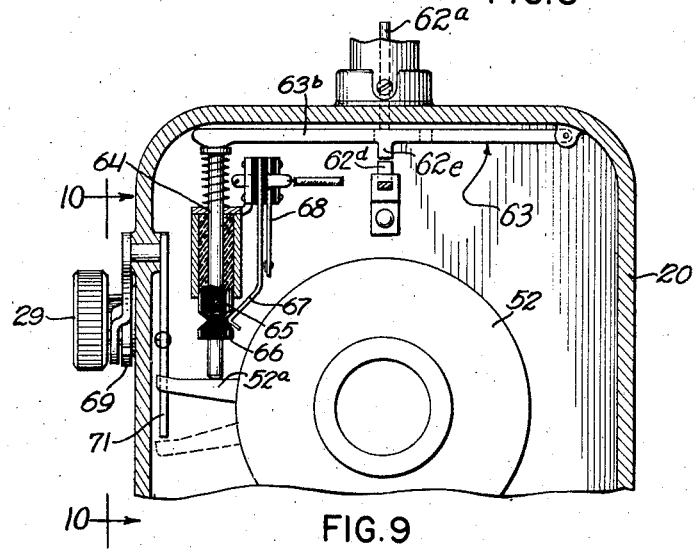
Fig. 9 is a partial section of the camera and is taken approximately on line 9—9 of Fig. 8 featuring the shutter operating mechanism.

Referring now more particularly to Figs. 8 and 9, it will be noted that plunger 62a rests upon one arm 63a of a pivoted yoke while its companion arm 63b extends across the top of the housing and rests with its free end upon a spring-loaded plunger rod 64 whose twofold function is to control a contact pair 67—68 and to depress the shutter arm 52a aforedescribed. For the purpose of controlling the contact pair 67—68, plunger 64 is provided and an insulating collar 65 having an annular groove 66. An offset portion of contact spring 67 extends into the groove 66 in the unactuated position of plunger 64, but upon its depression, the enlarged side wall of groove 66 cams spring 67 into engagement with its associated contact spring 68 for a purpose to be noted hereinafter.

Figures 10, 11:
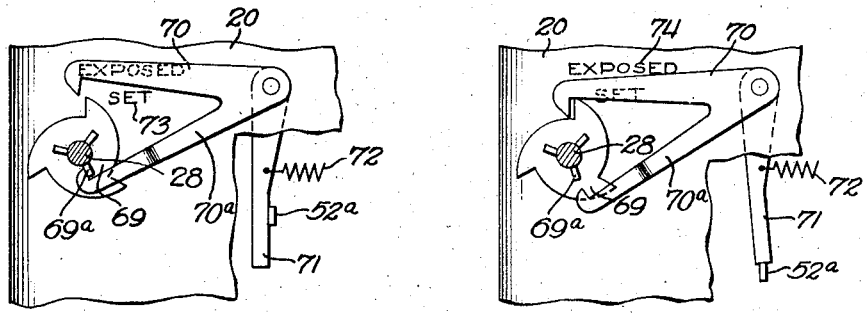
Fig. 10 is a fragmentary sectional view taken approximately on line 10—10 of Fig. 9, showing the reset mechanism in so-called set position.
Fig. 11 is a fragmentary sectional view similar to Fig. 10, but showing the reset mechanism in so-called released position.
Figure 22:
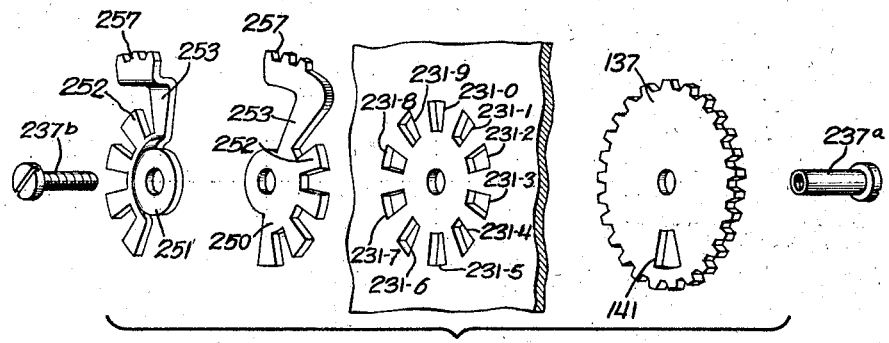
Fig. 22 is an exploded perspective view of the dial-scanning shutter mechanism.

Adjacent knob 29 and secured to shaft 28 there may be noted a disc cam 69, Figs. 5 and 8-11, the periphery of which affords three equally spaced involute apices, and alongside which there are secured to shaft 28 three equally spaced radial vanes 69a. On the outside of housing 20 a pallet lever is pivoted having two arms, the lower one of which is indicated 70a and the upper 70. An arm 71 is secured to a shaft common to said pallet lever, and a spring 72 urges the assembly in a counterclockwise direction as viewed in Figs. 10 and 11. The lowermost extremity of lever arm 71 is presented in the path of shutter trigger 52a, Fig. 9. With the shutter in its normal position as seen in Fig. 10, spring 72 is restrained from influencing the assembly, but upon the actuation of trigger 52a, moving it into the dotted outline position of Fig. 9, spring 72 is freed to rotate the assembly counterclockwise into a position such as illustrated in Fig. 11. Thereupon arm 71 overlies shutter arm 52a as seen in Fig. 11, preventing its return and therefore its double actuation as through inadvertence. The upper arm 70 is aligned with the apices of cam 69, but the lower arm thereof is offset to avoid cam 69 and engage the vanes 69a. Upon rotating shaft 28 to present a new film, an involute apex of cam 69 cams lever arm 70 upwardly and against the influence of spring 72. This withdraws the tip of arm 71 from the path of trigger 52a, permitting the latter to respond to the influence of its return spring (not shown) and be moved back behind arm 71 to reload the shutter. Meanwhile, the degree of movement of shaft 28 is limited when one of the vanes 69a encounters the shouldered extremity of arm 70a. Further rotation of shaft 28 must then await the reactuation of trigger 52a. In this way arm 71 provides a safeguard against the double actuation of trigger 52a while the arm 70a provides a safeguard against feeding out an excessive quantity of film. Suitable legends "exposed" and "set" may be provided to apprise an operator visually of the condition of the camera.

For the purpose of photographically illuminating the indicator dial there are provided a pair of flashlight bulbs 80 and 81, Fig. 4, each having a reflector 82. Current is supplied to each of the bulbs 80 and 81 from dry cells 77 which are supported in suitable clamping members and which may be inserted and removed through port openings in the case 20 normally sealed by the screw caps 75 and 76, Figs. 3 and 4. Spring-tensioned contact elements 78 and 79 engage the terminals of cells 77, effecting a circuit as illustrated in Fig. 7, the closure of which is under the supervision of the aforedescribed contact springs 67 and 68.

The front portion of the camera is separable from the main body portion 20 and is hinged at 84 thereto. A detent spring 84a cooperating with a lug formation in the case 20 maintains the front portion 83 securely in alignment. This construction permits accessibility for cleaning and replacement of parts. A gate 85 is hinged at 87, Figs. 3 and 4, so as to be swung into and out of its normal position as illustrated in Fig. 4. Within dove-tail grooves 88 transversely of the gate 85 there may be slid into position colored markers 89 of size and arrangement to serve as numeral representations in a manner similar in appearance to the index marks 4 aforementioned in connection with the dial identification means. The markers 89 may be assigned to indicate meter identification, date, or any other information and may be changed by sliding them longitudinally to represent various integers or characters. The front face of the camera hood 83 is provided with a pair of dowel pins 90 spaced and proportioned to fit into the dowel sockets 13 and 14 provided on the meter frame (see Figs. 1 and 2).

As a safeguard against the inadvertent actuation of trigger 59 during transit or at other times when the camera has not been properly applied to a meter, there is provided a slidable release plunger 62b chambered in suitable openings of the hood 83. The inner extremity of plunger 62b engages a depending portion of a blocking bar 62c which is maintained by a spring 62f forwardly together with the sliding plunger 62b. An innermost projection 62d of bar 62c, Figs. 4, 8, and 9, is disposed in the path of a downward projection 62e integrally formed with the aforementioned lever arm 63b, preventing the latter from being rocked downwardly as when actuated by the aforedescribed mechanical train including trigger 59, plunger 61, etc. Only when the sliding plunger 62b is pushed back as by engagement with the face of a meter are the blocking bar 62c and its projection 62d moved back in opposition to spring 62f, freeing lever arm 63b so as to be responsive to the actuation of the pistol trigger 59.

The scanner

Figs. 12–28 illustrate a preferred embodiment of scanning apparatus. When a film such as that illustrated in Fig. 6 has been developed and fixed, it or a copy thereof is fed into a scanning mechanism as may be noted in Fig. 15. Here the film supply roll is illustrated by the reference character 201 and a film winding arbor by the reference character 200. This unit is provided with scanning or analyzing elements and with a photoelectric device for interpreting or converting the record images received by the recording tape into corresponding electrical impulses.

The scanner unit, Figs. 12 and 13, comprises a supporting frame 100 and an electric motor 101 upon whose rotor is a driving gear 102 meshing with a driven gear 103 idly supported on a longitudinal shaft 104, Fig. 21. It will be noted that driven gear 103 is provided with crown clutch teeth 107 adapted to mesh with similar teeth 109 in a sleeve member 108 from whose opposite end there extend sliding tenons 111 receivable within slots 112 in a collar 113 anchored to shaft 104. A clutch spring 114 urging between a flange formed intermediate sleeve 108 and the side of a cam 119a integral with collar 113 urges the sleeve leftwardly so that its teeth 109 may engage those 107 of driven gear 103. This tendency of spring 114 is resisted however when a surface cam 115 on sleeve 108 is engaged by the extremity of a control arm 116 fixed on a shaft 116a. Arm 116 is biased by a spring 119, Fig. 14, so that under dormant conditions sleeve 108 is withdrawn from engagement with gear 103. An armature 117 keyed to shaft 116a is operated by its magnet 118 to withdraw arm 116, permitting clutch spring 114 to influence sleeve 108 leftwardly, as viewed in Fig. 21. In order to overcome a chattering or singing condition characteristic of spring-loaded tooth clutches, a cam 119a is provided with a detent jockey 119b which passes over an apex extremity in its periphery and partially retards the return tendency as influenced by spring 114 in cooperation with the disconnect cam 115. Magnet 118 is energized, causing to be withdrawn the clutch disengagement arm 116. Shaft 104 is continuously rotated during the energized period of magnet 118, which prevails until pursuant to a hereinafter described condition the control circuit of magnet 118 is opened, whereupon shaft 104 is arrested invariably in a definite position.

Shaft 104 drives the brush arm 124 and for this purpose carries a worm gear 120 which meshes with a worm wheel 121 keyed to the distributor shaft 122, a vertical element featured in Fig. 16 and journaled in bearings 123. A power take-off from the distributor shaft 122 to the scanning shutters is effected by a beveled driving gear 130 anchored to shaft 122, which drives a beveled gear 131 secured to one end of a stub shaft 132, journaled in bearing 133 and having at its opposite end a beveled pinion 134 which meshes with a driven gear 135. The latter is carried upon a short pivot stud and is integrally associated with a spur gear 136 which drives a series of four intermeshing scanning gears of which gears 137 and 138 are visible in the illustration, Fig. 16. Similar gears meshing successively are provided with the other shutters but have been broken away in the illustration. In the exploded view, Fig. 22, the several elements associated with one of the shutters are featured. Each scanning gear such as gear 137 is provided with an aperture 141 and is rotated at the same speed as shaft 104 so as to pass successively into alignment with the radially distributed apertures or windows 231—1 to 231—0. The angular span of aperture 141 is sufficient to permit its leading edge to overtake and begin to expose a succeeding window before its trailing edge has traversed completely a preceding one. Pivoted on a stud screw 237a and bolt 237b with the gears 137, 138, etc., are a pair of shutter elements 250 and 251, each having five radial vanes 252 and 253. Two of the vanes indicated 253 extend beyond the circumferential limit of the other vanes 252, and have integrally formed therewith gear segments 257 which mesh with corresponding segments of arms 175 to 182, see Fig. 16. In their unoperated position, the shutter elements 250 and 251 are disposed so that their vanes 252 and 253 cut off each its associated window 231—1 to 231—0. Upon being actuated however, each shutter is rotated about its stud 237a, exposing its five windows, as will be described.

Shaft 104 propels the scanning belt 148 and for this purpose carries a worm gear 142, which meshes with a gear 143 secured to a vertically pivoted drum 144, Figs. 12, 13, and 18. The gear ratio between worm 142 and gear 143 is such that drum 144 completes a revolution for each scanning cycle which consists of an individual operating period or division for each of the several dials and indicator rows, and an extra revolution of shaft 104 for a purpose to be described later. In the particular embodiment, this ratio is one to fifteen. Flexed about the circumference of drum 144 is a scanning belt 148 which serves in the capacity of a focal plane shutter. This belt 148 is provided with feed holes 147 which mesh with feed pins 146 of the drum 144 as well as with those of idler rollers 149 and 150, Figs. 12 and 16. The belt 148 is preferably of a length to afford two complete scanning lengths each having a series of scanning apertures indicated 235—244 in Fig. 17. Drum 144 and its associated gear 143 are carried upon a vertical spindle 183 seated in an end socket 254, Fig. 18. At its upper end, spindle 183 carries a set of seven cams indicated 184 to 190, each having associated with it a stack of contacts to be described in connection with the wiring diagram featured in Fig. 43.

The top of drum 144 extends horizontally for a short distance near its periphery, then angles downwardly to form a frustum of a cone. From Figs. 12 and 20 it will be noted that upon the face of drum 144 are a series of arcuate cams indicated 151—158, distributed in accordance with a predetermined arrangement. A set of shutter control rods 167—174 pivotally supported at one end in a bracket 159a, Fig. 18, extend from a position approximately above the drum 144 aforedescribed across and through the scanning wall 218, Fig. 15. Upon the opposite face of wall 219 each rod 167—174 has secured to it one of the aforementioned segment arms 175—182, see Figs. 15 and 16. At their ends above the drum 144, each rod 167—174 carries a tracker arm 159—166, best illustrated in Figs. 12, 13, and 20, the free end of which is presented in the path of one of the aforedescribed arcuate cams 151—158. As shown in Fig. 20, each shaft or rod 167—174 has an extreme clockwise normal position determined by the contact of its associated tracker arm with an individual stop pin 128, and this position is influenced by an individual spring 260 or 261.

Noting especially Fig. 12, on the right-hand end of shaft 104 there is provided a driving worm 191 which meshes with a worm wheel 192 fast to a vertical shaft 193 whose upper end carries a driving worm 193a that meshes with a worm gear 194 associated with the feed sprocket 195, see also Fig. 15. The teeth of sprocket 195 are designed to mesh with the feed holes in the margin of a control film 196. The gear ratio of the aforedescribed train is such that sprocket 195 will feed a linear amount of film equivalent to one picture frame, Fig. 6, for each time that drum 144 undergoes one single revolution. On a shaft common with that of sprocket 195, see Fig. 13, there is secured a pulley 197 which drives a spring belt 198 which encircles a driven pulley 199 fast to the winding arbor of spool 200. As the diameter of the wound roll increases, a slippage of the belt 198 is relied upon to compensate for the increased peripheral travel.

As has been said, the tape supply is carried upon a reel 201 mounted on a bracket 202. The film 196 emanating from the supply roll 201 passes under the sprocket 195 and a tensioning roller associated therewith, the film looping upwardly as at 204 and then threading through a film gate 203. Thereafter the film circles an intermittent feed sprocket 205 and its associated idler or tensioning roller, and is received upon the winding spool 200. The intermittent feed sprocket 205 receives its motion from a gear 206 carried by a common shaft which meshes with a driving gear 207 carried by a driving shaft 208, which extends longitudinally of the base 100 and carries at its opposite end a Geneva cam 209, see especially Figs. 18 and 19. Cam 209 is a quadrate having tangential slots 210 radiating at equally spaced intervals into which there may be received an actuator pin 211 carried upon the under surface of gear 143. As the actuator pin 211 enters a notch 210, it begins to rotate the quadrate cam 209 until it positively engages the side of a slot 210, imparting a sharp angular movement to the quadrate and accordingly to shaft 208. Above pin 211 the gear 143 is recessed so as to receive the corners of the quadrate 209 during the actuating interval. As will be noted, the engagement imparts a 90° rotation to shaft 208, following which, the flat face of gear 143 resting against a side of quadrate 209, locks the shaft 208 against further rotation.

A lamp house 214 is mounted upon a swinging arm 213, Figs. 12 and 13, and within it there is found an incandescent excitor lamp 215 facing the condenser lenses 216a and 216b. This system projects a light beam coextensive with a complete film frame aligned in the film gate 203, see Fig. 15. On the opposite side of the film gate 203 and in alignment with the projected beam is a lens 217 for projecting an enlarged image of the frame upon the scanning area indicated 218. The intervening compartment 218a is light tight to exclude all light from external sources.

The scanning plate 219, see also Figs. 16 and 28, has ten horizontal rows of apertures indicated 220—229, for definitely framing and aligning the projected light beams. The apertures of each row are indicated with a sub-reference character such as 220—1 to 220—0. These apertures are situated beneath the aforedescribed dial windows 231—234 in a manner conforming with the particular distribution of meter indicators featured in Fig. 1. In projecting the image, lens 217 is designed to allocate the image where a mark may occur to the corresponding ones of the apertures 220—229 as well as to the windows 231—234.

Figure 23:
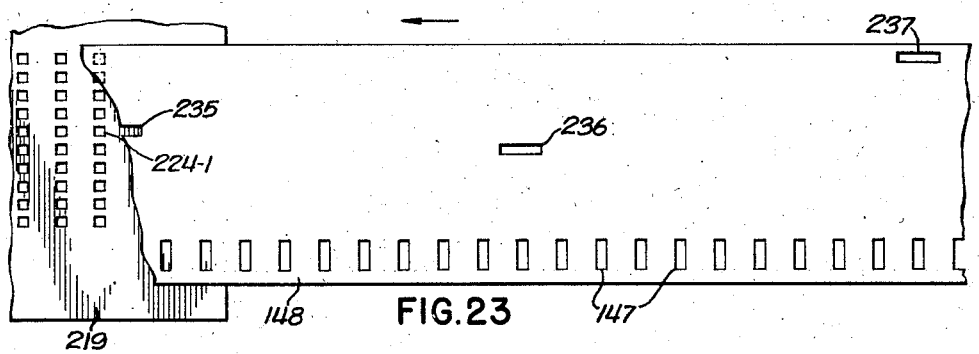
Fig. 23 is a fragmentary detail view showing the scanning belt associated with the scanning plate.
Figures 24, 25, 26, 27:
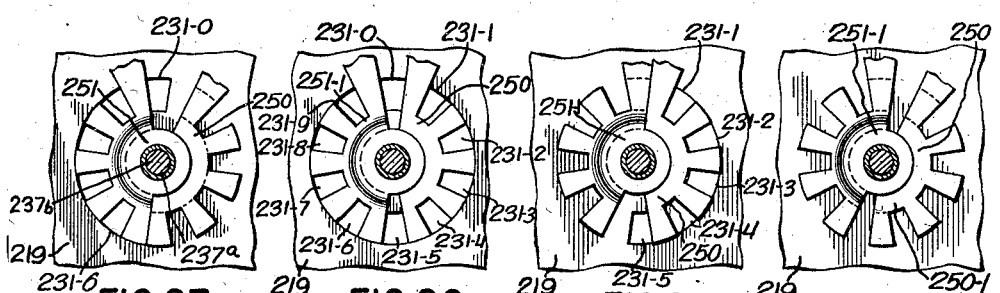

The scanning belt 148 moves across the scanning plate 219 as indicated in Fig. 23, covering the apertures 220—229 but not the windows 231—234. Each of the scanning apertures 235—244 tracks a horizontal row 220—229, aligning with the apertures of each row successively. In its stop position, belt 148 is arrested with its aperture 235 in readiness to scan the horizontal row of apertures 224 of the scanning plate 219. As the belt moves leftwardly, Fig. 16, 17 or 23, the scanning apertures register with their plate holes in the sub-reference character digital order 1, 2, 3, 4–10. As one aperture, for example 235, completes its circuit across its associated scanning row, a succeeding aperture, for example 236, enters upon its course, and so on until the entire rectangle of apertures has been scanned.

By noting Fig. 6, it will be perceived that in accordance with the contemplated practice a complete photograph of a reading will comprise, in addition to the photographic images of the circular dial indexes 92 and the identification number markings 93 which are reproduced from the characteristics representative of and associated with the meter face, Fig. 1, additional sets of information markings denoted by the reference characters 94 and 95, which markings are reproductions of the meter reader's gate 85 having the colored markers 89 described above. The order in which this information is scanned may, in accordance with the present embodiment, depend solely upon the relative arrangement of the scanning apertures 235 to 244 of belt 148, Fig. 17. That is, the foremost apertures in the sequence may align horizontally with any one or ones of the rows of images on film 196, while succeeding ones may align with any other ones of the rows, etc. There is therefore to be noted an adaptability in the system which affords accommodation for preference and variations requiring but a corresponding design in the arrangement of the apertures of scanning belt 148.

In the illustration, Fig. 17, apertures 235 and 236 align with scanning plate rows 224 and 225 and come first in the indicated sequence followed by apertures 237 to 240 which align with scanning plate rows 220 to 223 and then follow apertures 241 to 244 which align with scanning plate rows 226 to 229. A certain part of the belt 148, corresponding to the last five revolutions of shaft 104, is provided with no apertures. During the first four of these five revolutions of shaft 104 the dial indications are scanned through the windows 231—234. The fifth revolution, corresponding in time to the last interval, is provided in order to afford an additional margin or time and to safeguard thereby the correct operation of the system. It is to be understood that the particular sequence of scanning is arbitrary, and in the instant illustration corresponds to the sequence and arrangement chosen in the photographic record.

As the scanning of the rectangular apertures 220—229 draws near completion, a cam 151, see Fig. 20, on the face of drum 144 encounters and operates its tracker arm 159, rocking shaft 167 and through it the segment arm 175. Through its engagement with shutter 250, arm 175 exposes a series of five openings 231—1 to 231—5 of the units integer. This operation occurs during the tenth cyclic scanning division and while gear 137 enters upon a circuit whereat its aperture 141 registers successively with the windows 231—6 to 231—0. If the film has its recording mark or marks within the range of these five windows, a beam of light will be permitted to pass during the instant when aperture 141 registers with the particular window or windows, exciting the photoelectric cell and initiating an electrical impulse as will be described hereinafter.

While the scanning gear 137 is completing its circuit passing over windows 231—1 to 231—5, a succeeding cam 152 of drum 144 operates tracker arm 160, rocking shaft 168 and rotating shutter 251 to expose the remaining openings or windows 231—6 to 231—0, which will then be in readiness for the scanning gear 137 as its aperture 141 enters upon the second half-revolution. Meanwhile, cam 151 passes under its tracker arm, permitting spring 260 to restore arm 159, shaft 167, and its associated shutter 250. Thus, in succession, during each cycle the cams 151—158 effect the rotation of shutters 250 and 251, causing the dial readings to be executed in a predetermined sequence. The manner in which the dial shutters operate is illustrated graphically by Figs. 24 to 27.

In the course of the following description concerning the scanning apparatus as well as other apparatus, a complete operation will be considered as a cycle and each digital part thereof a division. Accordingly, there will now be described generally the cyclic divisions of the scanning unit. During the first division, the aperture 235 of belt 148 traveling leftwardly, as viewed in Fig. 23, scans the openings of plate 219 beginning with opening 224—1 and continuing through opening 224—0. This record corresponds to one of the digits which relates, in the instant example, to the identification of the metering camera. Somewhere along its course of travel, aperture 235, registering with one of the afore-enumerated openings, passes a light beam which filters through a transparent spot in the film 196. Since each division is constituted of ten subdivisional parts, the passing of this light beam during one of the sub-divisional intervals will result in the registration upon the photo-electric cell 273 of a light impulse which is immediately converted into an electric impulse, and lasting for approximately one tenth of a revolution of shaft 104.

During the second division, a similar performance occurs, during which the light beam may appear at the same or at a different sub-divisional interval. This process is repeated until all of the holes in the scanning plate 219 are read or sensed in accordance with the following order: Aperture 235 will scan the row 224, aperture 236 will scan the row 225, then aperture 237 will scan the row 220, aperture 238 will scan the row 221, aperture 239 will scan the row 222, aperture 240 will scan the row 243, then aperture 241 will scan the row 226, aperture 242 will scan the row 227, aperture 243 will scan the row 228, and finally aperture 244 will scan the row 229.

Thus far, there have been described ten divisions of the cycle. When the tenth row is about three-quarters executed, cam 151 of drum 144 will engage and operate its scanning shutter member 250, as already described, exposing as it does so the dial apertures or windows 231—1 to 231—5. When the system enters upon the eleventh division, the scanning gear 137 will traverse the afore-enumerated five apertures or windows 231—1 to 231—5 in sequence, and before this operation is half completed another cam 152 of drum 144 operates its shutter 251, exposing the apertures or windows 231—6 to 231—0, which comprise the other half of the aforementioned indicator dial. Shortly thereafter, scanning gear 137 traverses the recently opened apertures 231—6 to 231—0 in sequence, and before half of its course is completed, a third cam 153 actuates its shutter member 250, etc. This process continues until each of the shutters 250 and 251 has been rocked to and fro sequentially, permitting its associated scanning gear 137—140 to seek out the position or positions whereat a beam of light registers with the aperture 141 as well as one of the windows 231. As each cam 151—158 passes beyond the proximity of its tracker arm, its shutter 250 or 251 is restored, permitting but one of the scanning gears 137—140 to be effective at a time. During the fifteenth and final division, the last shutter 251 is permitted to close and also during this division, a slot 210 of quadrate 209 is entered by the pin 211 rotating shaft 208 one-quarter revolution. This movement of shaft 208 actuates feed sprocket 205 sufficiently to advance a new picture frame in front of the object plane of the lens. This length of film is drawn from the loop 204, which meanwhile has been enlarged due to the slow movement of feed sprocket 195, which occupies nearly an entire cycle in supplying a length of film that is withdrawn in a single division by the action of the intermittent feed sprocket 205.

The foregoing timing and allotment is quite arbitrary, and lends itself extensively to variation. Where it is desired to alter the sequence of scanning, it will be deemed obvious that the apertures 235—244 may be redistributed upon a belt 148 and also the occurrence of cams 151—158 may be re-allocated upon the surface of the drum 144. Beyond the scanning plate 219, see Figs. 15 and 18, there is found a light-tight compartment 270 containing a system of condensing lenses 272 and 271, which converge the light rays, directing them onto the cathode plate of a photo-electric cell 273.

Storage translator

The scanning operation constitutes a continuous cycle during which a number of electrical impulses are issued. For certain reasons, such as to permit of the intervention of an overlap and to afford a means for instituting a cumulative correction, it is desirable to provide a storage mechanism from which the signals may be withdrawn in simultaneous groupings or in a different order from that in which they are installed. A device for accomplishing this purpose is featured in the accompanying Figs. 29-38.

This unit comprises a base frame 300, at opposite sides of which are secured the bearing plates 301 and 302. Bearing plate 301 may be fabricated preferably of thirteen individual panels as has been indicated in Fig. 33, so as to permit convenience in manufacturing assembly. Plate 302 is a single partition, as may be noted best in Figs. 29 and 35, and upon its side there protrude the driven ends of shafts 303 and 304. Shaft 303 is provided with a friction clutch comprised of a secured disc 305 and a floating collar 309. Intervening disc 305 and collar 309 is a worm gear 310 cushioned between a pair of friction washers 311 and 312. Collar 309 maintains a slot-and-tenon relationship with member 306 which is secured to shaft 303 and which affords a flange 307. Between the flange 307 and collar 309 there is disposed under compression a coil spring 313 which maintains a pressure against collar 309, causing a driving torque, between gear wheel 310 and shaft 309.

A driving worm 314 meshes with the worm wheel 310 as well as with another worm wheel 310b of shaft 304, and is secured to a shaft 315 which may be driven by a motor not shown. An escape wheel 316 has fourteen equally spaced teeth 317, each of which is allocated to one of the fourteen effective divisions of each scanning cycle, no tooth being provided for the fifteenth or what may be termed an idle division.

Journaled on one side of the storage unit and best indicated in Fig. 32 is a bar 318 supported in journal brackets through which extend its end pintles 319 and 320. The bar 318 carries a pair of plates 125 and 126, with which are formed the protruding escape lugs 321 and 322, the shape of which is best revealed in Fig. 30 (operated position). Under normal conditions, escape lug 321 engages one of the escape teeth 317 of wheel 316, barring the rotation of shaft 303 and causing gear 310 to slip between its friction discs 311 and 312. As may be seen from Fig. 32, its associate escape lug 322 is diametrically opposite between a pair of escape teeth 317, and moreover, is out of registration with wheel 316. When bar 318 is rocked in opposition to its return springs 374, so as to withdraw lug 321 outwardly, tooth 322 is moved into alignment as is its position in Fig. 30, permitting wheel 316 and shaft 303 to rotate through a small arc or until lug 322 encounters an oncoming escape tooth 317. Thereafter, bar 318 is returned to its original or normal position, lug 322 is withdrawn, and lug 321 again interposed. This permits escape wheel and shaft 303 to rotate another angular fraction, the two escape movements together constituting a rotation corresponding to one tooth interval, or one-fourteenth of a revolution.

Also mounted on shaft 303 at the interior of wall 301 is a cam 323, Figs. 29 and 35, which resembles generally the escape wheel 316, having fourteen projections 324, as indicated in Fig. 31, while aback the plate 302 shaft 303 supports a secured driving pinion 341 intermeshing with ten gears 342 to 351 associated with a series of ten parallel cam shafts 331—340. The contiguous gear train imparts alternately reverse rotation to the shafts 331 through 340, the power being derived at an intermediate point from the driving gear or pinion 341. Since the gears 342—351 are of identical size, shafts 331—340 are rotated at the same rate, and in addition to their rotational movement each shaft is capable of being shifted longitudinally through a limited distance as will be described hereinafter. Each shaft is provided with fourteen setting cams, 376 to 389, having apices as indicated in Fig. 38, disposed from each other in a helical progression. In accordance with the direction of rotation, the helixes of contiguous shafts are inverse and the shapes of their corresponding cams are similarly inverse.

Observing now shaft 304, it will be noted that this driving member carries a power distributing pinion 430 comparable generally to the aforedescribed pinion 341, see Fig. 35. As in the case of shaft 303, the power originating with shaft 304 is communicated to a series of alternate and oppositely driven shafts 420—429, Fig. 31, each of which carries fourteen cams progressively indicated in Fig. 37 and bearing the reference numerals 453 to 466. The contour of these cams differs from those on shafts 331 to 340 however, as may be noted by comparing Figs. 37 and 38. Each cam 453 to 466 carries a sidewardly beveled tooth 468 and a peripherally beveled tooth 467. Moreover, each of the shafts 420 to 429 is longitudinally shiftable throughout a limited distance, as may be noted in Fig. 36, terminating at its protruding end with an insulated portion 442. As may be noted from Figs. 31 and 36, the setting cams 376 to 389 and the restoring cams 453 to 466 are arranged in approximate alignment vertically, and each alignment will be considered as constituting a pair. Intervening each cam pair there is disposed a storage bar 396 to 409, whose upper end 414 terminates with an inclined surface to rest against the periphery of a setting cam 376 to 389 and whose lower end is a square-cut portion 469. The storage bars 396 to 409 are maintained in vertical alignment by being slidably accommodated within rectangular notches formed in a pair of plates 390 and 393, which is in the present embodiment are illustrated as being longitudinally divided intermediate the unit and between shafts 303 and 304, Fig. 31. Each of the storage members 396 to 409 is capable of assuming two positions, an upper and a lower, and in this connection it will be noted that each has formed with it a V-shaped detent lug 412 with which there cooperates an individual detent spring 413. The limits of movement of a storage bar are determined by the stop lugs 410 and 411 which collide with the plates 393 and 390, respectively. Noting now particularly Fig. 36, wherein the several setting cams 376 to 389 have been illustrated in their normal and shifted positions by solid and broken lines respectively, it will be seen that when in their normal positions these cams are offset slightly and out of alignment with respect to their associated storage bars 396 to 409, and that only during the time when they and their associated shafts 331 to 340 have been shifted rightwardly do they align vertically with the uppermost portions 414 of the storage bars 396 to 409.

The shifting of shafts 331 to 340 is impelled by associated armatures 354 to 363 which are influenced by magnets 364 to 373. In response to a timed electrical impulse, one of the electromagnets 373 becomes energized, attracting its armature 363, Fig. 36, and through it shifting the shaft 340 rightwardly. This displacement, though initiated by an electromagnet 373, is maintained for a time through the instrumentality of a common latching bail 325 which is provided with a wedge 328, adapted to engage and latch the several armatures 354 to 363 in either of their alternative positions. Latch bail 325 is also provided with an intermediate projection 329, Fig. 35, which is disposed in alignment with the periphery of multi-lobe cam wheel 323 whose cam projections 324, Fig. 31, engage the toothed extremity of projection 329, camming bail 325 upwardly and in a clockwise direction about its pivotal beam which is journaled in the end bearings 326 and 327. The counterclockwise movement of bail 325 is urged by restoration springs 330, Figs. 33 and 36, and the angular position of cam wheel 323 is such that during its normal or stop position, one of its teeth 324 aligns with projection 329, holding the bail away from the armature extremities 375.

Opposing the aforedescribed magnet armatures, each shaft 331 to 340 is provided with a return spring 353 which is supported under compression between the end wall 301 and a collar 352 carried by each of the aforementioned shafts, and each serves to restore its shaft and armature when permitted to do so by the withdrawal of bail 325. The protruding ends of shafts 331 to 340 engage and actuate the aforedescribed escapement bar 318, and upon their restoration, bar 318 is permitted to resume its normal position, after having permitted a single tooth escape movement of driving shaft 303. The energization of a magnet 364 to 373 causing an associated shaft 331 to 340 to be shifted longitudinally therefor, rocks the escape bar 318 and permits a slight rotation of all shafts under impetus of the driver 303, but before a full fourteenth of a revolution has been consummated, a succeeding tooth 324 of cam 323 restores latch bail 325, releasing the operated armature and permitting its shaft to resume its normal longitudinal position.

The aforementioned fourteen cams 376 to 389 with which shafts 331 to 340 are provided relate to and are effective during one of the aforedescribed cyclic divisions discussed in connection with the scanning apparatus. The radial extent of a cam projection 415 is preferably less than one-fourteenth of a revolution, to insure ample margin so that its operative effect may take place after its shaft has started to rotate and will be completed before the shaft comes to rest. It will be noted that during the rotation of the several shafts 331 to 340, one of the magnets 373 is energized, and a certain cam thereof will depress one of the storage bars 396 to 409, depending, of course, upon which of the fourteen cams happens at the particular interval to be engaging with its apex one of the afore-enumerated storage slides or bars. During each division, one slide of a transverse row (for example 396, 397, etc.) may be set and thereafter upon a succeeding step, another slide relating to a succeeding row may be set. There being ten slides in a transverse row and each relating to an integer, there is effected in this way a digital selection corresponding to each numerical value.

Each of the slidable storage bars 396 to 409 discussed above may be considered as corresponding to a position on a record card where a perforation may be made. The ten storage bars 396 constituting a row as viewed in Fig. 31, correspond to the digits 1, 2, 3, 4, etc., and may represent, for example, the tens digits of the record reader. Correspondingly, the row of slides 397 represent, for example, the units digit. In like manner the remaining rows of slides represent each of the integers, the sum total of which constitutes fourteen in the present embodiment.

Shaft 304, Fig. 35, receives its motion through a driven gear 310b which is supported between friction washers 311b and 312b, compressed between a flange 305b whose collar is keyed to shaft 304 and a flange 309b which is slidable longitudinally upon shaft 304 and which is urged by a compression spring 313b. At its opposite end shaft 304 carries a stop arm 416 which is restrained from revolving when it engages the tip of an armature 417 associated with magnet 418. A spring 419 maintains the armature 417 in its unattracted position and cyclically arrests shaft 304 after each single revolution. Driven gear 310b is preferably larger than is driven gear 310 so that shaft 303, which is intermittent in its movement, may rotate faster than shaft 304 to compensate for the former's larger number of rest periods.

After a slide bar has been depressed, there follows a rotation of its associated transfer shaft 420—429, bringing into engagement one of the restoring cam projections 468 with the protruding end 469, and causing the particular shaft to be shifted longitudinally. This thrusts the endmost portion carrying insulation 442 against an adjacent contact pair 443 to 452, closing it momentarily. Trailing each of the side shift operating cam projections 468 is the peripheral restoring cam projection 467 which upon engaging any one of the protruding ends 469 of the storage bars, restores the latter by overcoming its jockey spring 413. It will be noted specifically in Fig. 37, that while certain of the cams; namely, 453 to 462 are arranged in spiral succession, the remaining cams 463 to 466 are at variance therefrom, with cam 466 following cam 462 in the order 465, 464, and 463. This arrangement conforms with an incident in the design of the particular embodiment, since the scanner functions to scan the meter in a reverse order; namely, units, tens, hundreds, etc., while the conventional card perforator devices operate in a descending order; namely, thousands, hundreds, tens, etc.

*Cumulative correction*

Referring now particularly to Figs. 29 and 36, it will be noted that storage bars 406, 407, and 408 are provided with sidewardly extending pins 474, and that transversely of the intervening space occupied by said pins 474 there are disposed slidable bars 470, 478, 481, 484, 487, and 490, each extending substantially half-way of the longitudinal extent of the unit and each protruding as indicated in Fig. 31 with an insulated section 475, which engages a contact pair as will now be described.

Slide bar 470 engages with its insulated tip 475 a contact spring 476, and when actuated, thrusts the latter against an associated contact spring 477. In a similar manner, slide bar 481 thrusts contact spring 482 against its asociated spring 483, bar 487 thrusts contactor 488 against its associated contact spring 489, bar 478 thrusts its contactor 479 against its associated contact spring 480, bar 484 thrusts contactor 485 against its associated contact spring 486, and bar 490 thrusts contactor 491 against its associated spring 492.

The spring tension of the afore-enumerated contactors suffices to maintain its associated bar in a normal position, as illustrated in Fig. 31, maintaining the contactors spaced from their contact springs. Slide bars 470, 481, etc., are designed to slide freely within journal notches in the end frame and associated supporting brackets 471 and 472. The movement of a slide bar is effected when one of the storage bars 406, 407, or 408 is depressed, causing its pin 474 to engage the cam surface 473, Fig. 31, forming one side of a plurality of notches provided with each of the bars 470, etc. Thus, upon the depression of these certain storage bars, there is closed one or more of the afore-enumerated contact pairs. Slide bar 470 is illustrated as being associated with the five storage bars 408 which relate to the numerical digits 0, 1, 2, 3, and 4, while slide bar 478, aligning longitudinally with bar 470, cooperates with the five storage bars 408 relating to the digits 5, 6, 7, 8, and 9 of the hundreds integer. In the same manner the other bars 481 and 487 serve the lower digits of the tens and units integers while the bars 484 and 490 serve the higher digits of these integers. Thus, when in accordance with a particular integer one of the slide bars 406, 407, or 408 is depressed, depending upon whether the represented digit is of the lower or high series of numerical values, one or the other of the pairs of bars 470—478, 481—484, etc., will be operated, closing its electrical contact pair for a particular purpose identified as a cumulative integer correction to be described hereinafter. It should be noted that as between the contact pairs relating to a transverse row, that is to say, as between the contact pairs 476—477 and 479—480, the closure of one pair is effected to the exclusion of the closure of its associated pair. This is true since but one integer may be registered in a transverse row represented by any one class of storage elements 406 to 408, as will be explained later.

Perforating mechanism

The perforating apparatus forms no part of the present invention. The accompanying drawings do not include a complete disclosure thereof, and for the sake of a more comprehensive understanding, reference may be had to U. S. Patent No. 1,914,263 issued to C. D. Lake et al. wherein a typical card perforating device is fully described and illustrated. To one skilled in the art of automatic devices of this nature, it will be apparent that divers structures and apparatus may be employed in the preparation of perforated control cards, and that these mechanisms and apparatus may be suitably adapted to be controlled by electrical impulses such as are transmitted by the translating mechanism just described.

A diagrammatic representation of a perforating mechanism such as the one disclosed in the patent referred to has been illustrated in Fig. 48. To permit the correlation of Fig. 48 with Fig. 17 in said patent, similar reference characters have been employed here preceded by a character integer X.

In Fig. 43 two so-called skip bars X140 and X143 have been illustrated which are comparable to the skip bars shown in Figs. 13 and 14 in the patent. Bar X140 has a recessed portion occurring in the proximity indicated 1491 which corresponds to the vertical column 655 in Figs. 40 and 41, and a recessed portion 1492 corresponding to the vertical columns 656 and 667. Bar X143 has a recessed portion 1494 corresponding to a vertical column wherein the present reading is to be applied. The skip bars as disclosed in the patent, control the period of effectiveness with respect to a given series of operations in perforating a set of cards and other allocations are contemplated where, pursuant to another set-up, additional columns are to be thus employed.

Electrical circuit

Figs. 44, 45, 46, and 48, arranged in the manner illustrated in the pattern Fig. 49, constitute a complete wiring diagram for the supervision of a card perforating mechanism. Referring particularly to Fig. 46, the reference character 500 denotes a gang switch having five contactors which lead from an alternating current source indicated 502 and a three-wire grounded neutral direct current source indicated 501. The contactors of switch 500 when closed communicate with terminals 503 to 507 of the amplifier circuit of which terminals those indicated 506 and 507 connect to a primary winding 508 of a power input transformer whose secondary winding 509 is connected to a filament circuit of a vacuum tube 510. A middle tap 511 of the secondary winding is connected to the suppressor grid 526 as well as to the cathode element of tube 510.

Another secondary winding 512 is connected to the filament circuit of a vacuum tube 513 while a third secondary winding 514 is connected to a circuit 515 which leads to the exciter lamp 215 of the scanning device. The reference numerals 516 and 517 denote potentiometers which are connected across the direct current leads 518, 519, and 520 for regulating the voltage which operates the vacuum tube circuit. The control grid 441 of tube 510 is connected through a resistance element 521 to a suitable potentiometer point 522 and is also connected to the anode of a photo-electric cell 273. The cathode of photo-electric cell 273 is connected to the negative terminal of potentiometer 516, while the plate element of tube 510 is connected to the control grid 440 of tube 513 and through a resistance 523 to a suitable potentiometer point 524 on the potentiometer 517. Screen grid 525 of tube 510 is also connected to the potentiometer point 524. The plate 517 of tube 513 is connected over a lead 527 with one end of a resistance 528, the other end of which communicates over lead 529 to the positive terminal 503, while the continuation of leads 537 and 538 which connect with the same terminals of resistance 528, continue on into Fig. 45 as will be described later.

The scanning mechanism's electric motor 101 is connected through leads 530 and 531 to the neutral and positive terminals 504 and 503 and is controlled by a suitable speed control medium (not shown) though if preferred, motor 101 may be of the synchronous type actuated from an alternating current source.

When the switch 500 is closed, the scanning device is conditioned for operation. A light beam originating at the exciter lamp 215 is condensed through lenses 216a and 216b so as to project a beam of light on the record film 196, see also Figs. 13 and 15. The beam is intercepted by the image on the film and proceeds through the photographic lens 217, casting an image of the film in proper registration upon scanning area 218. As the several unit record areas are successively opened by the scanning mechanism, selected beams are permitted to proceed through the concentrating lens system 272 and 271 which direct the beam onto the cathode plate of photoelectric cell 273.

When a beam of light below a predetermined minimum intensity falls upon photo-electric cell 273, the grid of tube 510 continues to maintain a positive potential sufficient to permit current to flow in the plate circuit of tube 510 of a value such that the grid of tube 513 remains sufficiently negative to cut off completely the current in the plate circuit of said tube 513. On the other hand, when photo-electric cell 273 receives a beam of light greater than said certain minimum intensity, the grid of tube 510 becomes sufficiently negative to cut off the current in the plate circuit of tube 510. Accordingly the current in the plate circuit of tube 513 is determined by the voltage at point 524 and the electrical constants of the circuit, and any increase in the amount of light over and above the said minimum intensity does not change the plate current in tube 513. As a result of this feature, minute leakage of light into the chamber of the photo-electric cell has no effect. Until the intensity of a light beam passes a regulated minimum, no signaling impetus is inaugurated and as an advantage of this feature, microscopic adjustments of light intensity are not necessary.

Referring now momentarily to Fig. 47, it may be noted that current flowing through resistance 528 for the period of one cycle is of a series of electric impulses representing the record reader No. 12, the meter No. 4086, the date 10–24 (October 24th), and the meter reading 1300. In this case the cycle is also considered as made up of fifteen intervals corresponding to the afore-discussed fifteen divisions of a scanning cycle. Moreover, each division will be considered as divided into ten sub-intervals, each allocated to a digit. The representations indicated 620, 622, etc., in Fig. 47 denote graphically intervals during which the photo-electric cell 273 is illuminated and current flows through resistance 528.

During the operation of the scanning device, brush arm 124 rotates in synchronism with the scanning mechanism and the movement of the scanning belt 148, so that its brushes 544 and 545 wipe across the commutator segments during exact instants when the corresponding areas of the record reader are being scanned. Thus, the distributor segment corresponding to the impulse 620 of Fig. 47 is wiped by the brushes 544 in the time interval indicated by the graphic representation 621. The impulse interval 621 may be made of considerably shorter time duration than the duration of impulse 620 so that its period of occurrence is not critical.

In the schematic illustration of Fig. 44, there are portrayed the contact pile-ups of the scanning apparatus which are situated at the upper end of vertical shaft 183 (Figs. 12 and 13). The several cams 184 to 190 have been illustrated in Fig. 44 with their contacts arranged on one side, whereas in the assembly views these contacts are variously distributed and on opposite sides of the cams. In Fig. 45 the scanner apparatus release magnet 118 has been conventionally illustrated as directly presented to release the brush arm 124 as though its own driving shaft 122 were frictionally actuated. These and other diagrammatic conventions have been employed for the sake of simplifying the circuit illustration.

Commutator 129 will be observed in Fig. 45 as an assembly of four concentric rings 540 to 543, the outer ring 540 of which is divided into ten segments indicated 540—1 to 540—0, between which there intervene insulation or spacer segments. Ring 542 affords three conductor segments indicated 542—1, 542—2, and 542—3, while rings 541 and 543 are continuous conductors. The brushes 544 are connected together and wipe across rings 540 and 541, while the brushes 545 are connected together and wipe across rings 542 and 543. During its stop position, brush arm 124 is disposed with its brushes 144 contacting an insulated portion intervening the conductor segments 540—1 and 540—0.

Ten leads 546 connect the segments 540—1 to 540—0 with the operating windings of a series of primary storage relays 547—1 to 547—0. The outgoing terminals of these windings are connected through individual resistances 548 to the common lead wire 538 which, as noted in Fig. 46, is a continuation of positive supply line 529. The continuous ring 541 is electrically connected through a resistance element 549 over lead wire 537 to the opposite terminal of the shunt resistance 528, and thence continues over line 527 to the plate 517 of vacuum tube 513. Accordingly, the amplifier circuit emanating from tube 513 is traceable through the commutator brushes 544 and relay 547 as arm 129 rotates over the several segments 540. Locking windings of primary storage relays 547 have one of their terminals connected through an individual resistance element 550 and thereafter are joined to a common lead 551, which in turn connects with a positive bus wire 552 which continues to the positive terminal of the perforator device, Fig. 48. The other terminals of the locking windings of each of the relays 547—1 to 547—0 are connected to individual front contacts 553 with which there cooperate a similar plurality of contactors 554—1 to 554—0. It will be observed that the contactors 554—1 to 554—5 are connected together to a line 439 leading therefrom through a contact pair 555 and 556 of a supervisory relay 557 joining the negative bus wire 558, which continues over into Fig. 48 where it too communicates with the perforator mechanism. The locking circuits of relays 547 hold stored signals throughout the duration of an interval which exceeds that of the signaling impulse distributed by the commutator 129. The contactors 554—5 to 554—0 of relays 547—6 to 547—0 are likewise connected together, having a common lead wire 438 which passes through the contact pair 559 and 560 of a supervisory relay 561 and thence over line 437 to the negative bus 558. These circuits too are locking circuits and are grouped separately for a purpose which will become apparent hereinafter.

Considering the two groups of primary storage relays 547—1 to 547—5 and 547—6 to 547—0 as the first and second group respectively, attention is now directed to a third group of relays indicated 562—1 to 562—5, each of which constitutes a secondary storage relay and is associated with a corresponding relay of the first group 547—1 to 547—5. The operating windings of relays 562—1 to 562—5 are connected each through a resistance element 563 to a common lead 436 which joins with the positive bus wire 552 while the opposite terminals of said windings lead each to a contact point 564 located near and influenced by an associated primary storage relay 547 of the first group. The locking windings of said secondary storage relays 562 are connected on the one hand through resistances 566 to the lead 436 which connects to positive bus 552 and on the other hand to individual locking contact points 567.

A group of contact tongues 565 are connected parallelly together over a lead 435 which communicates to the commutator segment 542—2, each of said contactors 565 being associated with one of said contact points 564. Since the companion ring 543 communicates with the negative bus wire 558, it will be observed that the movement of brush arm 129 causes an impulse to be communicated once during each revolution through the operating winding of any of the secondary storage relays 562 if its associated relay 547 has been operated. The contact tongues 568 which cooperate with the contact points 567 of the locking windings of relays 562 are connected parallelly over a line 434 through the contact pair 559 and 560 to the negative lead 558 so that the secondary storage relays 562 are locked concurrently with the second group of relays 547—6 to 547—0, and are released when the supervisory relay 561 is operated to open the contact pair 560 and 559.

The first and third relay groups 547—1 to 547—5 and 562—1 to 562—5 correspond to and represent the numeral integers 1, 2, 3, 4, and 5 and cooperate to provide an overlap in the signal storage of these enumerated digits. After the brush 544 has passed segment 540—5, brush 545 encounters segment 542—2, causing the setting of primary relays 547—1 to 547—5 to be transferred to secondary storage relays 562—1 to 562—5 and the setting of relays 547—6 to 547—0 proceeds. As a result of the transfer, the first group of relays 547—1 to 547—5 may be released so as to be available for a succeeding record while the secondary storage relays 562—1 to 562—5 maintain the storage setting to accommodate the perforating mechanism. This is accomplished when brushes 545 of commutator arm 129, upon leaving segment 542—2, enter upon segment 542—3, closing an obvious circuit which energizes the release magnet 557 of locking circuit 439.

Referring again to the second group of relays 547—6 to 547—0 and also to the secondary storage group 562—1 to 562—5, it will be noted that each is provided with a contact set comprised of a contactor 569 having a back contact terminal 571 and a front contact terminal 570 and a contactor 572 having a back contact terminal 574 and a front contact terminal 573. In each case as is the practice throughout this description, the reference numeral is associated with a dash integer (—1, —2, etc.) corresponding to the numerical integer of the particular element. The front contacts 570 and 573 of each set are connected together over a lead 433 which continues through the winding of an associated translator unit magnet 364 through 373. The other terminals of said magnet windings passing through individual resistance elements 575 are connected to the positive lead bus 552.

Of the series of tongues 572 it will be noted that tongue 572—1 is connected to the contact point 574—0, tongue 572—2 to the contact point 574—1, etc., throughout the series including tongue 572—9 which is connected to the contact point 574—8. The tongue 572—0 however, is not connected to contact point 574—9 but is instead connected to a lead wire 1576 which communicates with a switching device under the supervision of a relay 547—11 to be described later. Of the series of tongues 569, it will be observed that tongue 569—3 is connected to contact point 571—9, tongue 569—7 to contact point 571—8, etc., and tongue 569—0 will be observed as leading to contact point 571—1. The tongue 569—9 connects over a lead 1577 to tongue 547 of the aforementioned switching device 547—11. Thus there are described two series of contact chains or chain circuits which are controlled by the second and third storage relay groups 562—1 to 562—5 and 547—6 to 547—0.

The two chain circuits just traced perform, under the supervision of the cams 185, 187, and 189, a two-fold selective function, as will later be described. This arrangement of apparatus selects the lower of two consecutive integer signals which may be received concurrently due to the overlapping characteristic of the indicator dials 1, Fig. 1, which may, under certain instances, cause to be transmitted two consecutive digit signals for a single decimal indication. The apparatus featured functions in conjunction with the contacts 476—477, 479—480, etc., to effect what has been referred to as a cumulative correction. That is to say, when two signal impulses are received in a given decimal position, this circuit and apparatus functions to determine under the supervision of the adjacent lower decimal indication the proper one of the two signals to be recorded.

For example, if, in the event of a particular integer, two secondary storage relays 562—3 and 562—4 are simultaneously energized when impulses over commutator 129 are received, only one of the translator magnets 367 or 368 properly should become energized, in the particular case the magnet 367.

It should be noted that negative supply originating from branch bus 594a may be introduced over either of the circuits 576 or 577 under the control of the timing cams 190, 185, 187, or 189. During the cyclic divisions including the second to the twelfth, cam 190 through its apices 190—2 to 190—12 closes the contact pair 595—596, routing negative current directly to the circuit 576, but during the thirteenth, fourteenth, and fifteenth divisions, cams 185, 187, and 189 prepare the negative supply paths to the point of the cumulative correction contacts 476—477, 479—480, 485—486, etc., leaving to these contacts the final determination of whether the negative supply shall continue over circuit 576 or 577. As explained in the description of the translator and scanning units contacts 476—477 and 479—480 serve the hundreds indication and control the cumulative correction of the thousands indication, the contacts 482—483 and 485—486 serve the tens indication and control the cumulative correction of the hundreds indication, while the contacts 488—489 and 491—492 serve the units indication and control the tens indication.

Accordingly, if a units storage is to be effected relating to the meter readings, its signal or signals are due to be transferred to the translator magnets 364 to 373 during the twelfth division of the scanner, at which time apex 190—12 of cam 190 routes negative to circuit 576. If at this time the two contemporaneous signals taken for example, above, should be received, primary storage relays 547—3 and 574—4 would receive a setting, transferring it immediately to their secondary relays 562—3 and 562—4.

Negative current will then be traceable from circuit 576 through contact pair 547g and 547e, lead 1576, contact pairs 572—0 and 574—0, 572—1 and 574—1, 572—2 and 574—2, through contact pair 572—3 and 573—3 instead of 572—3 and 574—3 because magnet 562—3 is operated. This routes negative over the associated lead 433 to the winding of translator magnet 367. The foregoing described interruption at contactor 572—3 breaks the chain at that point, cutting off negative supply and preventing magnet 368 from becoming energized. Instead, negative is available only to magnet 367 and the circuit continues through its winding and resistance 575 to the common positive branch which connects with bus 552. Thus in the case of the units digits of the meter reading where two integers have been recorded for one decimal (units) position, the lower of the two is invariably recorded to the exclusion of the higher. In subsequent decimal positions (tens, hundreds, etc.), the choice is selective as between a higher and lower integer value and is controlled by its next lower integer. Where the reading of the next lower integer is 0 to 4, the choice of a given decimal position as between two values should be determined in favor of the higher one and on the other hand, if the next lower integer is 5 to 9, the particular decimal position should be resolved in favor of the lower of two recorded values.

For accomplishing this, there is provided the already described contact pairs 476—477, 479—480, etc., in the translating unit and the above mentioned conditioning cams 185, 187, and 189. It will be evident from Figs. 29 and 31 that if a units, tens, or hundreds digit is of the lower numerical order, there will be closed one of the contact pairs 488—489, 482—483, or 476—477, and that if either of said digits is of the higher numerical order, there will be closed one of the contact pairs 491—492, 485—486, or 479—480. Accordingly, negative current supply will be carried to circuits 576 or 577 respectively.

The determination of election of digits is performed as has been said by the cumulative correction contacts 476—477, 479—480, etc., during the three divisions when cams 185, 187, and 189, Fig. 44, are effective. During the thirteenth division, the apex 185—13 of cam 185 encounters contact lever 601, causing to be closed the contact pairs 597—599, and 598—600. This permits negative current from branch bus 594a to continue through the contact pairs 597—599 and 598—600 to the contactors 491 of the pair 491—492 and 488 of the pair 488—489, and since but one of these pairs of contacts may be closed to the exclusion of the other pair, negative current may be continued thereafter either over the chain circuit 576 or over 577. If the previously recorded integer (in the instant case the units digit) happens to be of the lower numerical order (0 to 4), then the horizontal slide bar 487, Fig. 29, will cause to be closed the contact pair 488—489. This will cause negative supply current to be supplied to the chain circuit 577. On the other hand, if the preceding digit is an integer of the higher numerical order (5 to 9), then the horizontal slide bar 490 causes the closure of the contact pair 491—492, causing negative current to be forwarded over line 576. Chain circuits 576 and 577 differ from each other essentially in the order in which their chain elements are associated with the secondary storage relays 562 and 547—6 to 547—0. The chain circuit 576 for example, ordinarily enters through branch circuit 1576 and continues through the contact pairs 572 and 574 in an ascending sequence from 0 through 1, 2, 3, etc. Chain circuit 577 on the other hand, normally enters through branch circuit 1577, whence it continues through the contact pairs 569 and 571 in a descending sequence. Accordingly, each chain gives preference to the first relay in its path where two consecutive relays are energized and since the chain circuits traverse the several relay contact pairs in opposite orders, the preference in the one case is to the lower numerically assigned relay and in the other case to the higher one.

The rule of preference is general and applies to all digits which are in accordance with the present embodiment arbitrarily divided into the aforesaid groups 0 to 4, termed the lower numerical order, and 5 to 9, termed the higher one. In the case of the integer 0 which may have a value of zero or one of ten, the special condition obtains to determine, in each case, the value to be assigned. The determination is left to the characteristic of the overlap, so that if the two integer signals received are 9 and 0, the value of 0 is to be ten, but if the two integer signals are 0 and 1, the value of 0 is to be zero. For accomplishing this determination there are provided in connection with the storage relays 547—9 and 547—0, two additional contactors indicated 547b and 547d which cooperate respectively with the contacts 547a and 547c. In the event that both relays 547—9 and 547—0 are energized, which condition occurs only upon the contingency of having received the double character signals in the 9 and 0 reading, there results the closure of the aforedescribed contact pairs, causing a circuit to be completed which is traceable in Fig. 45 from negative bus 558, contact pairs 547d, 547d, and 547b, 547a, winding of changeover relay 547—11 to positive bus 552.

As a result of the energization of changeover relay 547—11, the contactors 547e and 547f are withdrawn from their back contacts 547g and 547i, respectively, and are brought into engagement with their front contacts 547j and 547h. The effect of this changeover is to interchange the connections of negative lines 576 and 577, causing the former to proceed over branch circuit 1577 and the latter over branch circuit 1576. This changeover results in a reversal of the manner in which the preceding integer controls the election between two digits, one of which includes the numeral 0, so that whereas under normal conditions if the next lower integer belongs to the higher numerical order, it selects for recordation the lower of two simultaneous digits; the effect of having energized the changeover relay 547—11 causes an integer to select the higher of two such digits, and vice versa.

Taking as an example of a number to be recorded the reading 1300 featured in connection with the dial illustration of Fig. 1, it will be observed that there happens to be an overlapping condition of the dials 1 in the units, tens, and hundreds indicators but no such condition in the thousands indicator. The units reading is arbitrarily resolved in the favor of the lower of two digits because apex 190—12, Fig. 44, of cam 190 invariably introduces during the units records interval, a negative potential from branch bus 594a over contact pair 595—596 to the chain circuit 576, which effects a minor integer preference. Since the recorded integer is 0 (the digit 0 being given the value of zero) and since this integer belongs to the lower numerical order, its recordation will cause to be closed the contact pair 488—489, giving a preference in the tens digit recordation to the higher or major integer which, in the instant example, is 0 (having the value of ten) in favor of 9.

Since the tens decimal position recordation is 0, which fundamentally belongs to the lower numerical order, it likewise will give a preference to the major of two companion signals in the hundreds position. Thus the integer 3 will be given preference over the integer 2. Had the thousands dial 10 been overlapped so as to cause to be transmitted a pair of signals instead of one signal, the control thereover by the hundreds dial would be such as to give a preference to the major signal, the integer 3 belonging, as in the previous cases, to the lower numerical order. At a subsequent point in the present description, the operation of the unit will be traced specifically.

While the primary and secondary storage relays 547 and 562 are arranged in an order beginning with the integer 1 and continuing 2, 3, 4, etc., to the integer 0, the translator magnets 364 to 373 are arranged in a different order, beginning with 0 and continuing 1, 2, 3, etc., to the integer 9. The circuit illustrated in Fig. 45 shows how two numerical orders differing from each other in this manner may be reconciled so that the sequence occurring in the scanner agrees with that occurring in the perforator-translator.

The energization of the translator magnets 364 to 373 controls the closure of contact pairs 443 to 452 which, in turn, are connected over a cable of leads indicated 578, Fig. 48, to corresponding magnets X107. The outgoing terminals of magnets X107 are parallelly connected to a bus bar from which a lead X182 communicates through a contact pair X152 with a line X175, contact pair X145, leads X174 and X161 to the positive bus wire 552. The other contactors of contact pairs 443 to 452 are connected together and join with the negative bus wire 558. Upon the energization of any magnet 364 to 373, the particular one of the contact pairs 443 to 452 is closed following the operation of the shafts 420 to 429 of the translator unit, and in this way there is completed a circuit which causes the energization of one of the perforator magnets X107. As a result of the energization of a perforator-magnet X107, an associated punch is operated, causing to be made a hole in a corresponding position on the control card.

If negative is supplied to circuit 577 by a preceding recordation and a particular integer is recorded with two digital readings, for example 5 and 6, then primary storage will be had in relays 547—5 and 547—6. Promptly, relay 547—5 transfers to the secondary storage relay 562—5 and the resulting chain circuit is traceable from negative collector 577, contact pair 547i and 547f, lead 1577, contact pairs 569—9 and 571—9, 569—8 and 571—8, 569—7 and 571—7, 569—6 and 570—6 (because primary storage relay 547—6 is operated) thence over lead 433 through the winding of translator magnet 370 to positive bus 552. Because of the interruption of the chain at contactor 569—6, negative is cut off from the subsequent contactors and a choice is effect favoring the highest digit. It may be observed that one of the described chain circuits is designed to favor the digits in a lower to higher progression while the other does so in an inverse progression.

Referring now more particularly to Figs. 44 and 45, it will be noted that the commutator start magnet 118 on the scanning apparatus is connected through a resistance 579 to the positive bus 552. The other terminal of magnet 118 continues over a line 580 to a contact pair 582—584 of relay 583. The tongue 584 of the aforementioned contact pair is connected with a contactor 585 whose associated contactor 581 also communicates with line 580. The continuation of the line leading from tongue 584 communicates with one contact of a contact pair 586 and also with a manual control switch 587. A line connecting the other terminal of contact pair 586 passes through a contact point associated with the manual switch 587 and continues on Fig. 45 to the manual switch 588, which connects with the negative bus 558. When manual switches 587 and 588 are closed, a circuit is completed through contact pairs 581—585, energizing magnet 118 to start the commutator 129. It will be recalled that the energization of magnet 118 controlling clutch 119, Fig. 14, initiates the entire scanner mechanism which continues to operate so long as the contact pair 581—585 remains closed. When the apex 186—9 of cam 186 encounters the follower arm 186a, contact pair 581—585 is opened and the scanner will then be arrested unless at that time contact pair 582—584 is closed, which is effected by the energization of relay 583. The circuit for energizing relay 583 is traceable from positive bus 552, through a branch lead 583a, winding of relay 583, outgoing wire 881, contact pair X149, element X165, manual switch X192 to a branch circuit which communicates with lead X162, and manual switch X160, to the negative source of current supply. The contact pair X149 is closed when a card is properly in position, and since the contacts 581—585 may still be opened, it is necessary to lock relay 583 in its operated position. Accordingly, a locking circuit is provided under the control of cam 184, which is traceable from negative bus 558, Fig. 45, manual switch 588, through the manual switch 587, contact pair 586a, contact pair 583b and 583c, to the negative lead of relay 583. This locking circuit is opened towards the conclusion of a cycle when the apex of cam 184 reopens the contact pair 586a.

General operation

Having particular reference to the aforementioned sheets containing the wiring diagram, and specifically to Figs. 44 to 48, let it be supposed that power switches 500 and X160 are closed, a record film 196 is properly inserted through the film gate 203, and that a blank card is appropriately positioned in accordance with the accommodations of the particular card perforating machine. Manual switches 587 and 588 are closed, causing magnet 118 to become energized and starting the scanner apparatus into operation. There will be reviewed hereinafter, the precedent established above of considering the cycle as comprised of fifteen component divisions. The arbitrary record to be recorded is taken as that illustrated on the film in Fig. 6 and on the meter in Fig. 1, which record, it will be supposed, is now in alignment on the scanner machine.

By comparing Figs. 6 and 28, it will be noted that during the first division the opening 224—1 of the scanner plate will pass a light beam to the exclusion of all other openings. This will occur when the opening 235 of the scanning belt 148, Fig. 23, sweeps across the line of openings 224. The photo-electric cell 273, Fig. 46, will be activated, permitting current to flow through resistance 528 as has been indicated 620 in the timing chart, Fig. 47. During the time interval represented by the short line 621, the distributor segment 540—1, Fig. 45, will connect the operating winding of relay 547—1 to the leads 537 and 538, causing relay 547—1 to be operated and locked in its operated position by reason of its locking winding including contacts 553—1, 554—1. The locked condition of relay 547 prevails until release relay 557 is energized at a subsequent time as a result of the brushes 545 of distributor arm 124 encountering the segment 542—3. Had the particular integer related to the higher numerical order, its locking circuit would have been under the control of contact pair 559 and 560 of release relay 561 whose energization is likewise controlled by the brushes 545 of distributor arm 124 when the latter encounters the segment 542—1.

It will be noted that during the first division while a scanning operation is taking place, the impulse corresponding thereto is not yet delivered to the translator until the second scanning division is entered upon by the scanning apparatus. Hence, the translating and storage unit will customarily be one division late in terms of the scanning cycle. For this reason, no operation takes place in the translator at this time.

During the second division, the row of openings 225, Fig. 28, will be scanned and a light beam will be passed when the aperture 236 of scanner belt 148 comes into alignment with the scanning plate opening 225—2. The current which then flows through the photo-electric cell is represented by the line 622 in Fig. 47, and the time interval represented by the short line 623 thereover corresponds to the instant when the distributor segment 540—2, Fig. 45, is connected by brushes 544 so that relay 547—2 receives an impulse over the circuit including leads 537 and 538. Accordingly, relay 547—2 will be energized and locked in its condition through its locking contacts 553—2 and 554—2, over the same locking circuit described before in the first division. During the remainder of the cycle, brushes 545 of distributor arm 124 encounter segments 542—1, 542—2, and 542—3 in the order indicated, operating the locking relays 561 and 557 but before the operation of relay 557 segment 542—2 affords a transfer impulse for transferring the setting of relay 547—2 to its associated transfer relay 562—2 as has been described.

Meanwhile, and before brushes 545 encounter the first segment 542—1, the projection 190—2, Fig. 44, engages its contact lever 190—a, closing the contact pair 595 and 596. It will be recalled that shaft 183, which carries cams 184—190 is gear driven from a source common to the distributor shaft 122, Fig. 16. A circuit may then be traced from the positive bus 552 through one of the resistances 575 associated with the translator magnet 365, through the winding of magnet 365, contact 573—1 and its operated tongue 572—1, back contact 574—0, unoperated tongue 572—0, lead 1576, contactor 547—e (which is unoperated at this time), contact point 547—g, to the negative circuit 576.

Magnet 365 becoming energized, causes slide 396—1, Fig. 36, to be set into its operated position when its armature 355 is attracted, causing its shaft 332 to be shifted endwise to a position such as that illustrated in broken lines in Fig. 36. Lever 325, which had been poised by the intervention of a tooth 324 of sprocket cam 323 is permitted to descend, locking the armature 355 in its energized position. As a result of the movement of shaft 332, pallet bar 318 is rocked counterclockwise, causing its tooth 321 to be withdrawn from its particular associated tooth 317 of escape wheel 316, and permitting shaft 303 to respond to the urge of its driven gear 310 until an opposite escape tooth 317 encounters the projection 332 opposite the aforementioned projection 321. In accordance with the angular position of shaft 332 at this time, cam 377, see Figs. 36 and 39, will encounter the tip 414 of slide bar 396—1, camming the latter member downwardly against the tendency of its detent spring 413 and causing its bottom lug 469 to protrude a short distance beyond its normal presentment. Meanwhile, magnet 365 has become deenergized, and the position of shaft 332 is maintained solely as an effect of the latching bail 325. Shortly before escape tooth 317 encounters lug 322, a succeeding cam tooth 324 of cam 323 will encounter the cam projection 329, lifting the latch bail 325 back to its poised position. This immediately permits the restoration spring 353 to shift shaft 332 back together with its associated armature 355 and as a result of the return springs 374 pallet bar 318 will resume its normal position, withdrawing escape projection 322 from the path of escape tooth 317, and permitting escape projection 321 to again present itself in the path of the oncoming escape tooth 317.

The resultant rotation of main shaft 303 is communicated through the train 342—351 to each of the shafts 331—340, including of course shaft 332. From the foregoing explanation it is to be observed that latching bail 325 serves a purpose of prolonging a signal condition which has been initiated by the energization of one of the magnets 364—373 and that its utility may be considered that of a safeguard, though the magnets 364—373 may themselves suffice to hold their associated shafts 331—340 provided that the energizing impulses are of correct duration and of properly timed occurrence.

At a time before distributor brush 545, Fig. 45, reaches segment 542—1, the projection 190—2, Fig. 44, of cam 190 passes lever 190—a, permitting the contact pair 595—596 to again open and releasing the energized magnet 365. The time during which this magnet remains energized is somewhat less than the time required for shaft 303, Fig. 35, to make one-fourteenth of a revolution.

Upon the termination of the second division, all of the shafts 331—340 come to rest after having rotated through one-fourteenth of a revolution, following which the unit enters upon the third division. Magnet 366 is energized, pulling up its armature 356 and shifting longitudinally its shaft 333. Driving shaft 303 and its auxiliary shafts 331—340 then proceed to consummate the second fourteenth of a revolution in accordance with the action of pallet bar 318 in the manner described above. During this rotation, the apex 415 of cam 378, which is located on shaft 333, engages the tip 414 of storage bar 398—2, overcoming its jockey spring 413 and setting bar 398—2 so that its protruding end 479 extends into the path of a cam 455—2. Thus far, the first numeral 1 has been stored in the translator while the second numeral 2 has been stored in the intermediate storage relay 562—2 awaiting further progress during the third division.

During the third division, the apertures 220 of the scanning plate, Fig. 28, are traversed by the scanner aperture 237 of the scanning belt 148. Referring now to Fig. 6, it will be noted that the light beam will occur when aperture 237 aligns with the scanning plate aperture 220—4. Meanwhile, in the manner already described, distributor brush arm 124 will enter upon a third revolution, causing photo-electric cell 273 to become activated at an instant represented in Fig. 47 by the line 624; while during the shorter time interval represented by the line 625, the distributor segment 540—4, Fig. 45, will connect the operating winding of relay 547—4 to the circuit leads 537 and 538. This will cause relay 547 to be operated and locked as in the previous examples.

Thereafter, when brushes 545 encounter segment 542—1, unlocking relay 561 will be operated, causing the intermediate storage relay 562—2 (of the preceding integer) to be released. Brushes 545 continue, encountering segment 542—2, transferring the setting of relay 547—4 to the intermediate storage relay 562—4 and relay 547—4 is released when finally brushes 545 encounter segment 542—3 which introduces a pulse to the unlocking relay 557, whose locking circuit serves the first five relays 547. Meanwhile, the brush arm 124 is undergoing its third revolution and projection 190—3, Fig. 44, encounters the projection of contact lever 190—a, closing the contact pair 595 and 596 and introducing negative to the circuit 576. A circuit may now be traced from the positive bus 552, Fig. 45, through the particular resistance 575 and winding of magnet 366, thence through the contact 573—2 and operated contact tongue 572—2 of relay 562—2 (which is still energized), back contact 574—1 and its unoperated contact tongue 572—1, back contact 574—0 and its unoperated contact tongue 572—0, lead 1576 and the unoperated contact tongue 547—e, contact 547—g, and negative circuit 576. Negative current source is available to the circuit 576 because of the momentary closure of contacts 595 and 596 communicating to it negative current from the branch supply line 594—a. As a result, magnet 566 of the translator unit is operated, causing the storage slide member 397—2 to be set in its operated position. Thus, the second numeral has been stored in the translator unit while the third numeral, which comprises the first meter number integer, is stored in the intermediate relay 562—4.

From the foregoing examples it may be noted that the circuit operation of the subject matter disclosed in Figs. 44 and 45 is repeated for each digital recording, so that the description thereof need not be repeated during the course of the ensuing divisions except to indicate where certain variations of operation enter.

During the fourth division, opening 221—0 passes the light beam, relay 547—0 is operated, but no transfer to the intermediate group takes place because the intermediate group 562 serves only the first five digital relays (the lower numerical order). Also during this division, magnet 368 is operated, causing to be set slide 398—4 in accordance with the preceding integer.

During the fifth division, opening 222—8 passes the light beam, and relay 547—8 is operated. Also during this division magnet 364 is energized, causing to be set the storage slide 398—0 in accordance with the preceding setting.

During the sixth division, opening 223—6 passes the light, causing relay 547—6 to store a signal. During this division, translator magnet 372 is operated, causing slide 400—8 to be set in accordance with the preceding digit.

During the seventh division, opening 226—1 passes the light, setting up a storage condition in relay 547—1 which is transferred to the intermediate relay 562—1. Meanwhile during this division, magnet 370 is operated, setting the storage slide 401—6 of the preceding digit.

During the eighth division, opening 227—0 passes light, causing storage relay 547—0 to receive a setting, which is immediately transferred to the intermediate relay 562—0. Meanwhile magnet 365 is operated in the translator unit, causing slide 402—1 to receive a setting.

During the ninth division, opening 228—2 passes light, setting up a storage condition in the primary relay 547—2 which is immediately transferred to the intermediate relay 562—2. Meanwhile, magnet 364 is operated in the translator unit, causing storage slide 403—0 to be set in storage condition.

At this time, cam projection 186—9, Fig. 44, moves the contact lever 186—a and causes to be opened the contact pair 581—585. This transfers the control of start magnet 118 to the contacts 582—584 of relay 583, which is controlled by the perforator contact X149. If for any reason the card perforator has not reached the last column of the preceding recording, contacts 582—584 will remain open, preventing magnet 118 from being energized and arresting the scanner at the end of the ninth division pending such a time that the card perforator will have completed recording its last column.

During the tenth division, opening 229—4 passes light, causing relay 547—4 to become energized and immediately to transfer its setting to the intermediate relay 562—4. Meanwhile, magnet 366 will become energized, causing slide 404—2 to be set in its storage condition.

At this time, cam projection 188—10, Fig. 44, will encounter its contact lever 594, closing the contact pair 592—593 and causing to be energized the translator magnet 418 which starts shaft 304, Fig. 35, into its cycle of operation. The operation of the translator at this time causes to be transmitted over the cable 578 the stored signals to the card perforator. However, since it does not rotate in exact relation with the receiving device, its further operation will be described separately hereinafter.

At the beginning of the eleventh division, cam projection 190—11 of cam 190 encounters its contact controlling lever 190—a, closing the contact pair 595—596 and completing the circuit for transferring the stored signal to its translator magnet 368 which, in turn, causes slide bar 405—4 to be set. The units digit of the meter reader is scanned, which, as may be noted from Fig. 1, finds the indicator covering both the 0 and the 1 indication. Accordingly, the photographic record will permit both openings 231—0 and 231—1, Fig. 22, to pass a light during their exposure intervals. The passing of the light in the two positions will cause relays 547—1 and 547—0 to become energized, the former immediately transferring its setting to its intermediate storage relay 562—1.

At the beginning of the twelfth division, cam projection 190—12, Fig. 44, encounters and operates its contact lever 190a, closing the contact pair 595—596 and completing a circuit which may be traced from positive lead 552, Fig. 45, through the resistance 575 and winding of magnet 364, front contact 573—0 and its operated contact tongue 572—0, unoperated contact tongue 547e and its contact 547g, wire 576, contact pair 595—596 which is now closed, and negative branch bus 594a. The energization of translator magnet 364 corresponds to the 0 digit, but it will be recalled that at the same time the figures 1 digit should also seek energization of magnet 365. This recordation will not result, however, for a reason which may best be revealed by tracing the chain circuit which includes the winding of magnet 365. Starting again from positive bus 552, this circuit continues through the resistance and winding of magnet 365, thence out through the contact point 573—1, operated contact tongue 572—1, and contact 574—0, but since contact tongue 572—0 is operated, the circuit is open at this point, preventing magnet 365 from becoming energized. Thus, it will be understood that in accordance with the sequential arrangement of contact tongues 572 and their contacts 573 and 574, there is effected a digital selection favoring the lower numerical series and giving preference to a lower indication over a higher one.

In the other chain circuit starting from positive bus 552, through the resistance 575 and winding of magnet 365, the circuit continues through a contact point 570—1, operated contact tongue 569—1, through the back contacts 571 and unoperated tongues 569 of relays 562—2 to 562—5, whence the circuit emerges continuing through the contact point 571 and contactors 569 of relays 547—6 to 547—9, thence out over circuit 1577 to the contact tongue 547f, its contact point 547i, to the lead 577, but since none of the contact pairs 476—477, 482—483, nor 488—489 are closed at this time, and moreover, since none of the cams 185, 187 nor 189 is effective to close its negative supply contact pair 597—599, etc., this circuit terminates for want of negative source. It will be noted therefore, that of the two chain circuits 576 and 577, the former alone obtains negative source through the closure of contacts 595 and 596, invariably causing to be selected the lower of two consecutive integers.

During this division also the tens digit of the meter reading is scanned. Thus far in the translation it will be noted that the translator mechanism functions merely as a signal receiving device, converting an electrical signal impulse whose identity corresponds to its period of occurrence into a mechanical storage manifestation having the physical evidence of a depressed or dislodged slide bar 396 to 408. In connection with the succeeding and final three translations, however, there may be performed an additional function which is referred to here as the cumulative correction. In this capacity, the translator not only conditions a slide bar but may also determine which of two companion integers is to be selected where, in accordance with the characteristics of conventional meter indicators, slight increments of movement are imparted so as to leave certain ones of the integer indicators ambiguous and overlapping between two integer manifestations. In the tens dial indicator too, two digits are covered, causing light to be passed through openings 232—0 and 232—9, see Figs. 1 and 28. As represented in Fig. 47, there will now be transmitted a long impulse 644 corresponding to the adjacent integer positions. In the distributor, segments 540—0 and 540—9 transmit short impulses represented in Fig. 47 by the lines 645 and 647 operating the storage relays 547—0 and 547—9.

In the translator unit, see especially Fig. 29, the operation of slide 406—0 causes the transverse slide 487 to close contacts 488—489, which will prepare a circuit for discarding an unwanted numeral record on the numeral relays for the tens digit in the event that two signals are communicated.

At this time, the change over relay 547—11 is operated through a circuit traceable from positive bus 552, winding of relay 547—11, contact 547a, and its associated tongue 547b which is operated due to the energization of storage magnet 547—9, contact 547c, and its tongue 547b, which is operated due to the energization of storage relay 547—0, to negative lead 558. Thus it will be seen that changeover relay 547—11 is operated because both relays 547—9 and 547—0 have been operated concurrently. At this time cam projection 185—13, Fig. 44, engages and actuates the contact lever 601, closing the contact pairs 597—599 and 598—600. A circuit may now be traced from the positive bus 552 through the resistance 575 and winding of magnet 364, contact 573—0 and its operated tongue 572—0, lead 1576, operated contact tongue 547e and its contactor 547j, conductor 577, closed contact pair 488—489 (because horizontal slide 487 has been thrust leftwardly by a preceding digit of the lower order, Fig. 29), contact pair 598—597 (because projection 185—13 is effective), branch bus 594a, to negative bus 558. The energization of magnet 364 causes to be operated the storage slide bar 407—0, whose movement causes horizontal slide bar 481 to move to the left, closing the contact pair 482—483. The election thus made is a major preference because of the intervention of the changeover relay 547—11 and excludes the energization of translator magnet 373 whose circuit will be found open for the reason discovered in connection with the foregoing description of division twelve, the broken condition being found at contact pairs 491—492, Fig. 29, and also at contacts 574—0 and 572—0.

In this manner the digit 0 has been given a value of ten instead of one of zero.

Also during the thirteenth division, the hundreds dial is scanned. The openings 233—2 and 233—3 pass light through the film and in this case there happens also to be generated a long impulse (the two integers 2 and 3) which has been indicated in Fig. 47 by the reference character 648 with its two short distributor impulses 649 and 651, generated by the distributor segments 540—2 and 540—3. As a result, relays 547—2 and 547—3 are operated, and immediately the storage conditions are transferred to the intermediate or secondary relays 562—2 and 562—3.

At the beginning of the fourteenth division, cam projection 187—14, Fig. 44, engages and operates its contact lever 606, closing the contact pairs 602—603 and 604—605. A circuit may now be traced from positive bus 552 through the resistance and winding of magnet 367, contact 570—3, and its operated tongue 569—3, thence through the back contacts 571 and unoperated tongues 569 of the relays 562—4 to 562—5, thence through the corresponding contacts and tongues of relays 547—6 to 547—9, thence through the unoperated tongue 547f, contact 547i, lead wire 577, closed contacts 582—583 (the slide 481 being operated), closed contacts 602—603, branch bus 594a, to negative bus 558. As a result of the energization of magnet 367, slide bar 408—3 is set in storage condition, causing horizontal slide bar 470 to move leftwardly, Fig. 29, and close the contact pair 476—477. This prepares the cumulative correction for disposing of the unwanted integer signal in the thousands position, if the latter happens to record two integers. Also during the fourteenth division, the thousands dial is scanned, which finds but one integer (1) indicated. In accordance with the particular example, only the opening 234—1 receives a light beam, causing a short electrical impulse to be generated, indicated 652 in Fig. 47. Meanwhile, segment 540—1 transmitting a control impulse indicated 653 operates relay 547—1, whose storage condition is immediately transferred to its associated intermediate relay 562—1.

During the fifteenth division of the cycle, no scanning takes place, but the setting of the relay representing the thousands position is at this time transferred to its corresponding slide in the translator unit. At this time, cam projection 189—15 engages and operates its contact lever 611, closing the contact pairs 607—608 and 609—610. The major preference circuit may now be traced from positive bus 522, through the resistance and winding of magnet 365, front contact 570—1 and its operated tongue 569—1, the several contacts and unoperated tongues 571 and 569 of intermediate storage relays 562—2 to 562—5, thence through the same contacts and tongues of the primary storage relays 547—6 to 547—9, line 1577, thence through the unoperated tongue 547f, contact 547i, lead wire 577, closed contact pair 476—477 (horizontal slide 470 having been moved to the left by the preceding storage), closed contact pair 607—608 (whose closure is a result of cam projection 189—15), branch bus 594a, and negative bus 558. As a result of this circuit, magnet 365 is energized, setting its slide bar 409—1 in its storage position.

All of the record has now been scanned and transferred to the storage bars of the storage and translator unit. During the fifteenth division, the film 196 is advanced to bring the next record into scanning position as has been previously explained. If manual control switch 587 is meanwhile opened, the scanner will continue operation until the scanning of a particular record is completed, but will stop at the end of its cycle due to the engagement of projection 183—0, Fig. 44, with its contact lever, which results in the opening of contact pair 586.

During the tenth division, magnet 418 was energized, permitting translator shaft 304 to rotate, and as a result of its rotation shafts 420—429 are also rotated in accordance with their gear engagement. It will also be recalled that the translator unit functions in fifteen divisions, as does the scanner mechanism.

During the first division of the transmitting portion of the translator, contact pair 444, Fig. 32, is closed (due to the longitudinal shifting of shaft 332 by operated slide 396—1). A circuit may then be traced, see especially Figs. 45 and 48, from positive lead X—161, wire X—174, contact pair X—45, wire X—175, contact pair X—152, wire X—182, through the junction block, magnet X—107—1 through its associated wire and cable 578, contact pair 444, to negative bus 558. The energization of magnet X—107—1 causes the perforator to make a perforation in the No. 1 position in the first column assigned to the tens digit of the reader number, see Figs. 40 to 42. The card is then advanced by suitable feed mechanism so as to present the second column into the perforating position.

During the second division, contact pair 445 is closed and in a similar manner the magnet X—107—2 is energized, causing a hole to be made in the No. 2 position in the second column corresponding to the reader number. The card is then advanced to the third column.

During the third division, contact pair 447 is closed and the thousand's digit of the meter number is recorded, while during the fourth, fifth, and sixth positions contact pairs 443, 451 and 449 are correspondingly closed, causing perforations 4, 0, 8, and 6 to be made in the thousand's, hundred's, ten's, and unit's positions respectively.

Referring now to Fig. 43, it will be recalled that at this time a skip bar becomes effective to advance the card in the nature of a tabulation through distance so as to skip the intervening columns and to align the twenty-sixth column in position for receiving the month recording.

During the seventh division, contact pair 444 is closed for producing the ten's digit 1 of the month, while during the eighth division contact pair 443 is closed for producing the unit's digit 0 of the month recording.

In a similar manner, during the ninth and tenth divisions, the ten's and unit's records of the calendar day are made. During the eleventh, twelfth, thirteenth, and fourteenth divisions, the thousand's, hundred's, ten's, and unit's records are made relating to the meter reading, which records are placed in the thirtieth to thirty-third columns inclusive. The card record is now completed and appears as illustrated in Fig. 40. Following this, an injector removes the card to make room for a new card and prepare for a succeeding operation.

When the rolls of exposed film are received at the accounting office, they are developed and placed into the photoelectric sensing apparatus which is connected to a perforator such as the one shown in the upper portion of Fig. 1 in U. S. Patent No. 1,914,263. A skip bar similar to the one indicated X140, Fig. 43, is placed into the perforator, the supply hopper is provided with blank cards, and then the apparatus is started into operation. From this arrangement cards may be prepared which will resemble the example shown in Fig. 40, since they will have the information perforated upon them indicated by the reference characters 655 and 656.

Following a subsequent reading of the same meters, another set of cards will be prepared in the manner just described and these cards will appear, for example, as the ones indicated in Fig. 42, having on them the perforations represented by the columns identified by the reference characters 668 and 669. Of the two groups of cards relating to the first and second readings or any other sequence of readings, for that matter, corresponding cards (identifiable by similar meter numbers) will then be sorted together in any convenient manner, as by an automatic sorting machine which is sensitive to the meter numbers. Machines for doing this are now known in this art.

All of the cards of the first set arranged in a given order are then placed into the perforator hopper while those of the second set are placed into the feed trough of the sensing portion of said perforator. A skip bar is applied having the characteristics shown at X143, Fig. 43, and the apparatus is started. As a result of this arrangement, the class of cards placed into the perforator are modified to resemble those exemplified in Fig. 41 by the addition of a set of control perforations in column 670 which resembles the column 669 of Fig. 42.

The resultant cards bearing both classes of information (first and second readings) may then be used to control accounting machines which have means for recording a reading based upon a difference in the two perforated readings. The record is then employed in making out bills, entering into ledgers, or for any other accounting purposes.

*Modified method of operation*

There will now be described a modified system of record translation in which electrical relays are employed for storing and translating the perforated record.

In Fig. 39 there is illustrated a modified form of scanner belt 700, having sufficient length to embrace two complete cycles each of which is divided into eighteen divisions instead of the fifteen divisions employed in the preferred showing. Scanning apertures 701—718 correspond identically to the scanning apertures 235—244 illustrated in Fig. 17, and each performs a similar function, but whereas belt 148 provided a space intervening the cycles which corresponded to five divisions, belt 700 provides such a space corresponding to eight scanning divisions. The surplus divisions relate to three additional cyclic intervals or divisions which are required in the modified apparatus for performing certain operations peculiar to the modified system.

By comparing Fig. 52 with Fig. 12, it will be noted that in the instant case the surface cams of drum 144 are considerably rearranged in connection with the modified control of the scanning shutters 253. Cams 711—718, Fig. 52, correspond in number to the cams 151—158 of Fig. 12. The mechanical operation under the control of these cams is so arranged that the meter dials are scanned in an inverse order; namely, thousands, hundreds, tens, and units. Also, the vertical shaft 183 carries a different arrangement of cams as may be noted from Fig. 53. In the instant case, twelve cams numbered 719— to 730 are mounted upon shaft 183 and each is adapted to operate an individual pair or pile-up of contacts, the performance of which will be best understood when considered later in connection with the operation of the system.

The modified commutator 731 has an outer segmented ring 732 divided into ten live segments, with intervening insulated sections or blank segments. The live segments have been indicated by the reference numerals 732—1 to 732—0, and each is connected over an individual lead in a cable 745 to a set of double wound primary storage relays 738—2 to 738—0 and 740—1. A pair of brushes 734 carried by the commutator arm 124 bridge the segmented ring 732 with a solid ring 733. An inner ring indicated 735 is made up of five live segments grouped as indicated at 735—0 to 735—4, over which there wipe one of a pair of bridged brushes 737, the other of which pair rides an innermost solid ring 736.

The photo-electric circuit including tubes 510 and 513 is identical with the one shown in Fig. 46 and described in connection with the preferred embodiment above. In the instant case the output of the amplifier tube 513 is led directly over a line 763 to the solid ring 733 of the distributor 731. Due to the difference in timing of the scanning operation, a current cycle here will appear as indicated by the chart, Fig. 51, instead of the one illustrated in Fig. 47. In lieu of the translator mechanism, the present system contemplates, in addition to the aforementioned primary storage relays, the use of four sets of secondary relays generally denoted 741, 742, 743, and 744, within which a record is stored, four elements at a time before being transferred to the perforator. The operating windings of primary storage relays 738—2 to 738—0 and 740—1 receive operating pulses over cable 745, following which a signal is held over by a locking winding and a locking winding contact 746, which each relay controls, as well as four objective contacts 747, 748, 749, and 750. The several contacts 747—1 to 747—0 are connected over a cable 751 with the operating windings of a secondary relay group 741—1 to 741—0. The contacts 748—1 to 748—0 are similarly connected over a cable 752 to the operating windings of a secondary relay group 742—1 to 742—0. The contacts 749—1 to 749—0 are similarly connected over a cable 753 to the operating windings of a secondary relay group 743—1 to 743—0 and the contacts 750—1 to 750—0 are connected over a cable 754 to the operating windings of a secondary relay group 744—1 to 744—0.

Certain classes of contact tongues controlled by each of the aforedescribed secondary relays are indicated generically 755, 756, 757, and 758, from corresponding ones of each of which there extends a common conductor into a cable 578a which connects with cable 578 of Fig. 48, each conductor communicating with one of the perforator magnets X107 as already described.

Other incidents and structural details of the modified system of operation are quite simple to understand and need not be described apart from their manner of operation which will be discussed hereinafter in connection with a general description of operation. Also, the manner in which modified devices function instead of their preferred form counterparts, will be noted as they are encountered.

General operation of modification

It will be assumed, of course, that manual control switch 759, Fig. 54, is closed, permitting a circuit to be traced from positive bus 552, Figs. 48, 57, 56, 55, and 54, through the resistance 760, the winding of distributor start magnet 118, switch 759, contact pair 761—762, to negative bus 558. Accordingly magnet 118 will become energized, and will withdraw its armature from the path of brush arm 124, permitting the latter to rotate and to initiate also the other scanning and recording operations.

Let it be assumed also that in accordance with the modified embodiment, a similar record to the one described above will be recorded, comprised of a record reader No. 12, a meter No. 4086, the date 10-24, and a meter reading of 1300. Switches 500, X160, and 1796 are closed, which are conditions prerequisite to the operation of the circuit. Having in mind that the instant system contemplates eighteen divisions to each cycle, the following description shall consider the divisions successively.

During the first division, aperture 701 of the scanning belt 700 encounters the row of scanner openings 224, passing a light impulse through the particular one indicated 224—1 which represents the digit 1. This causes a negative impulse indicated by the line 764, Fig. 51, to be distributed by segment 732—1 through a wire in cable 745, to the operating winding of relay 740—1, whose opposite terminal connects with the positive supply bus 538. Thereupon relay 740—1 operates and is locked through the closure of its contacts 772—1 and 746—1 over a circuit starting with positive bus 552, branch conductor 766, through the resistance and locking winding of relay 740—1, its locking contact pair aforementioned, lead 774, contact pair 775—776 of relay 739 to negative bus 558. Shortly thereafter, brushes 737 of distributor arm 124 encounter the segment 735—3, establishing a circuit which may be traced from negative bus 558, branch conductor 771, the continuous inner ring 736 of distributor 731, brushes 737, segment 735—3, lead wire 770, contact pair 769 and 768 (which are now closed due to the operation of relay 740—1), the operating winding of relay 738—1 and its resistance 767, conductor 766, to the positive bus 552. As a result, relay 738—1 is operated and locked through its locking winding over a circuit traceable from positive branch wire 766, through its resistance 777 and its locking winding, through its contact 772—1 and its contact 746—1, common lead 1777, contact pair 769, to the negative lead 558. Thus, the setting of relay 740—1 is transferred to the storage relay 738—1.

Thereafter, brushes 737 encounter segment 735—4 and a circuit is established which may be traced from the negative branch line 771, through distributor ring 736, brushes 737, segment 735—4, lead line 778, thence through the winding of locking relay 739 and its resistance 777, common positive bus branch 766, and main positive bus 552. When locking relay 739 is operated, storage relay 740—1 is released, but an interval has been provided during which the first impulse is transferred to the settings of relay groups 741 to 744, as well as for other operations. Now, another setting of relay 740—1 may take place during the succeeding division while the settings of the preceding divison are beng transferred for storage.

Meanwhle, apex 720—1 of cam 120 passing from beneath its contact lever 805 permits the contact pair 761—762 to open. Also, cam 719 withdrawing its low portion 719—1, forces its contact lever 807 to close the contact pair 806. As a result of this performance, the control of distributor start magnet 118 is transferred from cam 720 to cam 719 as will later appear.

Before the start of the second division, it will be noted that cam projection 722—2 has encountered its contact lever 779, closing the contact pair 780, and that thereafter as distributor brush arm 124 rotates, a circuit may be traced from the negative distributor ring 736, through the brushes 737, distributor segment 735—1, lead line 784, through the contact pair 780, lead line 783, through the winding of relay 782, resistance 781, to the positive bus 552. Thus, relay 782 is energized, opening its contact pair 785, and closing its contact pair 786. As a result of the closure of contact pair 786, a circuit is established which may be traced from negative lead 558, through the contact pair 786, wire 790, the operated contact tongue 789—1, its associated contact 747—1, a related wire within cable 751, through the operating winding of relay 741—1, its individual resistance 788, to the positive bus branch 787, causing the operation of relay 741—1. The opening of contact 785 releases any of the relays 741 which may have been locked by a preceding signal. Subsequent relays numbered 811, 831, and 858 which correspond in performance to relay 782 function similarly for the other groups of relays 742, 743, and 744. Upon the release of relay 782, contacts 785 are designed to close before contacts 786 are opened, so that the locking circuit for relay 741 will be established before the operating circuit is broken. The locking circuit of relay 741—1 may be traced from positive lead 552, through branch bus 787, resistance 791, locking winding of relay 741—1 and its front contact 792—1, operated tongue 793—1, back contact 794—0, unoperated tongue 793—0, wire 795a, back contact 795, unoperated tongue 795b, wire 797, contact tongue 798, and its normally closed contact 799, wire 800, contact pair 785, to negative lead 558. The operation of relay 741—12 is contingent upon the reception of an integer impulse in both the nine and zero positions, and functions in connection with the cumulative correction feature as will be described hereinafter.

When brushes 737 reach segment 735—2, a circuit is established which may be traced from negative ring 736, brushes 737, segment 735—2, lead wire 803, the winding of relay 802 and its resistance 801, to the positive bus 552. Upon the energization and operation of relay 802, contacts 769 are broken, opening the locking circuit of relay 738—1, described in division 1. The aforedescribed transfer operation takes place during each division and need not be reiterated. The performance thus far is coincident with the scanning of the meter number tens integer, following which the units integer, which happens to be digit 2, is scanned. Immediately thereafter an impulse indicated 804, Fig. 51, is distributed by the segment 732—2 to the operating winding of relay 738—2 in a manner described in connection with relay 738—1. Thereupon, relay 738—2 is locked through its individual locking circuit, which is similar to that of relay 740—1. At this time, the tens integer 1 which had been scanned in the first division is stored in relay 741—1, while the units integer 2 which is scanned in the second division is stored in relay 738—2.

During the third division, the projection 723—3 of cam 723 encounters lever 808, closing the contact pair 809 so that when brushes 737 of distributor arm 124 reach segment 735—1, a circuit is completed from negative distributor ring 736, through brushes 737, segment 735—1, wire 784, contact pair 809, the winding of relay 811 and its resistance 810, to the positive bus 552. With the operation of relay 811, its contact pair 816 is closed and contact pair 825 opened. As a result of the closure of contact pair 816, a circuit may be traced from negative bus 558, through the contact 816, line 815, the operated tongue 814—2 of relay 738—2, its contact point 748—2, a related wire in cable 752, the operating winding of relay 742—2, its individual resistance 813, to the positive branch bus 812 which connects with the primary positive bus 552. Relay 742—2 is operated, and thereafter relay 738—2 is released, the former being locked to a circuit traceable from branch bus 812, the individual resistance 817 and locking winding of relay 742—2, contact 818—2 and its operated tongue 819—2, thence through the series chain including the back contacts and unoperated tongues of relays 742—1 and 742—0, wire 820, back contact 823 of relay 742—12, unoperated tongue 821, wire 824, contact pair 825 of relay 811, Fig. 55, and negative bus 558. Upon the opening of contact pair 825 of relay 811, there is released any relay 742 which may have been previously set.

During this division, the thousands digit of the meter number is scanned, and an impulse indicated 827 is distributed by the distributor segment 732—4, over a wire in cable 745, to the operating winding of relay 738—4, causing the latter to be operated and locked as previously described. At this instant, an integer 1 is stored in the relay 741—1, an integer 2 is stored in the relay 742—2, while a new integer 4 is stored in relay 738—4.

During the beginning of the fourth division, an apex 724—4 of cam 724 engages and operates its contact lever 828, closing the contact pair 829, Fig. 56. When thereafter brushes 737 reach segment 735—1, a circuit is established that is traceable from the negative ring 736, brushes 737, segment 735—1, over wire 784 to the contact pair 829, thence through the winding of relay 831, its resistance 830, to the positive bus 552. As a result of the operation of relay 831, a circuit is established from negative bus 558, through the operated tongue 837 of relay 831, its associated contact 836, wire 835, operated tongue 834—4 of relay 738—4, its associated contact 749—4, a related wire in cable 753, the operating winding of storage relay 743—4, Fig. 57, its individual resistance 833, to the positive branch bus 832. As a result, storage relay 743—4 is operated, and when thereafter relay 831 is released, storage relay 743—4 will be maintained locked through a locking circuit traceable from positive branch bus 832, the individual resistance 738 and locking winding of storage relay 743—4, front contact 839—4, and its operated tongue 840—4, thence through a series of back contacts and unoperated tongues of the relays 743—5 to 743—9, emerging at wire 841 and continuing through contact 842, and unoperated tongue 843 of relay 743—12, wire 845, tongue 846 and its normally engaging contact point 847, wire 848, and contact pair 849 of relay 831 to negative at bus 558. The subsequent opening of contact pair 849 releases any relay other than 743—4 which may be set in accordance with a previous operation. During this division, an impulse indicated 850, Fig. 51, is distributed through the segment 732—6 over a wire in cable 745 to the operating winding of relay 738—0, energizing the latter and causing it to be locked over a circuit similar to those previously described in connection with other relays 738.

At the beginning of the fifth division, the apex 725—5 of cam 725 engages and operates contact lever 851, closing the contact pair 852. Thereafter, when brushes 737 of distributor arm 124 encounter segment 735—1, a circuit is established traceable from negative distributor ring 736, brushes 737, segment 735—1, wire 784, contact pair 852, winding of relay 856, resistance 855, to positive bus 552. As a result of the energization of relay 856, a circuit is established from negative bus 558, operated tongue 862 of relay 856, contact 861, lead wire 860, operated tongue 859—0 and its associated contact 750—0, a related wire in cable 754, the operating winding of relay 744—0, resistance 858, to the branch positive bus wire 857. Relay 744—0 is now operated and locked when relay 856 is released traceable over a circuit from positive branch wire 857, through an individual resistance 863, the locking winding of relay 744—0, front contact 864—0, operated tongue 865—0, wire 866, contact 867, and unoperated tongue 868 of relay 844—12, wire 870, tongue 871 and its normally closed contact point 872, contact pair 873, to negative bus 558.

Meanwhile, an impulse denoted 874 is distributed by segment 732—8 through a wire in cable 745, to the operating winding of relay 738—8, causing the latter to be energized and locked as previously described. At this time an integer is stored in each of the storage relay groups 741 to 744, and since no more storage capacity is available, it is necessary that the storage conditions be relayed to the perforator where they may immediately perforate corresponding positions in a card.

At the beginning of the fifth division, contact lever 807, Fig. 54, falls into a depression 719—5 in cam 719, while at the same time contact lever 875 is engaged and operated by an apex 721—5 of cam 721, closing its contact pair 876 as the contact pair 806 is opened. This transfers the control of magnet 118 to the card perforator, and if the perforation of the preceding card has been duly completed, the energizing circuit for magnet 118 will be closed, as follows: from positive bus 552, through the resistance 760, winding of magnet 118, manual switch 759, lead 877, contact pair 878, contact pair 878 of relay 879 (which is energized upon the proper condition of the perforator), wire 880, to negative bus 558. The circuit for operating relay 879 is traceable from positive bus 552, winding of relay 879, wire 881, wire X164, contact pair X149 (which is closed by a predetermined arrangement of the control mechanism when a card is properly aligned in the perforator), through the control circuit of the card perforator to negative lead X162. A locking circuit for maintaining relay 879 closed is traceable from negative bus 558 through the locking winding of relay 879, contact pair 879a—879b, Fig. 57, lead 879c, contact pair 919—920 of relay 921 to the negative bus 558.

In the event that a previous card has not been duly completed, the scanner will be prevented from starting by a failure of magnet 118 to become energized. Upon its proper energization, however, the ensuing rotation of brushes 737 pass over segments 735—1 at a time when cam projection 727—5 has operated lever 782 to close the contact pair 783. As a result, a circuit is established which may be traced from negative lead 558, Fig. 56, wire 884, contact pair 783, wire 783a, contact and operated tongue 755—1 of relay 741—1, one of the wires in cable 578a and its corresponding wire in cable 578, winding of a magnet X107, contact pair X152, wire X175, contact pair X45, wire X174, to the positive lead X161. Thus, there is ended the fifth division during which the integer stored in the relay group 741 has been converted into a perforation while the remaining relay groups 742, 743, and 744 retain their original storage setting.

At the beginning of the sixth division, an apex 722—6 of cam 722, Fig. 55, engages contact lever 779, closing the contact pair 780. Thereafter, when brushes 737 encounter segment 735—1, a circuit is completed for operating relay 782, opening its contact pair 785, and closing its contact pair 786. This releases the previously energized storage relay 741—1, and operates a new relay 741—8. Thereafter, when brushes 737 encounter segments 735—2, relay 738—8 is released in a manner already described. The distributor brushes 734 upon encountering segment 732—6, transmit an impulse indicated 885, Fig. 51, which is transmitted over a wire in cable 745, to the operating winding of relay 738—6, operating and locking the latter in a manner previously described. Before brushes 737 have passed over segment 732—1, an apex 728—6, Fig. 57, of cam 728 encounters and operates a contact lever 886, closing the contact pair 887. As a result, a circuit is established which may be traced from negative bus 558, over lead 884, through the contact pair 887, wire 888, the contact and operated tongue 756—2 of relay 742—2, an associated wire in cables 578a and 578, magnet X107—2, line X182, contact pair X152, line X175, contact pair X45, line X174, to positive lead X161, causing the energization of magnet X107—2. At the conclusion of this division, the integer 8 is stored in relay 742—8, the integer 2 in relay 742—2, the integer 4 in relay 743—4, the integer 0 in relay 744—0, the integer 6 in relay 738—6, and the tens column integer of the meter number perforated in its proper position in the card.

At the beginning of the seventh division, projection 723—7 of cam 723 encounters and operates its contact lever 808, closing the contact pair 809 so that when the distributor brushes 737 encounter segment 735—1, an operating impulse is transmitted to the relay 811 in a manner already described. As a result, the setting of relay 738—6 is transferred to the storage relay 742—6 over a wire in cable 742, while a previously stored impulse in relay 742—2 is released. Thereafter, when the same brushes encounter segment 735—2, the stored impulse in relay 738—6 is released in a manner already described. The distributor brushes 734 upon encountering segment 732—1 transmit an impulse through a wire in cable 745 to the operating winding of relay 740—1. The latter upon being operated transfers its setting to relay 738—1 as described in division one. At this time, projection 729—7 of cam 729, Fig. 57, engages and operates its lever 890, closing the contact pair 891 and establishing a circuit which transfers the stored signal of relay 743—4 to the perforating magnet X107—4, causing a perforation to be made in the third column and in the number 4 position while the card is advanced to present its fourth column.

At the beginning of the eighth division the apex 724—8 of cam 724 engages and operates its lever 828, closing the contact pair 829. Thereafter when distributor brushes 737 reach segment 735—1 an operating impulse is transmitted to relay 831, Fig. 56, which causes the setting of relay 738—1 to be transferred to the storage relay 743—1 over a wire in cable 753 as described in connection with division four. Meanwhile, the previously stored relay 743—4 is released when brushes 737 reach segment 735—2 causing the signal in relay 738—1 to be released. When the distributor brushes 734 encounter segments 732—0, an impulse 893 is communicated over a wire in cable 745, operating relay 738—0. Thereafter, when brushes 737 have passed over segment 732—1, the apex 730—8, Fig. 57, of cam 730 engages and operates its lever 894, causing the contacts 895 to be closed and establishing a transfer circuit for communicating the storage setting of relay 744—0 to the perforating magnet X107—0. This causes a perforation to be made in the zero position of the fourth column, following which the card is advanced to present its fifth column.

During the beginning of the ninth division, cam apex 725—9 engages and operates its lever 851, closing the contact pair 852. Thereafter, when brushes 737 encounter segment 735—1, relay 856 is operated as in the fifth division, causing the setting of relay 738—0 to be transferred to the storage relay 744—0 over a wire in cable 754 which is the same relay that had been energized during the fifth division. As the brushes continue encountering segments 735—2, relay 738—0 is released. Meanwhile, an impulse indicated 897, Fig. 51, is distributed by brushes 734 as they encounter segment 732—2, causing relay 738—2 to be operated over a wire in cable 745. Cam apex 727—9, Fig. 57, engages and operates its lever 782, closing the contact pair 783 and causing a transfer to be made from relay 741—8 to the perforating magnet X107—8.

At the beginning of the tenth division, cam projection 722—10 engages and operates its lever 779, Fig. 55, closing the contact pair 780, and causing the setting of relay 738—2 to be transferred to the storage relay 741—2. Meanwhile, an impulse 898 issues through segment 732—4 operating the primary relay 738—4. Then cam projection 728—10, Fig. 57, engages and operates its lever 886, closing the contact pair 887 and transferring the storage signal from relay 742—6 to the perforating magnet X107—6, which causes a perforation to be made in the 6 position of the sixth column and advancing the card to its next columnar position, which happens to be the twenty-sixth column due to the action of the skip bar which has been described in connection with Fig. 43.

At the beginning of the eleventh division, the apex 723—11, Fig. 55, encounters and operates its lever 808, closing the contact pair 809 and causing to be transferred the setting of relay 738—4 to the storage relay 742—4. Meanwhile, an impulse 899, Fig. 51, operates relay 740—1, whose setting is transferred to the primary relay 738—1. Also, cam projection 729—11, Fig. 57, encounters and operates lever 890, closing the contact pair 891 and transferring an impulse from the storage magnet 743—1 to the perforating magnet X107—1, making a perforation in the number 1 position of the twenty-sixth column.

At the beginning of the twelfth division, cam projection 724—12, Fig. 56, engages and operates its lever 828, closing the contact pair 829 and transferring the setting of relay 738—1 to the storage relay 743—1, which happens to be the same relay of the group 743 previously energized during the eighth division. At this time, the distributor brushes 734 wiping over both segments 732—2 and 732—3 cause an elongated impulse 900 occupying two-tenths of a division to be transmitted to the primary relays 738—2 and 738—3 over associated wires in cable 745. Thereafter cam projection 730—12, Fig. 57, engages and operates lever 894, causing the contact pair 895 to be closed and transferring the signal stored in relay 744—0 to the perforating magnet X107—0. This causes a perforation to be made in the 0 position of the twenty-seventh column.

At the beginning of the thirteenth division, the apex 725—13 of cam 725, Fig. 56, engages and operates lever 851, closing the contact pair 852 and transferring the setting of relays 738—2 and 738—3 simultaneously to the storage relays 744—2 and 744—3, which are both locked over individual circuits as follows: the locking circuit of relay 744—2 is traceable from positive branch bus 857, the resistance 863 and winding of relay 744—2, contact 864—2 and its operated tongue 865—2, contact 902—1 and unoperated tongue 865—1, contact 902—0 and unoperated tongue 865—0, wire 866, contact 867 and unoperated tongue 868, wire 870, tongue 871 and its normally engaging contact 872, contact pair 873, to negative bus 558. At the same time, relay 744—3 is locked as follows: positive branch bus 857, the resistance 863 and locking winding of relay 744—3, contact 907—3, and operated tongue 906—3, the back contacts and unoperated tongues 907 and 906 of relays 744—4 to 744—9, contact pair 909, wire 910, tongue 911 and its normally engaging contact point 912, contact pair 873 to negative bus 558.

The first described locking circuit will lock the lower digital value of two operated relays, while the second described circuit will lock the higher of two operated relays. The determination is later made to elect one and discharge the other of the two relays 744, but meanwhile an elongated impulse 923 is issued by brushes 734 over segments 732—9 and 732—0, energizing the primary relays 738—9 and 738—0. Cam projection 727—13 now operates its lever 782, closing the contact pair 783 and transferring the setting from relay 741—2 to the perforating magnet X107—2 which causes a perforation to be made in the 2 position of the twenty-eighth column.

During the fourteenth division, cam apex 722—14, Fig. 55, engages and operates its lever 779, causing to be closed the contact pair 780 and transferring the setting from the primary relays 738—9 and 738—0 to the storage relays 741—9 and 741—0. Relay 741—11 is connected in parallel with relay 741—0, so that the two are operated simultaneously by relay 738—0 and also that relay 741—12 is connected in parallel with relay 741—9, through the contacts of relay 741—11, so that as a result of the energization of relay 741—11, relay 741—12 is also operated. It should be noted that relay 741—12 may be operated only upon the contingency that impulses corersponding to integers 0 and 9 are concurrently received. Relay 741—11 is first operated as a result of the 0 impulse and through it the 9 impulse permitted to reach the 741—12 relay. Upon the operation of relay 741—12, it is locked through its locking winding over a line 948a, wire 879c, contacts 919—920 of supervisory relay 921 to negative bus 558. When relay 741—12 is energized, it serves to reverse the connections of wires 797 and 828 in a generally similar manner that relay 547—11 functioned in Fig. 45 in connection with the preferred embodiment.

Meanwhile, two impulses 928—1 and 928—0, Fig. 51, are distributed to the primary relays 740—1 and 738—0 over the segments 732—1 and 732—0. The setting of relay 740—1 is of course immediately transferred to its associated relay 738—1. At this time, cam projection 728—14, Fig. 57, encounters and operates its lever 886, causing to be closed the contact pair 887 and transferring a storage setting from the storage relay 742—4 to the perforating magnet X107—4. This causes a perforation to be made in the number 4 position of the twenty-ninth column.

At the beginning of the fifteenth division, the apex 723—15 of cam 723, Fig. 55, engages and operates its lever 808, closing the contact pair 809 and causing to be energized the relay 811 when brushes 737 reach segment 735—1. As a result, the setting of primary relays 738—0 and 738—1 is transferred to the storage relays 742—0 and 742—1 through wires in cable 752. Relays 742—0 and 742—1 will be locked up, the former over a circuit from positive branch bus 812, through resistance 817 and winding of relay 742—0, contact 818—0, operated tongue 819—0, wire 820, contact 823, and its unoperated tongue 821, wire 824, contact pair 825, to negative bus 558. The locking circuit for magnet 742—1 is traceable from positive branch bus 812 through the resistance and locking winding of relay 742—1, contact 818—1, and its operated tongue 819—1, and contact 823a. The circuit is here terminated for failure of negative source because of the open condition between contact 823a and its tongue 821. Thus, relay 742—0 remains locked while relay 742—1 is released. At this time, there having been concluded fifteen cyclic divisions, all of the scanning has been consummated, leaving only the meter reading signals to be transferred to the card perforator.

When brushes 737 pass over segment 735—1, cam projection 726—15 having engaged its contact lever 931 to close the contact pair 932, there is issued an impulse for energizing the relay 933 over a circuit which may be traced from positive bus 552, through the winding of relay 933, contact pair 932, wire 884, to the negative bus 558. Relay 933 is locked when its armature 933b closes with contact 933a over a circuit traceable from positive bus 552, winding of relay 933, contact pair 933a and 933b, wire 879c, contact pair 919—920 of supervisory relay 92 to negative lead 558. In addition to its locking tongue 933b, relay 933 also controls tongues 934 to 939 which are so adjusted that tongues 934 and 935 make contact first, following which tongues 936 and 937 make contact, and finally tongues 938 and 939 make contact with their respective contact points 929, 798, 911, 871, 846, and 839a.

In practice, three separate relays individually timed may be employed in lieu of this successive order of operation. After tongues 934 and 935 have been operated, a locking circuit for relays 741—9 and 741—0 described in division fourteen is switched from wire 800 through contact 798, and tongue 935, to wire 940, which connects with the tongues 942—5 to 942—9 inclusive of the relays 742. Since tongue 942—0 only is operated, the locking circuit of relay 741—9 is interrupted and this relay is released. Locking circuit of relay 741—0 described in division fourteen is switched from wire 800 through contact 929 and tongue 934 to wire 941, which is connected to the tongues 942—0 and 942—4, but since tongue 942—0 is operated, the relay 741—0 will remain locked.

This, it will be recognized, accomplishes cumulative correction through the medium of relay storage instead of mechanical storage as described in the preferred embodiment.

When tongues 936 and 937 have been operated, the locking circuit of relay 744—2 described in division eleven is transferred from wire 912a through contact 911 and tongue 936 to wire 943, which is connected to the tongues 944—0 to 944—4 of the relays 741, but since none of these tongues are operated, relay 744—2 will be released. The locking circuit of relay 744—3 is transferred from wire 912a through contact 871 and tongue 937, to wire 945, which is connected to the tongues 944—5 to 944—0 and since tongue 944—9 is operated relay 944—3 remains locked.

After tongues 938 and 939 have been operated, the locking circuit of relay 743—1 is transferred from wire 848 through contact 846, and tongue 938 to wire 948 which is connected to the tongues 946—0 to 946—4 of relays 744, and since tongue 947—3 is operated at this time, relay 743—1 remains locked.

The storage relays now have but a single relay operated in each of their four groups and are in condition to communicate their reading to the perforator magnets X107, which happens when cam projection 729—15 operates its lever 890 to close the contact pair 891. This causes perforator magnet X107—1 to receive the setting communicated to it from the storage relay 743—1, and a perforation to be made in the 1 position of the thirtieth column which corresponds to the thousands integer of the meter reading.

At the beginning of the sixteenth division, the apex 730—16 of cam 730 engages and operates its lever 894, closing the contact pair 895 and transferring a setting which had been stored in storage relay 744—3 to the card perforating magnet X107—3. This causes to be made a perforation in the number 3 position of the thirty-first column or the hundreds digit of the meter reading.

During the seventeenth division, apex 727—17 of cam 727 engages and operates its lever 782, closing the contact pair 783 and transferring a setting from storage relay 741—0 to the card perforating magnet X107—0. This causes to be made a perforation in the 0 position of the thirty-second column or the tens digit of the meter reading.

During the eighteenth division, apex 728—18 of cam 728 engages and operates its lever 886, causing to be closed the contact pair 887 and transferring a setting from storage relay 742—0 to its corresponding card perforating magnet X107—0. This causes to be made a perforation in the 0 position of the thirty-third column or units digit of the meter reading. At the conclusion of this division, cam apex 720—1, Fig. 54, engages and operates its lever 805, closing the contact pairs 761—762 and 942. Thereafter, brushes 737 of the distributor arm 124 encounter segment 735—0, and a circuit is closed traceable from negative distributor ring 736, through brushes 737, segment 735—0, contact pair 942, lead wire 950, winding of supervisory relay 921, to the positive bus 552. This causes the energization and operation of relay 921, as a result of which there are released the control relays 933, 879, 741—12, 742—12, 743—12, and 844—12, or any of the latter that might have been operated.

At this point, a particular card has been completely perforated and resembles the one illustrated in Fig. 40, while a new card is advanced with its first column in perforating position.

While the present invention has been explained and described with reference to a specific preferred embodiment and enumerated modifications, it should be understood that variations and departures may be instituted within the contemplated scope of the present invention. For this reason it is intended that the foregoing description and the accompanying drawings shall constitute no restrictions upon the present invention except as indicated in the hereunto appended claims.

The subject matter claimed is:

1. In a storage device, a series of groups of storage setting elements, a series of groups of elements an element in each group corresponding to each of the ten integers 0 to 9, a control shaft corresponding to each of said ten integers, means to rotate all of the shafts simultaneously through a cycle of operation, and magnetically controlled means for moving said shafts selectively to set a corresponding element of a group.

2. In a numerical digit storage device, a plurality of groups of settable storage elements, each element corresponding to one of the ten integers 0 to 9, a control shaft for each integer, means to shift said shafts individually to set said storage elements, means to rotate said shafts cyclically through a plurality of angular positions each angular position relating to a group, and means to set the corresponding element in any group during the rotation of its shaft.

3. In a mechanical storage device, a plurality of groups of integer storage elements, each group comprising a set of elements identified with the numeral integers 0 to 9, an operating shaft for each integer, means to rotate all the shafts simultaneously, and means to shift said shafts in sequence selectively according to the integer element to be stored in each group.

4. In a mechanical storage device, a plurality of groups of integer storage elements, an operating shaft for each integer, means to set one of said storage elements according to an integer to be recorded, means to rotate all the shafts simultaneously, means to shift the shafts in sequence selectively according to the integer element that has been set, and means operated by the rotating shifted shaft to return to normal the element which controlled the shifting of the shaft.

5. In a storage apparatus, a plurality of groups of storage elements, each group corresponding to the numerical digits 0 to 9, a plurality of magnets each corresponding to one of said elements in a group but common to corresponding digits in all the groups, means to energize the magnets in succession according to a multi-digit number to be recorded, means to condition an element in each group successively according to the sequence of the magnets operated, and locking means to hold the conditioned elements in operated position after the corresponding conditioning magnet has been deenergized.

6. In a storage and translating unit, a plurality of shafts, each relating to an integer, a plurality of cams on each of said shafts, each cam relating to a decimal order and having an apex, the apices of said cams on each shaft being arranged in a spiral progression, a plurality of storage setting bars, one for each of said cams of all of said shafts, electromagnetic means for conditioning said shafts, and power actuating means for communicating through said conditioned shafts a setting to one of said storage setting bars in accordance with the angular position of said shafts.

7. In a storage and translating unit, a plurality of rows of storage setting bars, each row relating to an integer and each bar of a row relating to a decimal order, a plurality of shafts each in parallel alignment with one of said rows, means for rotating said shafts intermittently, and means under the control of any one of said bars for causing its associated shaft to be shifted to initiate the transmission of an electrical impulse.

8. In a signal storage transfer system, the combination including a set of storage relays each allocated to an integer digit of the numerical series, signal transfer means for energizing said relays singly or doubly, and means responsive to a double relay energization for electing one of two integers comprising the double energization in accordance with a numerical value registration next lower in decimal order including a pair of chain circuits traversing said relays, one in an ascending and the other in a descending order, means under the control of said next lower decimal registration for electing one or another of said chain circuits, and means for communicating a storage setting after said election of double registration through the elected one of said relays.

9. In a system of record transposition, means for projecting onto a scanning surface an image of a circular index in which peripheral markings represent predetermined registrations, timed scanning apparatus including means for interpreting said peripheral markings into signal impulses characterized by their periodicity in a scanning cycle, storage means for receiving for a prolonged registration a mechanical manifestation corresponding to said periodicity of said impulses, and a row of record perforators relating to said storage means and operated in accordance with a storage manifestation communicated by said storage means.

10. In a system of recording, light source means to project images of a set of circular decimal pointers, light sensitive means to generate electric impulses according to the angular positions of said pointer images, electro-magnetic means to set a series of storage elements according to the electric impulses to give simultaneously a storage record representing the positions of all the pointer images, and means to generate supervisory impulses according to the settings of said storage elements.

11. In a system for recording the readings of a meter having a set of indicators each capable of an infinite number of angular indications at exact integer positions or at positions intermediate exact integer positions, a storage device comprising a plurality of sets of storage elements, the number of elements in each set corresponding in number to said integer positions, means to position one or two elements in a set when said indicators are disposed respectively upon exact or intermediate indications, means under the supervision of a storage device relating to a set predeterminedly assigned to a lower decimal value to render in accordance with its storage condition one of two storage elements of a particular set effective, and means to make a registration under the control of said storage elements after they are thus rendered effective by said supervised means.

12. In a system of numerical transfer, a decimal series of integer registers, a corresponding decimal series of integer indexes, each index of which is capable of infinite variations of position, means for transferring the indications of said indexes to their corresponding ones of said registers including apparatus for registering two adjacent indications when an index denotes a value intermediate two adjacent integer values, and storage apparatus associated with said transfer means including a device for electing proximate values corresponding to one of said two adjacent integers under the supervision of the indications of a register next lower in decimal value.

13. In a system for making a record from photographic images of indexes appearing successively on a strip, means operated in timed relation to the advancement of said strip to sense the record condition of each index image, photoelectric means associated with said sensing means to generate electrical impulses corresponding cyclically to an index characteristic, a storage apparatus, electro-responsive means for conditioning said storage apparatus under the supervision of said impulses and characteristically thereof, and supervisory means under the control of said storage apparatus for controlling the operation of a card perforator.

14. In a signal storage and translating system, apparatus for generating a series of impulses in a transmission cycle representative by their periodicity of occurrence in said cycle of a quantity to be measured, a series of groups of storage elements having an element in each group identified with the numerical integers 0 to 9, means to condition one storage element in each group in accordance with the periodicity of occurrence of a signal impulse in said cycle, and means effective under conditions of duplicate impulses in a cycle to set a single one of said storage elements in a group according to the value of an adjacent numerical integer.

15. In a signal storage and translating system, apparatus for generating a series of impulses in a transmission cycle representative by their periodicity of occurrence in said cycle of a quantity to be measured, a series of groups of storage elements having an element in each group identified with the numerical integers 0 to 9, means to condition one storage element in each group in accordance with the periodicity of occurrence of a signal impulse in said cycle, and means effective under conditions in response to the joint control of two impulses, each occurring in an associated one of two adjacent cycles to set a single one of said storage elements in a group.

16. In a recording system, means to scan photoelectrically in succession images of a plurality of index dials, a plurality of groups of storage elements, each group identified with a corresponding one of said dials, means to set the elements in each group according to the scanning of its corresponding dial image, apparatus to generate electrical impulses according to the settings of said storage elements, and means to make a permanent record on material according to the impulses thus generated.

17. In a recording system, means to scan photoelectrically the images of a plurality of pointers indicating numerical values by their position on a scale, a plurality of groups of electro-responsive storage elements, each group allocated to an associated one of said pointers, means to generate electrical impulses under the supervision of said scanning means for conditioning said storage elements, apparatus for making a permanent record on material, and means for generating other impulses under the control of said storage elements for operating said permanent recording means.

18. In a numerical storage system, a set of primary storage relays each having a pair of armatures, a first and second chain circuit series with one of each pair of said relay armatures relating to said first chain circuit series and the other of each pair of said relay armatures relating to said second chain circuit series, a set of translator magnets corresponding in number to that of said primary storage relays, means including said series chain circuits for operating said translator magnets, means to energize a plurality of said primary storage relays during corresponding cycles of operation of a series of cycles, and means controlled by the operation of ones of said relays during preceding series of cycles of operation to elect for operation one of the chain series and thereby to energize one only of the magnets when two consecutive primary storage relays of said set have been operated during any one cyclic series.

19. In a signal transfer system, a set of primary storage relays, each relay being related to an integer of a numerical series, a set of secondary storage relays, each electrically associated with a corresponding relay of said primary set including a pair of control armatures under the supervision of each primary storage relay with the first armatures of each pair connected in sequence in an ascending numerical integer value and the second armature of each pair connected in sequence in a descending numerical integer value, said two armature sequences constituting circuit chains between sources of energizing current and the windings of said secondary storage relays, an original signal storage apparatus for controlling said set of primary storage relays, and means under the control of said apparatus for electing one of said two circuit chains in accordance with a preceding integer operation.

20. In a system of storage relays, a set of primary relays, two contact pairs associated with each of said primary relays, two chain circuits each connecting the corresponding contact sets of said primary relays with one contact point of each set connected in a related one of said circuits and the other contact point of each set connected in the other of said circuits, and means selectively controlled according to a prior setting of said primary relays to select for operation automatically a part of either of said chain circuits.

21. In a storage and translating system, the combination with a device for scanning photographic records of meter dial faces adapted to indicate exact integer positions as well as positions intermediate exact integer positions, a storage device, means to store in said device a single recording of exact integer positions and double recordings of two adacent integers for intermediate position indications, means to elect automatically one of two adjacent exact integer positions in response to recordings of said intermediate position indications, a recording device, and means to operate said recording device in accordance with the settings of said storage device including said elected exact integer positions.

22. In a recording system, apparatus for scanning with a photoelectric excitor beam the images of a plurality of pointers representing numerical integer values, each pointer susceptible of indicating exact integer positions or intermediate integer positions, a plurality of electro-magnetically controlled storage elements arranged in groups, each group allocated to represent one of said pointers, means to generate electric impulses under the supervision of said scanning beam for correspondingly conditioning said storage elements, means associated with said storage elements to convert intermediate integer position indications to exact integer values, and means under the control of said storage elements for transmitting control impulses in accordance with said exact integer positions and said converted integer values.

23. In an exact integer determining apparatus for translating a plurality of indications where some correspond to exact integer representations and others to fractional integer representations, the combination including a controlling device having a series of exact integer storing elements, means to store exact integer representations directly upon corresponding ones of said integer storing elements, and fractional integer representations upon two adjacent integer storing elements one of a next higher value and the other of a next lower value, means to interpret said integer storing elements in order to select one of said two adjacent integer elements under the control of an adjacent decimal integer storage, and means to reverse the operation of said interpreting means when fractional integer representations involve the integers 9 and 0 from that when the integer representations involve any other pair of adjacent integers.

24. In a meter indication recording system, a series of decimal indicators each capable of representing exact integer values or mixed number values, means under the control of indicators having exact integer values to generate directly primary electrical impulses representing corresponding exact integer values, means under the control of integer indications corresponding to mixed number values to generate groups of primary impulses representing adjacent exact integer values both lower and higher than said mixed number values, means to generate secondary impulses characteristic of the same integer value as that corresponding to said primary electrical impulses including means to generate secondary exact integer impulses of exact integer value for said mixed number groups of impulses under the supervision of adjacent integers next lower in decimal order.

25. In a system of numerical integer storage relays, a series of primary relays each representing an integer and having a pair of contact sets comprising a contactor movable between two contact points, two chain circuits one including the first contactors of each of said relays and the other including the second contactors of each of said relays, and automatically controlled integer translating means determined by a prior setting of said primary storage relays to elect one or the other of said chain circuits and a particular one of its said contactor contact points to convert the settings of fractional integer indications in said primary storage relays to exact integer indications.

26. In a system of numerical integer storage relays for allocating whole number values to fractional number values, a series of relays each having a pair of contact sets comprising a contactor movable between two contact points, two chain circuits one including the contactors of one of said contact sets and the other including the contactors of the other of said contact sets, a supervisory relay operated in response to the energization of a pair of said series of relays, and automatically responsive under the control of said supervisory relay means to elect one of said two chain circuits when an adjacent lower integer is 0 and the other of said two chain circuits when an adjacent lower integer is 9.

27. In a system of numerical transfer means to transmit electrical impulses in successive cycles of operation, each cycle corresponding to a decimal order of a number, a set of storage relays each relay corresponding to a numerical digit from zero to nine, a pair of contactors associated with each of said relays, two chain circuits, one including in series ones of said contactors of said set of storage relays and the other including in series the others of said relay contactors, means to operate said relays according to impulses transmitted in each of said operation cycles, and means controlled by impulses transmitted during a preceding operation cycle when the carry over position of an integer is reached to establish an individual condition in one of said chain circuits during a particular operation cycle when the next lower integer is 0 and in the other of said chain circuits when the next lower integer is 9.

28. In combination with a material bearing a series of recordings, means to transfer from said material said recordings to a said series of registers, and means controlled by one of said registers corresponding to a lower decimal order to determine the one of two consecutive integer values when a register corresponding to a next higher decimal order is disposed in an intermediate position between two exact integer values.

29. In a system for converting the indications of indexes having infinite angular variations of position into registrations of exact integer values comprising, the combination of a scanning device having cyclic operation, a mask for alignment with said indexes having openings corresponding to exact integer positions of a numerical order, circuit means responsive to said scanning devices at regular intervals in a cycle according to the openings in said mask, apparatus for registering exact integer values under the control of said circuit means when indications represent exact integer values and for registering two adjacent integers one lower and the other higher in value when indications correspond to intermediate integer values, and means under control of a registration on said apparatus of an adjacent decimal integer to convert said two integer registrations into a single registration.

30. In a storage device, a series of groups of storage elements, an element in each one of said groups corresponding to the numerical integers 0 to 9, a control shaft related to each integer, means to rotate all of said control shafts simultaneously throughout a cycle of operation, magnetically controlled means to shift one of said control shafts during each cycle of operation at a particular angular position according to the group of storage elements in which a storage operation is made, and means to make a record of each group according to the control shaft thus shifted and according to the angular position of the shaft when shifted.

31. In a storage device, a series of storage elements arranged in columns, one of said elements in each column corresponding to each of the integers 0 to 9, a rotatable shaft corresponding to each one of said integers, means to shift axially any one of said shafts during any one of a plurality of angular positions thereof each angular position being related to one of said columns, means to rotate all of said shafts cyclically, and means carried by said shafts to set an element corresponding thereto upon the shifting of said shaft and relating decimally to a column in accordance with the angular position of said shaft when shifted.

32. In a storage mechanism, a series of groups of storage elements, each group corresponding to one of the integers from 0 to 9, a control shaft for each group, means for shifting each shaft of a group at an angular position corresponding to an integer value, and means carried by each shaft to position one of said elements of each series according to the angular position of said shaft when shifted for recording upon said series of groups of storage elements integer registrations signifying values for a series of decimal positions.

33. In a signal storage mechanism, a plurality of integer storage elements, means to set said storage elements according to integer signals to be recorded comprising a rotatable shaft for each integer from 0 to 9, means to rotate said shafts, means to shift any one of said shafts at a characteristic interval according to the decimal position of an integer, and means also carried by said shafts to restore each element after a shaft has been shifted.

LOUIS M. POTTS.